(12) United States Patent
Rabhi

(10) Patent No.: US 10,704,431 B2
(45) Date of Patent: Jul. 7, 2020

(54) REGENERATIVE VALVE HYDRAULIC ACTUATOR

(71) Applicant: Vianney Rabhi, Lyons (FR)

(72) Inventor: Vianney Rabhi, Lyons (FR)

(*) Notice: Subject to any disclaimer, the term of this patent is extended or adjusted under 35 U.S.C. 154(b) by 8 days.

(21) Appl. No.: 16/151,036

(22) Filed: Oct. 3, 2018

(65) Prior Publication Data
US 2019/0101031 A1    Apr. 4, 2019

Related U.S. Application Data

(60) Provisional application No. 62/567,419, filed on Oct. 3, 2017.

(51) Int. Cl.
| | | |
|---|---|---|
| *F01L 9/02* | (2006.01) | |
| *F16K 31/122* | (2006.01) | |
| *F01L 3/12* | (2006.01) | |
| *F01L 1/08* | (2006.01) | |
| *F01L 1/18* | (2006.01) | |

(52) U.S. Cl.
CPC .............. *F01L 9/021* (2013.01); *F01L 3/12* (2013.01); *F01L 9/02* (2013.01); *F16K 31/1223* (2013.01); *F16K 31/1225* (2013.01); *F01L 1/08* (2013.01); *F01L 1/181* (2013.01); *F01L 1/185* (2013.01); *F01L 2101/02* (2013.01)

(58) Field of Classification Search
CPC ... F01L 1/181; F01L 9/02; F01L 1/185; F01L 9/021; F16K 31/1223

USPC .................. 123/90.12, 90.13, 90.39
See application file for complete search history.

(56) References Cited

U.S. PATENT DOCUMENTS

| | | |
|---|---|---|
| 5,410,994 A | 5/1995 | Schechter |
| 7,162,982 B2 | 1/2007 | Rabhi |
| 7,987,824 B2 * | 8/2011 | Haas ............. F01L 9/025 123/90.12 |
| 9,982,626 B2 | 5/2018 | Rabhi |
| 2008/0251041 A1 | 10/2008 | Lou |
| 2013/0074790 A1 | 3/2013 | Rabhi |

FOREIGN PATENT DOCUMENTS

| | | |
|---|---|---|
| FR | 2 842 867 A1 | 1/2004 |
| FR | 2 980 516 A1 | 3/2013 |
| FR | 3 032 236 A1 | 8/2016 |
| FR | 3 041 040 A1 | 3/2017 |
| FR | 3 056 670 A1 | 3/2018 |

* cited by examiner

*Primary Examiner* — Ching Chang
(74) *Attorney, Agent, or Firm* — Young & Thompson

(57) ABSTRACT

A regenerative valve hydraulic actuator includes a high-pressure accumulator fed by a high-pressure feed hydraulic pump, an actuator defining an actuator hydraulic chamber for actuating—by way of a progressive lever arm ratio lever—a valve provided with a valve return device, a valve lifter hydraulic valve placed between the high-pressure accumulator and the actuator hydraulic chamber, a lifter check valve which connects a low-pressure accumulator to the actuator hydraulic chamber, a valve closure hydraulic valve placed between the chamber and a closure and regeneration hydraulic motor which recovers energy previously invested to open the valve.

28 Claims, 31 Drawing Sheets

REGENERATIVE VALVE HYDRAULIC ACTUATOR

BACKGROUND OF THE INVENTION

Field of the Invention

The present invention relates to a regenerative valve hydraulic actuator which is particularly intended for use in reciprocating internal combustion engines.

Description of the Related Art

Since the early days of internal combustion engines, numerous devices have been designed to actuate opening and closing of the intake and exhaust valves of the most widely used internal combustion engines, that is to say those employing a Beau de Rochas, Otto or Diesel cycle.

However, because of its reliability, its robustness, its simplicity and its moderate unit cost, the camshaft has been imposed as the virtually universal valve actuator equipping almost all four-travel engines produced worldwide.

For all that, the cams which said camshaft includes have a profile fixed by their design which leaves no freedom to change the valve lift laws that said cams actuate.

A first step toward more flexibility was made by inserting a phase-shifter between the camshaft(s) and the crankshaft of reciprocating internal combustion engines, said phase-shifter allowing advancing or retarding of the opening—relative to the angular position of the crankshaft—either of the intake valves or of the exhaust valves, or both. Said phase-shifter is used as part of the strategy known as VVT (which stands for "Variable Valve Timing").

A second step consisted in making variable the opening time and/or the lift height of the valves, this strategy being better known by the abbreviation VVA (which stands for "Variable Valve Actuation"). In this regard, a number of devices have been or are being marketed under various brands and/or various trade names.

A distinction is made between discretely variable valve lifters which have at least two selectable cam profiles and continuously variable lifters generally based on a single cam and a continuously variable ratio transmission. Discretely variable lifters include for example the "VTec®" device from "Honda®", the "Variocam Plus®" device from "Porsche®", the "Valvelift System®" from "Audi®" and the "VVTL-i®" device from "Toyota®".

Continuous variation valve lifter devices include the "Valvetronic®" device developed by "BMW®" which is based on a variable ratio lever and the "Multiair®" device from "FIAT®", the latter providing a hydraulic transmission between the cam and the valve pushrod while a hydraulic fluid tank return solenoid valve enables the lift of said valve to be truncated to a greater or lesser degree.

To go further toward flexibility of control in opening, closing and lifting of the valves of reciprocating internal combustion engines, numerous devices have been conceived purely and simply to replace the camshaft and its invariable profile cams with more or less variable devices. These devices without cams are known as "camless" devices.

The aim of said "camless" devices is to procure great variety in the laws for opening, lifting and closing the valves, within the limits allowed by physics and geometry. Numerous "camless" devices have been produced which for the most part have stalled at the prototype stage. This is the case for example of the "electromagnetic camless" device from "Valeo®", the "Free Valve®" device from "Cargine®", the hydro-electric device developed by the American company "Sturman®" in collaboration with "Siemens®" or the "Active Valve Train (AVT™)" device from the company "Lotus®".

A wide variety of devices have stalled at the design stage and have been implemented only partially, if at all. In this regard note the patents belonging to the applicant that describe hydromechanical or electrohydraulic "camless" devices. The first of these devices was published under the number FR 2 842 867 and describes a valve hydraulic actuator for piston engines, while the second was published under the number FR 2 980 516 and discloses a reciprocating cam electrohydraulic valve actuator.

At present, no "camless" type device has been mass produced for motor vehicles. This is because, compared to "camless" devices, valve actuators based on at least one cam remain more competitive and less adventurous and have a more advantageous cost-benefit ratio.

Moreover, the energy balance of numerous "camless" devices is in the final analysis mediocre because either the energy invested to accelerate the valve and to compress the return spring is not recovered at all or only too little or the energy efficiency of the hydraulic, electromagnetic or mechanical "camless" actuator is insufficient.

For example, U.S. Pat. No. 5,410,994 from inventor Michael M. Schechter does not recover the hydraulic energy invested to open the valve, to the point that the inventor even specifies in the text of said patent that the flow rate of hydraulic fluid feeding the valve is the main factor determining the energy consumption of the system.

Apart from leading to high energy consumption, non-recovery of the kinetic energy of the valve or of the valve return spring compression energy—whatever the nature of said spring—implies great instability of said valve, which forms with the hydraulic fluid a mass-spring system subjected to high excitation if the non-recovered energy is not entirely dissipated in the form of heat.

This is why many "camless" devices are imprecise and lead to unstable lifting and holding opening of the valve, which is subject to parasitic movements. This leads in particular to the necessity to damp the movement of said valve to render it more precise whereas by its very nature damping dissipates energy in the form of heat, which is unfavorable in terms of efficiency.

Note also the difficulty that most "camless" devices encounter in slowing the valve sufficiently during its closure, when said valve arrives in the vicinity of its seat. This slowing is necessary to limit the power of the impact between said valve and said seat, both to confer on said seat a normal service life and to prevent excessive acoustic emission. This slowing strategy known as "soft landing" is naturally implemented by the cams which, in the prior art, have a profile that terminates with what is known in the art as a "ramp of silence", which moreover assures the recovery of the kinetic energy of the valve under excellent conditions in terms of efficiency.

Note also in this regard that U.S. Pat. No. 5,410,994 does not include either any cam or any mechanical device for slowing the valve in the vicinity of its seat, any more than for example US patent 2008/0251041 A1 from inventor Zheng Lou.

Such devices therefore necessarily lead to unacceptable acoustic emissions, to hammering of the valve seat, and to an energy expenditure compromising the overall efficiency of the internal combustion engine equipped therewith.

Accordingly, until now, and taking account of the state of the art and technology, the technological, economic and industrial effort to be accepted to maximize the energy efficiency of an internal combustion engine by means of "camless" type valve actuators is not justified in that simpler and more robust means based on one or more camshafts can achieve most of the efficiency gains theoretically acceptable for said engine without recourse to the "camless" technology.

In other words, to be imposed for the mass production of motor vehicles, the unit cost in manufacture, the reliability and the overall size of a "camless" type valve actuator must be at least comparable to those of a cam type actuator, or even more competitive.

However, recourse to a "camless" valve actuator may be justified if it is impossible to have recourse to a cam type actuator for functional reasons. This is the case in particular for example of the cam shaft internal combustion engine on which the French patent belonging to the applicant was published under the number FR 3 032 236. In fact, the intake metering valve of said engine must be lifted in such a short time—of the order of a few hundred microseconds—that a cam type actuator can in no case assure the opening of said valve under the required conditions. The same applies in respect of the closing of said valve. A classic actuator could therefore not open the metering valve of the engine according to patent number FR 3 032 236 unless said engine were turning only at very low speed, which cannot be the case if the latter actuator is employed in the field of motor vehicles or heavy goods vehicles.

Moreover, the particular architecture of the transfer-expansion and regeneration engine according to FR 3 032 236 and particularly that of the cylinder heads of the double-acting expansion cylinder of said engine is only with difficulty compatible with a camshaft. In fact, the assembly that the cylinder barrel, the lower cylinder head and the upper cylinder head of said expansion cylinder constitute is adapted to be suspended on hollow pillars as French patent application No. 1558585 of 14 Sep. 2015 describes, said application also belonging to the applicant.

Given that the hollow pillars rest on ball-joint connections, on the one hand, and that said assembly is at a high temperature, on the other hand, it is impossible to fix to the lower cylinder head and/or the upper cylinder head that said assembly comprises a belt or chain transmission of whatever type of camshaft. It is therefore pertinent to provide—as patent number FR 3 032 236 proposes—cartridges ready to be mounted in said cylinder heads, said cartridges including in particular the metering valve actuator and the metering valve itself, whilst said cartridges are not connected to each other and/or to the energy source that feeds said actuator except by cables and/or lines that are sufficiently flexible.

SUMMARY OF THE INVENTION

In the application field of reciprocating piston compressors and engines and in accordance with one particular embodiment, there results from the invention a regenerative valve hydraulic actuator that is:
  extremely fast to the point of enabling valve opening times of a few hundred microseconds and opening durations close to one millisecond, thus addressing in particular the function of requirement of the transfer-expansion and regeneration engine as described in the French patent published under the number FR 3 032 236;
  precise and induces little parasitic movement of the valve that it actuates, despite virtual absence of damping of said valve;
  suitable for equipping any prior art piston compressor or any reciprocating internal combustion engine, and notably installable on the transfer-expansion and regeneration engine that French patent published under number FR 3 032 236 describes thanks to the possibility of producing an independent cartridge ready to be mounted independently for each valve, the orientation of which relative to said engine is non-constraining, and which is not connected to the energy source of the actuator except by a line sufficiently flexible to be able to accommodate thermal expansion of the cylinder head on which said cartridge is mounted;
  of high energy efficiency comparable to that of a cam type actuator, said high efficiency being obtained in particular by recovering virtually all of the kinetic energy of all the moving parts of said actuator, in addition to that of the valve;
  silent in that it enables the valve to be returned to its seat at very low speed despite the high speed that said valve acquires during its closing travel;
  of long service life, compatible with that of any reciprocating internal combustion engine;
  if necessary adapted to enable any valve to be opened to the exterior of the compression or combustion chamber of any reciprocating piston compressor or engine without this allowing escape of the pressurized gas that said chamber contains via said valve, and which by virtue of this prevents having to provide valve recesses on the cap of the piston of said compressor or engine to prevent any collision between said piston and said valve, whilst any flow of gas via said valve is facilitated;
  economically feasible to manufacture.

In this regard, the regenerative valve hydraulic actuator according to the invention is in particular intended to implement on any reciprocating internal combustion engine most of the strategies that make it possible to maximize torque and power, on the one hand, and to reduce fuel consumption and emission of pollutants, on the other hand, said strategies being based on precise and flexible control of the intake and/or exhaust valves of said engine.

Thanks to the regenerative valve hydraulic actuator according to the invention, this significant improvement in the performance of said engines can be obtained without significantly increasing either the acoustic emissions or the manufacturing unit cost thereof.

It is also understood that the regenerative valve hydraulic actuator according to the invention is in particular designed to enable the production under optimum conditions of the transfer-expansion and regeneration engine as described in the French patent published under the number FR 3 032 236, the latter promising a drastic reduction in fuel consumption and emission of pollutants compared to conventional reciprocating internal combustion engines.

It is understood that although the regenerative valve hydraulic actuator according to the invention is primarily intended for reciprocating piston compressors and engines, said actuator can be applied to any other application field, machine or apparatus that includes at least one line in which a gas or a fluid of any kind circulates, whilst said actuator advantageously makes it possible to open and to close any valve of any type in said line in order to allow or to block the flow of said gas or fluid in said line.

Moreover, said actuator may be used with the valve that it actuates replaced by any other object necessitating rapid movement between at least two positions.

The other features of the present invention have been described in the description and in the secondary claims depending directly or indirectly on the main claim.

The regenerative valve hydraulic actuator according to the present invention for a reciprocating piston compressor or engine which comprises at least one piston connected to transmission means to reciprocate in a cylinder closed by a compressor or engine cylinder head, said piston, said cylinder and said cylinder head forming a compression or combustion chamber into which opens at least one intake line and at least one exhaust or discharge line, one or both of said two lines being connected to said chamber by a line orifice that a valve can block when it rests on a valve seat, said actuator comprising:

- At least one high-pressure hydraulic feed pump that can admit a hydraulic fluid from a low-pressure accumulator or a fluid tank via a low-pressure feed line to discharge said fluid to a high-pressure accumulator via a high-pressure feed line;
- At least one actuator which comprises an actuator cylinder capped by an actuator cylinder head, said cylinder being attached directly or indirectly to the compressor or engine cylinder head whereas said cylinder and the actuator cylinder head form with an actuator piston an actuator hydraulic chamber, said piston being mechanically connected by transmission means to the valve, said means being such that if the actuator hydraulic chamber is subjected to a pressure exerted by the hydraulic fluid, the actuator piston tends to move said valve away from the valve seat with which it cooperates;
- At least one valve return device which exerts on the valve a force opposite that which the actuator is able to produce, said device therefore tending to return the valve into contact with the valve seat with which it cooperates;
- At least one valve lifter hydraulic valve that can open or close a high-pressure lifter line which connects the high-pressure accumulator to the actuator hydraulic chamber;
- At least one lifter check valve placed in an inertial lifter line that connects the low-pressure accumulator or the fluid tank to the actuator hydraulic chamber, said check valve allowing the hydraulic fluid—via said line—to flow from the low-pressure accumulator or the fluid tank to the actuator hydraulic chamber, but not in the opposite direction;
- At least one valve closure hydraulic valve that can open or close a closure and regeneration line which connects the actuator hydraulic chamber with a fluid intake which a closure and regeneration hydraulic motor includes, a fluid outlet which said motor also includes being connected with the low-pressure accumulator or with the fluid tank by a hydraulic motor low-pressure return line;
- At least one progressive lever arm ratio lever constituting all or part of the transmission means, said lever exposing at least one point of application of the force of the actuator to which the actuator piston can apply directly or indirectly a driving or resisting force, at least one point of application of the force of the valve to which the valve can apply directly or indirectly a driving or resisting force, and at least one point of application of the reaction force on the cylinder head at which a force is applied directly or indirectly to the compressor or engine cylinder head.

The regenerative valve hydraulic actuator according to the present invention comprises means for moving the application point which move the point of application of the force of the actuator and/or the point of application of the force of the valve and/or the point of application of the reaction force on the cylinder head along the progressive lever arm ratio lever during the opening travel of the valve.

The regenerative valve hydraulic actuator according to the present invention comprises a point of application of the force of the actuator and/or a point of application of the force of the valve and/or a point of application of the reaction force on the cylinder head which respectively form directly or indirectly with the actuator piston and/or with the valve and/or with the compressor or engine cylinder head with which it cooperates either at least one pivot connection or at least one rolling-sliding connection, the latter constituting the means for moving the application point.

The regenerative valve hydraulic actuator according to the present invention comprises a rolling-sliding connection which consists of at least one lever contact track provided on the progressive lever arm ratio lever at the level of the point of application of the force of the actuator and/or the point of application of the force of the valve and/or the point of application of the reaction force on the cylinder head, said track cooperating with a lever reaction surface respectively formed directly or indirectly on the actuator piston and/or on the valve and/or on the compressor or engine cylinder head, said piston and/or said surface having a curved contact profile on which is established the contact between said track and said surface.

The regenerative valve hydraulic actuator according to the present invention comprises a valve return device which consists of a valve return actuator which comprises a return actuator cylinder capped by a return actuator cylinder head, said cylinder being attached directly or indirectly to the cylinder head of the compressor or engine whereas said cylinder and the return actuator cylinder head form with a return actuator piston a return actuator hydraulic chamber, said piston being mechanically connected to the valve by return transmission means. The regenerative valve hydraulic actuator according to the present invention comprises a return actuator hydraulic chamber which is connected to the high-pressure accumulator by a return pressure line.

In the regenerative valve hydraulic actuator according to the present invention the level and the pressure of the hydraulic fluid that the low-pressure accumulator contains are maintained within a certain range of values by a low-pressure force-feed hydraulic pump which can transfer said fluid from the fluid tank to said accumulator via a low-pressure force-feed line.

The regenerative valve hydraulic actuator according to the present invention comprises at least one valve with or without the valve seat with which it cooperates, an actuator, transmission means, a valve return device, a lifter check valve, a valve lifter hydraulic valve and a valve closure hydraulic valve are together accommodated in an actuator cartridge which exposes at least one hydraulic connector.

The regenerative valve hydraulic actuator according to the present invention comprises a valve lifter hydraulic valve and/or a valve closure hydraulic valve which consists of a tubular valve which comprises a blocking tube which can be moved in longitudinal translation by a tube actuator, said tube being accommodated in fluid-tight manner in a blocking tube bore and ending at a tube sealing bearing surface that can either rest on a tube seat to form with the latter a continuous line of fluid-tight contact or be maintained at a certain distance from said seat to allow the hydraulic fluid to pass from a tube internal volume to a tube external collector-distributor or vice versa.

The regenerative valve hydraulic actuator according to the present invention comprises a tube actuator which is a hydraulic amplification piezoelectric actuator which comprises a stack of ceramic elements that are deformed mechanically when they are subjected to an electric field, the end of said stack being connected to an actuator sender piston of large diameter which forms—with an actuator sender cylinder—an actuator sender chamber which communicates with at least one actuator receiver chamber, the latter being formed on the one hand by an actuator receiver piston of small diameter which is directly or indirectly connected to the blocking tube with which it cooperates so as to be able to move the latter in longitudinal translation and on the other hand by an actuator receiver cylinder.

The regenerative valve hydraulic actuator according to the present invention comprises an actuator sender chamber and an actuator receiver chamber which are together connected with a pressurized hydraulic fluid source by an actuator force-feed check valve which allows the hydraulic fluid to go from said source to said chambers and not vice versa.

The regenerative valve hydraulic actuator according to the present invention comprises an actuator sender piston which receives a pressure compensation spring which tends to move it toward the actuator sender chamber, the force which said spring exerts on said piston being less than or equal to the force which the hydraulic fluid exerts on said piston when the piston in the actuator sender chamber is equal to that in the pressurized hydraulic fluid source.

The regenerative valve hydraulic actuator according to the present invention comprises an actuator receiver piston which receives a pressure compensation spring which tends to move it toward the actuator receiver chamber, the force which said spring exerts on said piston being less than or equal to the force which the hydraulic fluid exerts on said piston when the pressure in the actuator receiver chamber is equal to that in the pressurized hydraulic fluid source.

The regenerative valve hydraulic actuator according to the present invention comprises an actuator sender chamber which communicates via a receiver chamber common manifold with a plurality of actuator receiver chambers, the actuator receiver piston forming each of said receiver chambers being able to move in longitudinal translation a blocking tube that is its own.

The regenerative valve hydraulic actuator according to the present invention comprises an actuator receiver chambers which are each put into communication or not with the receiver chamber common manifold by a selection valve the opening of which is commanded by a selection valve actuator.

The regenerative valve hydraulic actuator according to the present invention comprises a receiver chamber common manifold which accommodates in non-fluid-tight manner at least one solid or hollow incompressible cylindrical element which is maintained centered in the vicinity of a certain longitudinal position relative to the receiver chamber common manifold by at least two oppositely acting centering springs.

The regenerative valve hydraulic actuator according to the present invention comprises a closure and regeneration hydraulic motor which comprises a closure and regeneration cam mounted on a hydraulic motor shaft which is driven—directly or indirectly—in rotation by the reciprocating piston compressor or engine, a closure and regeneration piston bearing directly or indirectly on said cam and forming—with a closure and regeneration cylinder—a closure and regeneration chamber which communicates with the fluid intake.

The regenerative valve hydraulic actuator according to the present invention comprises a closure and regeneration cam which exposes a closure and regeneration cam profile which includes at least one regeneration angular sector R on which the closure and regeneration piston bears to return the valve to the valve seat.

The regenerative valve hydraulic actuator according to the present invention comprises a closure and regeneration cam which exposes a closure and regeneration cam profile which includes at least one pre-compression angular sector P on which the closure and regeneration piston bears to pre-compress the closure and regeneration line between two returns of the valve to the valve seat.

The regenerative valve hydraulic actuator according to the present invention comprises a closure and regeneration cam which can be offset angularly relative to the hydraulic motor shaft by cam phase-shifting means.

The regenerative valve hydraulic actuator according to the present invention comprises a cam phase-shifting means which consist of at least one male helical spline formed on the cylindrical external face of the hydraulic motor shaft which cooperates with at least one female helical spline formed inside the closure and regeneration cam, the latter being able to be moved or retained in place axially relative to the hydraulic motor shaft by a cam phase-shifting actuator.

The regenerative valve hydraulic actuator according to the present invention comprises a cam phase-shifting actuator which is connected to the closure and regeneration cam by a phase-shifting fork which cooperates with a phase-shifting groove on the closure and regeneration cam.

The regenerative valve hydraulic actuator according to the present invention comprises a closure and regeneration line which includes an end of expansion check valve which allows hydraulic fluid coming from the low-pressure accumulator, from the fluid tank, or from a pressurized hydraulic fluid source to enter said line via a freewheel channel, but not to leave it.

The regenerative valve hydraulic actuator according to the present invention comprises a closure and regeneration line which includes a precompression valve which allows hydraulic fluid coming from the low-pressure accumulator, the fluid tank, or a pressurized hydraulic fluid source to enter said line and/or to leave it.

The regenerative valve hydraulic actuator according to the present invention comprises a point of application of the force of the actuator and/or a point of application of the force of the valve and/or a point of application of the reaction force on the cylinder head which includes play compensation means.

The regenerative valve hydraulic actuator according to the present invention comprises play compensation means which consist of a play compensation actuator inside which a play compensation chamber includes a play compensation check valve which allows hydraulic fluid coming from the low-pressure accumulator, the high-pressure accumulator, the fluid tank or a pressurized hydraulic fluid source to enter said chamber, but not to leave it.

The regenerative valve hydraulic actuator according to the present invention comprises play compensation means which consist of a play compensation actuator inside which a play compensation chamber includes a play compensation nozzle which allows hydraulic fluid coming from the low-pressure accumulator, the high-pressure accumulator, the fluid tank or a pressurized hydraulic fluid source to enter said chamber and to leave it.

The regenerative valve hydraulic actuator according to the present invention comprises a progressive lever arm ratio lever which is accommodated in a lever chamber into which also opens the actuator piston, said chamber being connected with the low-pressure accumulator, the fluid tank or a pressurized hydraulic fluid source by a lever chamber check valve which allows hydraulic fluid to leave said lever chamber but not to enter it, or by a lever chamber calibrated nozzle which allows hydraulic fluid to leave and to enter said lever chamber, or again by both said valve and said nozzle, the latter then being placed in parallel with the lever chamber check valve.

BRIEF DESCRIPTION OF THE DRAWINGS

The following description with reference to the appended drawings provided by way of nonlimiting example will enable a better understanding of the invention, its features, and the advantages that it is able to procure.

DESCRIPTION OF THE PREFERRED EMBODIMENTS

There have been shown in FIGS. 1 to 35 the regenerative valve hydraulic actuator 1, various details of its components, its variants, and its accessories.

Figure 2:
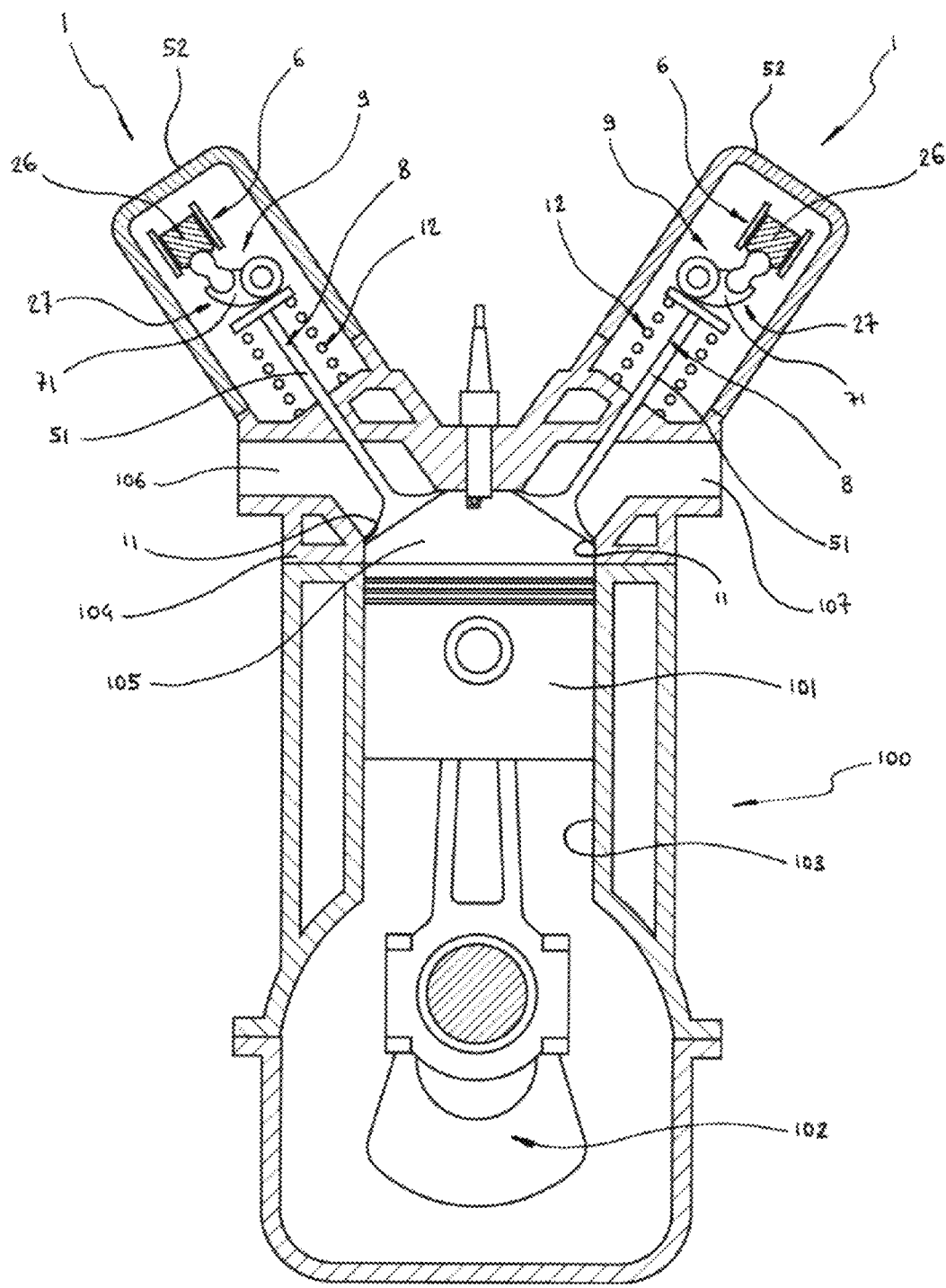
FIG. 2 is a diagrammatic sectional view of a reciprocating internal combustion engine receiving the regenerative valve hydraulic actuator according to the invention.

As FIG. 2 illustrates, the regeneration valve hydraulic actuator 1 is particularly intended for a reciprocating piston compressor or engine 100 which comprises at least one piston 101 connected to transmission means 102 to reciprocate in a cylinder 103 closed by a compressor or engine cylinder head 104.

Still in FIG. 2, it is seen that the piston 101, the cylinder 103 and the compressor engine cylinder head 104 form a compressor or combustion chamber 105 into which open at least one intake line 106 and at least one exhaust or discharge line 107, one or both of said lines 106, 107 being connected to said chamber 105 by a line orifice 10 which a valve 8 is able to block when it rests on a valve seat 11.

As FIG. 1 and FIGS. 5 to 12 particularly illustrate, the regenerative valve hydraulic actuator 1 according to the invention comprises at least one high-pressure hydraulic feed pump 2 which is able to admit a hydraulic fluid 3 from a low-pressure (BP) accumulator 4 or a fluid tank 46 via a low-pressure feed line 47 and to discharge said fluid 3 to a high-pressure (HP) accumulator 5 via a high-pressure feed line 48.

Figure 3:
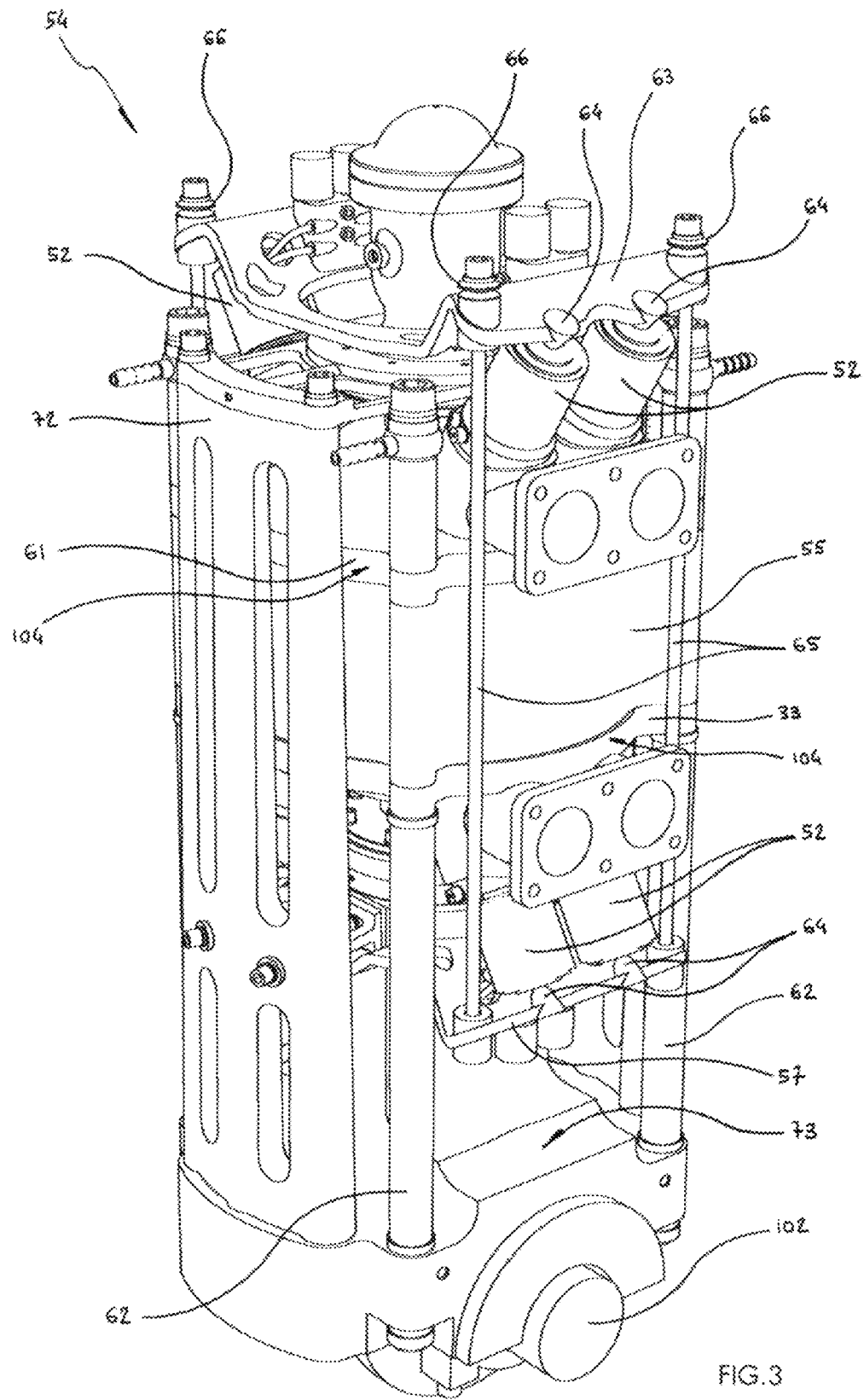
FIG. 3 is a three-dimensional view of the expansion cylinder assembly of the transfer-expansion and regeneration engine as described in the French patent published under the number FR 3 032 236 and belonging to the applicant, in its improved version according to the French patent application number 1558585 of 14 Sep. 2015 also belonging to the applicant, the lower cylinder head of the expansion cylinder and the upper cylinder head of the expansion cylinder that said assembly comprises each receiving four actuator cartridges which are pressed via presser abutments onto the cylinder head with which they cooperate on the one hand via a lower cartridge retention plate consisting of the expansion cylinder lower cylinder head and on the other hand via an upper cartridge retention plate consisting of the expansion cylinder upper cylinder head, said plates tending to be moved toward one another by plate tie-rods.
Figure 4:
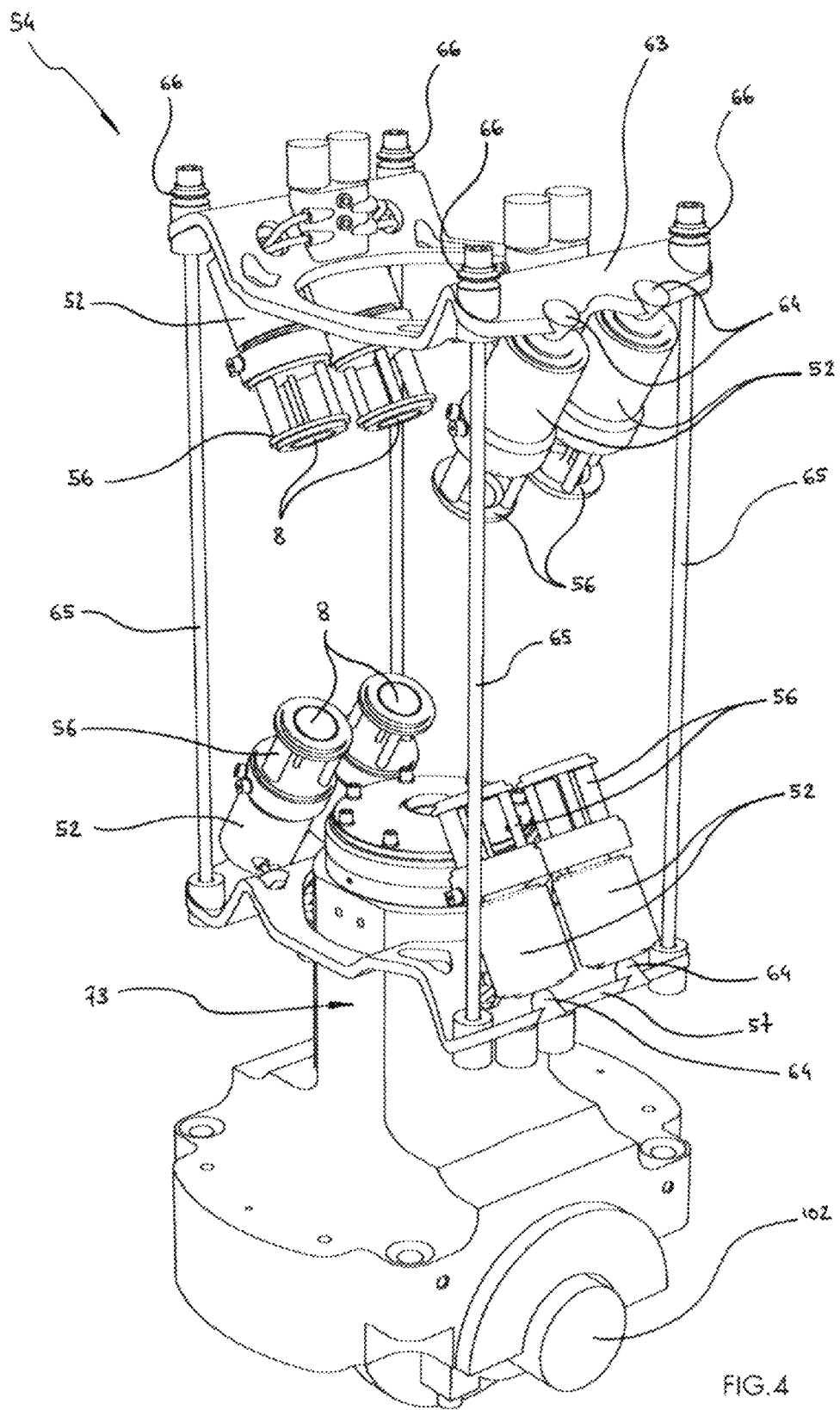
FIG. 4 is a three-dimensional view of the expansion cylinder assembly shown in FIG. 3 from which various members have been removed so as to be able to distinguish more clearly the actuator cartridges of the regenerative valve hydraulic actuator according to the invention, the lower and upper cartridge retention plates, and the plate tie-rods which tend to move said retention plates toward one another so as to hold said actuator cartridges pressed onto their respective cylinder head via the plate abutment with which they cooperate.

Note that the high-pressure hydraulic feed pump 2 can for example be driven in rotation by transmission means 102 as shown in FIGS. 2 to 4. Said pump 2 may further be a piston type pump, a gear type pump, a vane type pump or a pump of any other type known to the person skilled in the art, whilst the high-pressure accumulator 5 can be of the piston type, the membrane type, the mechanical or pneumatic spring type, or of any type also known to the person skilled in the art.

FIGS. 1 and 2, FIGS. 5 to 12, FIGS. 16 to 20, and FIGS. 25 and 26 also illustrate that the regenerative valve hydraulic actuator 1 according to the invention comprises at least one actuator 6 which comprises an actuator cylinder 25 capped by an actuator cylinder head 49, said cylinder 25 being fixed directly or indirectly to the compressor or engine cylinder head 104.

In said figures, it is seen that the actuator cylinder 25 and the actuator cylinder head 49 form with an actuator piston 26 an actuator hydraulic chamber 7, said piston 26 being mechanically connected by transmission means 9 to the valve 8, said means 9 being such that if the actuator hydraulic chamber 7 is subjected to a pressure exerted by the hydraulic fluid 3, the actuator piston 26 tends to move said valve 8 away from the valve seat 11 with which it cooperates or vice versa, to move said valve 8 toward the valve seat 11.

Note that the line orifice 10 may be interchangeably provided in the intake line 106 and/or in the exhaust or discharge line 107 so that the valve 8 prevents the passage of any gas in said line 106, 107 when it is resting on its valve seat 11.

Figure 1:
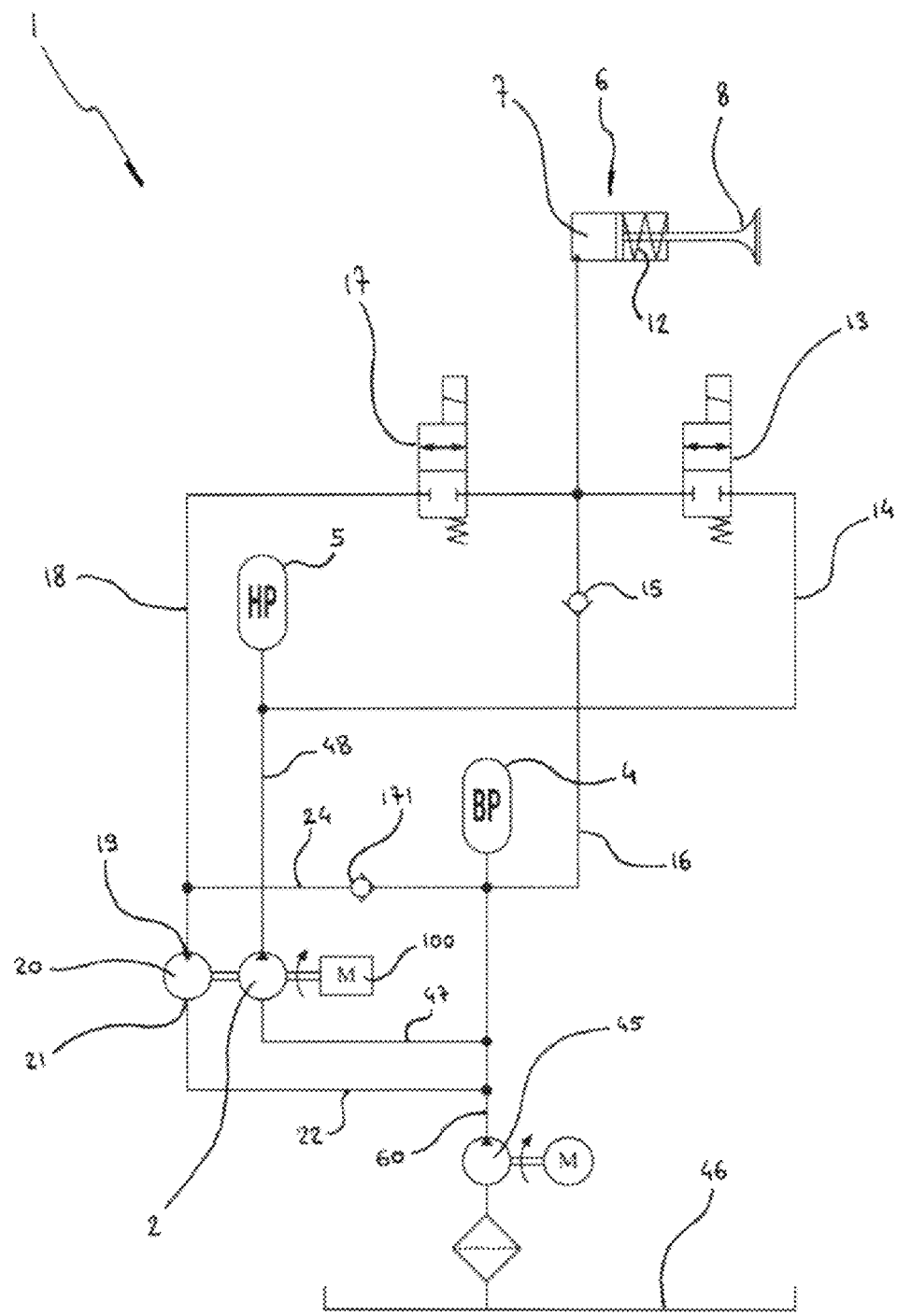
FIG. 1 is a theoretical diagram of the regenerative valve hydraulic actuator according to the invention which includes by way of one variant an end of expansion check valve and a freewheel channel, said diagram utilizing the symbols usually employed to describe hydraulic circuits and units.

As shown in a particularly clearly visible manner in FIGS. 1 and 2, in FIGS. 5 to 12, and in FIGS. 16 to 20, the regenerative valve hydraulic actuator 1 according to the invention comprises at least one valve return device 12 which exerts on the valve 8 a force in the opposite direction to that which the actuator 6 is able to produce, said device 12 therefore tending to return the valve 8 into contact with the valve seat 11 with which it cooperates or, according to the circumstances, to move it away from said seat 11, said return device 12 being able to be for example a helical spring known in itself as ordinarily used to return to contact with their seat the valves of reciprocating internal combustion engines.

Figure 20:
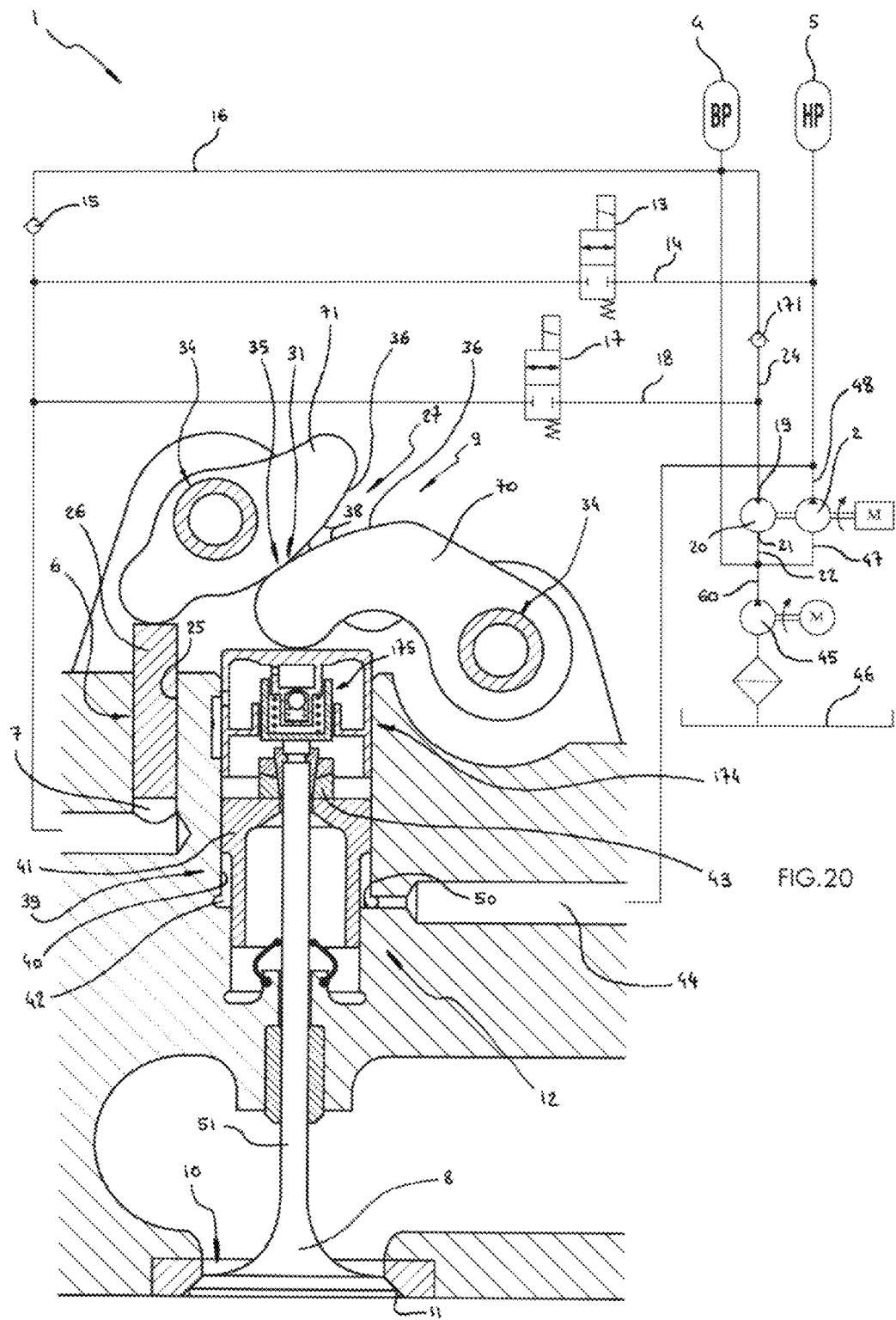
FIG. 20 is a diagrammatic view of one particular embodiment of the regenerative valve hydraulic actuator according to the invention in which the valve opens toward the interior of the compression or combustion chamber, the valve return device consisting of a valve return actuator which is coaxial with said valve and the return actuator piston of which is fastened to the valve stem whilst valve actuator tongue forms a part of the progressive lever arm ratio lever.

In FIG. 1, in FIGS. 5 to 12 and in FIG. 20, it is seen that the regenerative valve hydraulic actuator 1 according to the invention comprises at least one valve lifter hydraulic valve 13 which is able to open or close a high-pressure lifter line 14 which connects the high-pressure accumulator 5 to the actuator hydraulic chamber 7.

It is moreover seen that opening the valve lifter hydraulic valve 13 enables the valve 8 to be lifted off the valve seat 11 with which it cooperates, and said valve 8 then to be moved away from said seat 11 until the required flow section is attained at the level of the line orifice 10.

By way of example, the valve lifter hydraulic valve 13 may be a solenoid valve of any type known to the person skilled in the art, controlled by a computer. Note also that if a plurality of valves 8 must be lifted simultaneously from their seat following the simultaneous connection of their respective actuator hydraulic chamber 7 with the same high-pressure accumulator 5 by their respective valve lifter hydraulic valve 13, said valves 8 may be connected in common to said accumulator 5 via a flow divider known in itself which guarantees that said valves 8 are each lifted from the valve seat 11 with which it cooperates at the same speed, and at the same time.

FIG. 1, FIGS. 5 to 12, FIG. 20 and FIGS. 24 to 27 moreover illustrate that the regenerative valve hydraulic actuator 1 according to the invention comprises at least one lifter check valve 15 in an inertial lifter line 16 which connects the low-pressure accumulator 4 or the fluid tank 46 to the actuator hydraulic chamber 7, said valve 15 allowing the hydraulic fluid 3—via said line 16—to flow from the low-pressure accumulator 4 or the fluid tank 46 to the actuator hydraulic chamber 7, but not in the opposite direction, said valve 15 being able to consist of a ball held pressed onto its seat by a spring.

In FIG. 1, in FIGS. 5 to 12 and in FIG. 20, it is seen that the regenerative valve hydraulic actuator 1 according to the invention comprises at least one valve closure hydraulic valve 17 which is able to open or to close a closure and regeneration line 18 which connects the actuator hydraulic chamber 7 with a fluid intake 19 which a closure and regeneration hydraulic motor 20 includes, a fluid outlet 21 which said motor 20 also includes being connected with the low-pressure accumulator 4, or with the fluid tank 46, or with any type of low-pressure accumulator by a hydraulic motor low-pressure return line 22.

It is seen that opening the valve closure hydraulic valve 17 allows the valve 8 to replace the valve 8 on the valve seat 11 with which it cooperates. By way of example, said valve 17 may be a solenoid valve of any type known to the person skilled in the art, controlled by a computer.

Note that the closure and regeneration hydraulic motor 20 may be of piston type, gear type, vane type, or of any type known to the person skilled in the art.

Note also that if a plurality of valves 8 must be simultaneously replaced on their seat by the closure and regeneration hydraulic motor 20, said valves 8 may be connected in common to said motor 20 via flow divider known in itself which guarantees that said valves 8 all return into contact with the valve seat 11 with which they cooperate at the same speed, and at the same time.

The shaft or mechanical transmission device which drives the closure and regeneration hydraulic motor 20 may advantageously and simultaneously drive the high-pressure hydraulic feed pump 2 and/or the low-pressure hydraulic force-feed pump 45, said two pumps 2, 45 being for example able to consist of at least one cam which cooperates with at least one piston which forms with a cylinder a chamber provided with intake and discharge valves.

Figure 24:
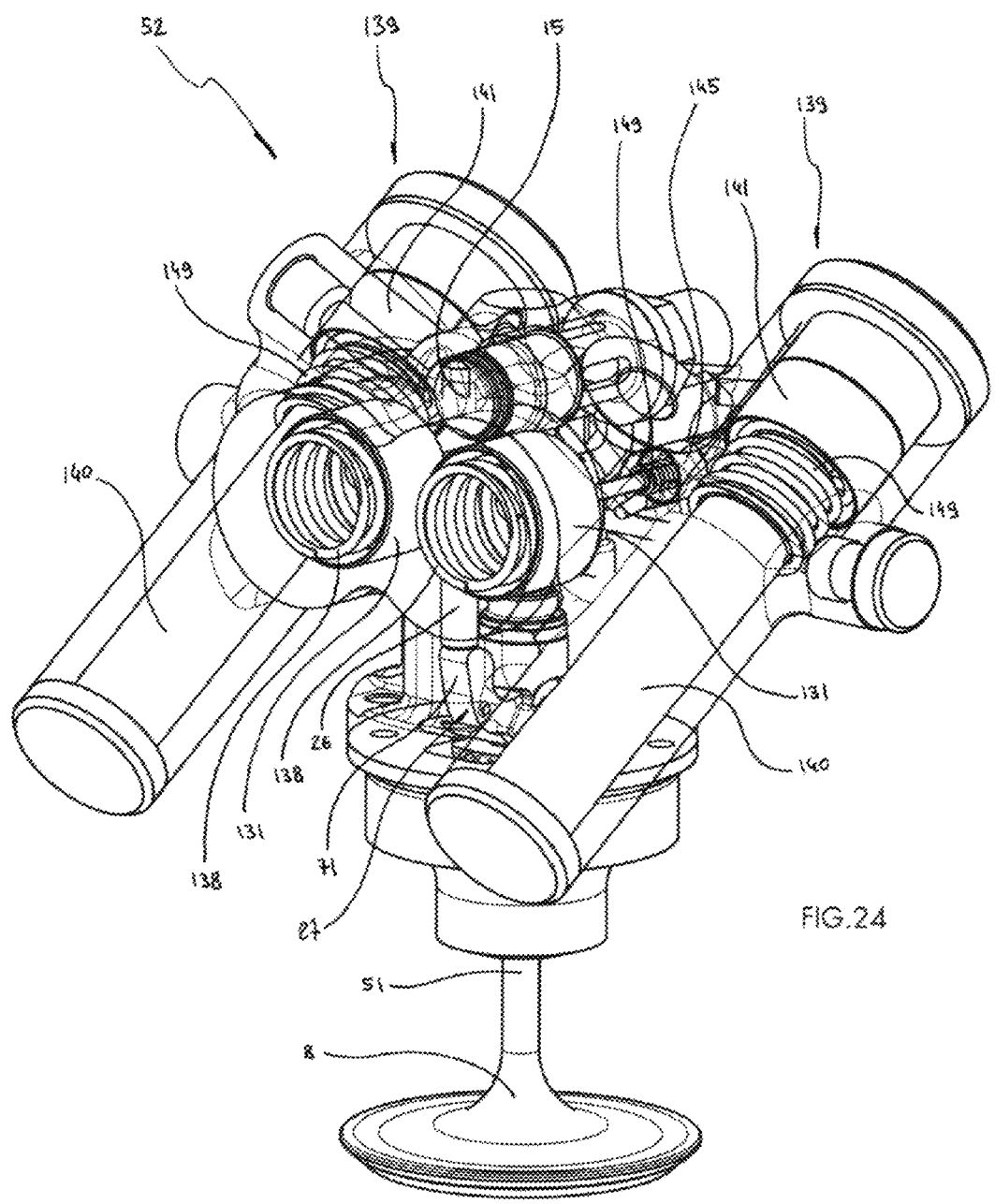
FIG. 24 is a three-dimensional phantom view of the actuator cartridge of the regenerative valve hydraulic actuator according to the invention, the valve lifter hydraulic valve and the valve closure hydraulic valve consisting of a tubular valve moved in the longitudinal translation by a hydraulic amplification piezoelectric actuator.
Figure 25:
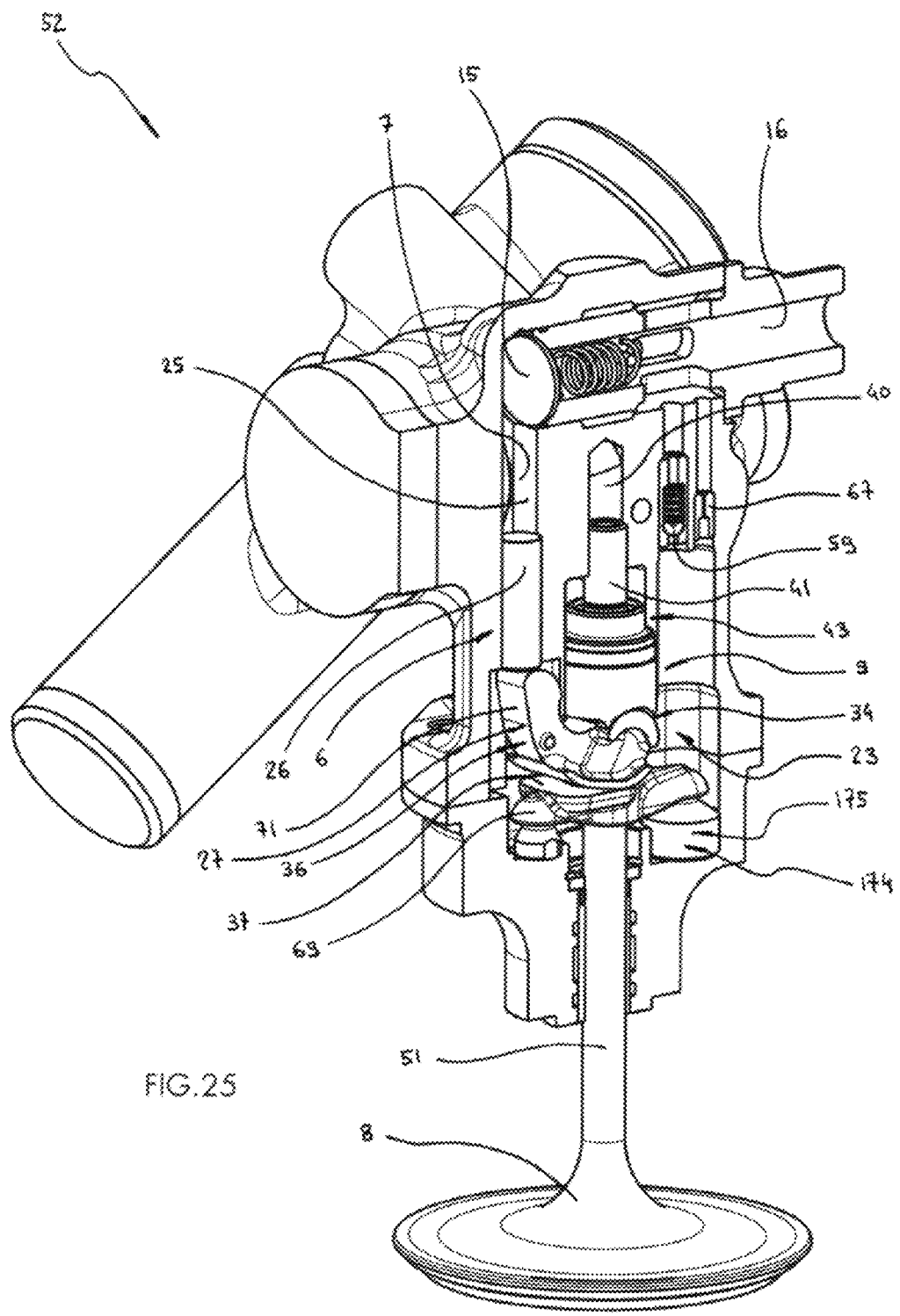
FIG. 25 is a three-dimensional sectional view of the regenerative valve hydraulic actuator according to the invention in the particular configuration shown in FIG. 24, said section particularly highlighting the main mobile or non-mobile components which cooperate directly with the valve, and the lifter check valve.
Figure 26:
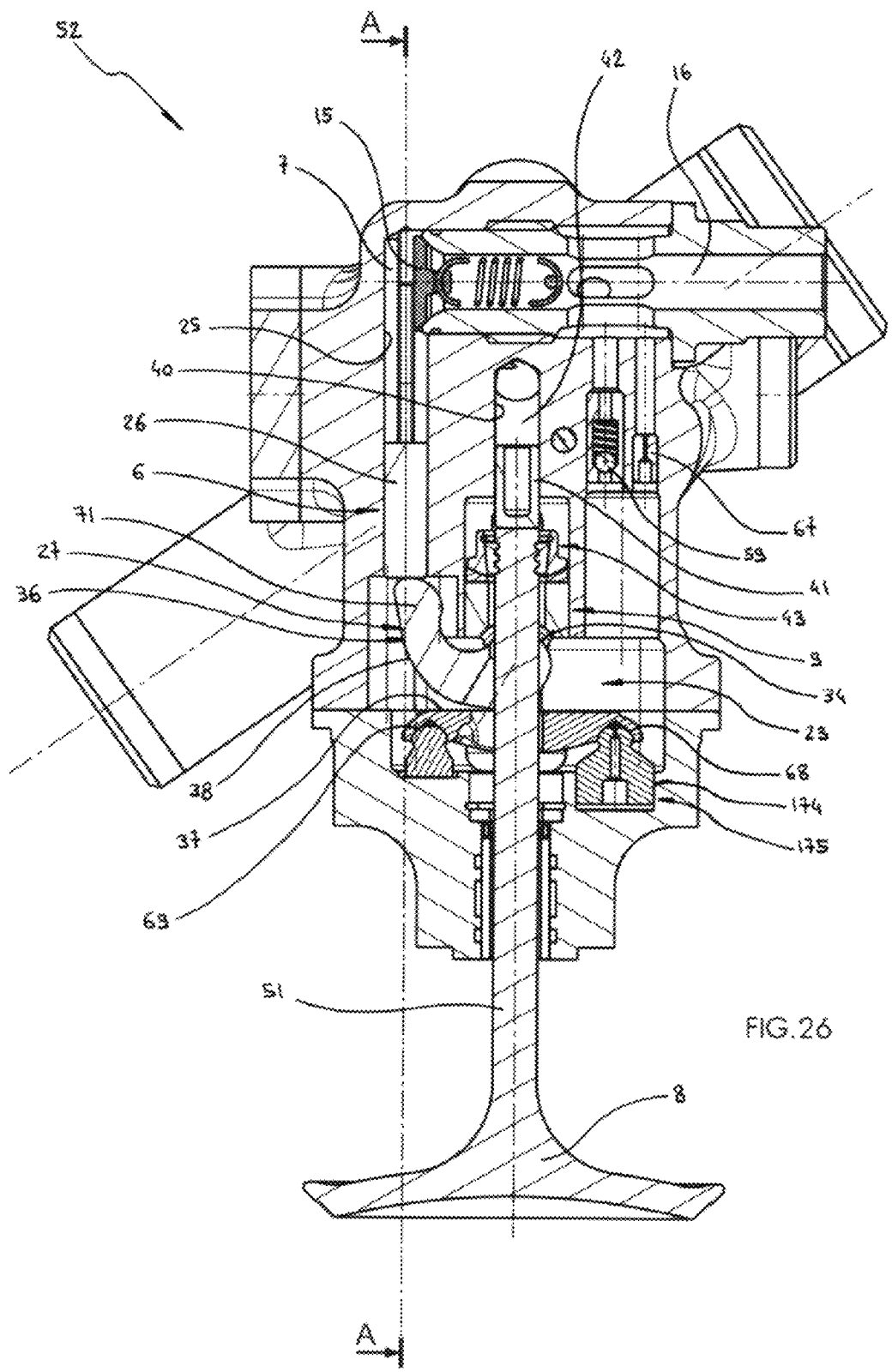
FIG. 26 is a three-dimensional sectional view of the regenerative valve hydraulic actuator according to the invention in the particular configuration shown in FIG. 24, said section particularly highlighting the main mobile or non-mobile components which cooperate directly with the valve, and the lifter check valve.
Figure 27:
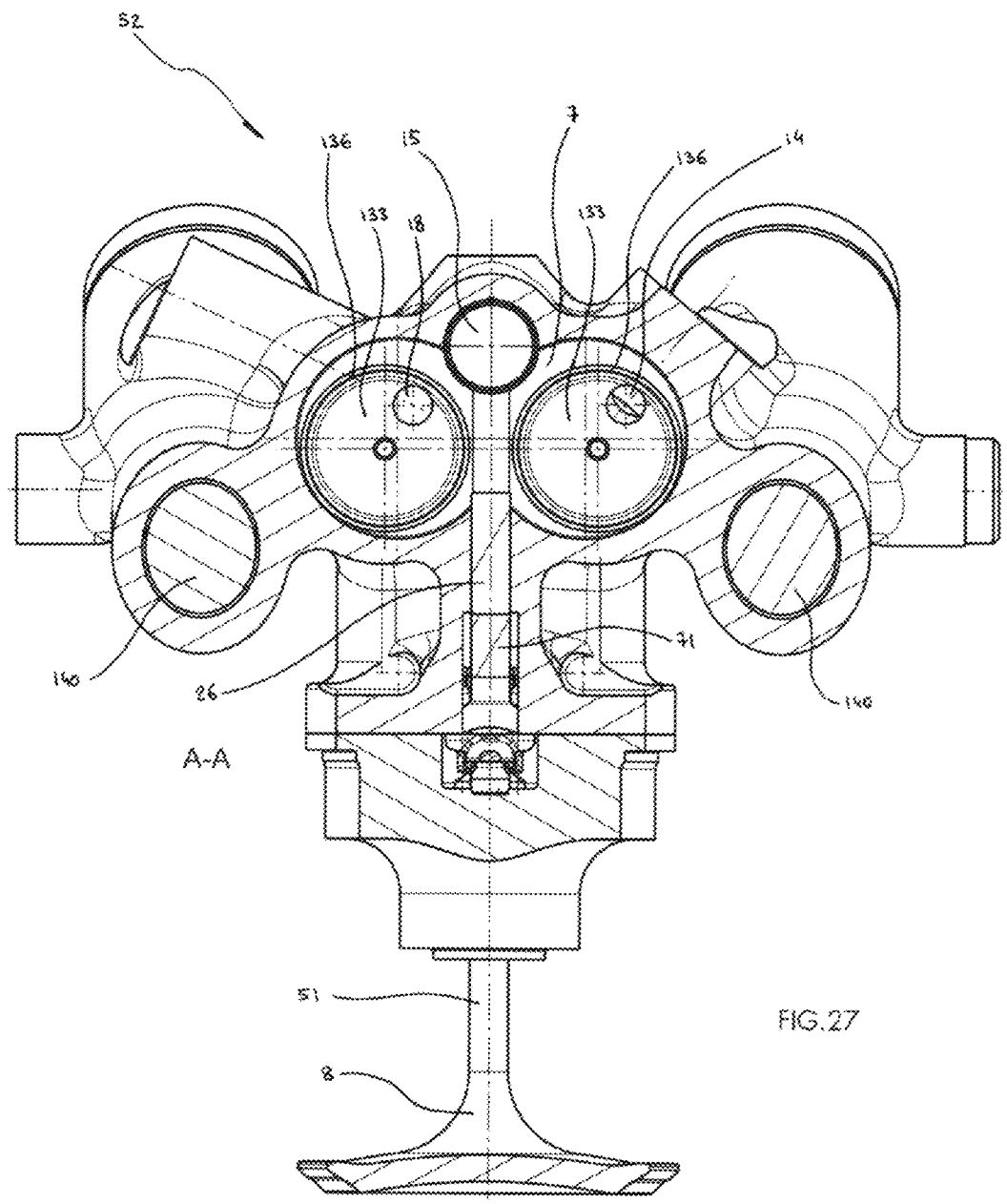
FIG. 27 is a view in cross section of the regenerative valve hydraulic actuator according to the invention in accordance with the particular configuration shown in FIG. 24, said section being perpendicular to that shown in FIG. 26 and highlighting the actuator hydraulic chamber.

In FIG. 2, in FIGS. 5 to 13, in FIGS. 16 to 20 and in FIGS. 24 to 26, it is seen that the regenerative valve hydraulic actuator 1 according to the invention comprises at least one progressive lever arm ratio lever 27 constituting in part or in their entirety the transmission means 9, said lever 27 exposing at least one point 28 of application of the force of the actuator at which the actuator piston 26 is able to apply a driving or resisting force either directly or indirectly, at least one point 29 of application of the force of the valve at which the valve 8 can apply directly or indirectly a driving or resisting force, and at least one point 30 of application of the reaction force on the cylinder head at which is applied directly or indirectly a force on the compressor or engine cylinder head 104.

Figure 9:
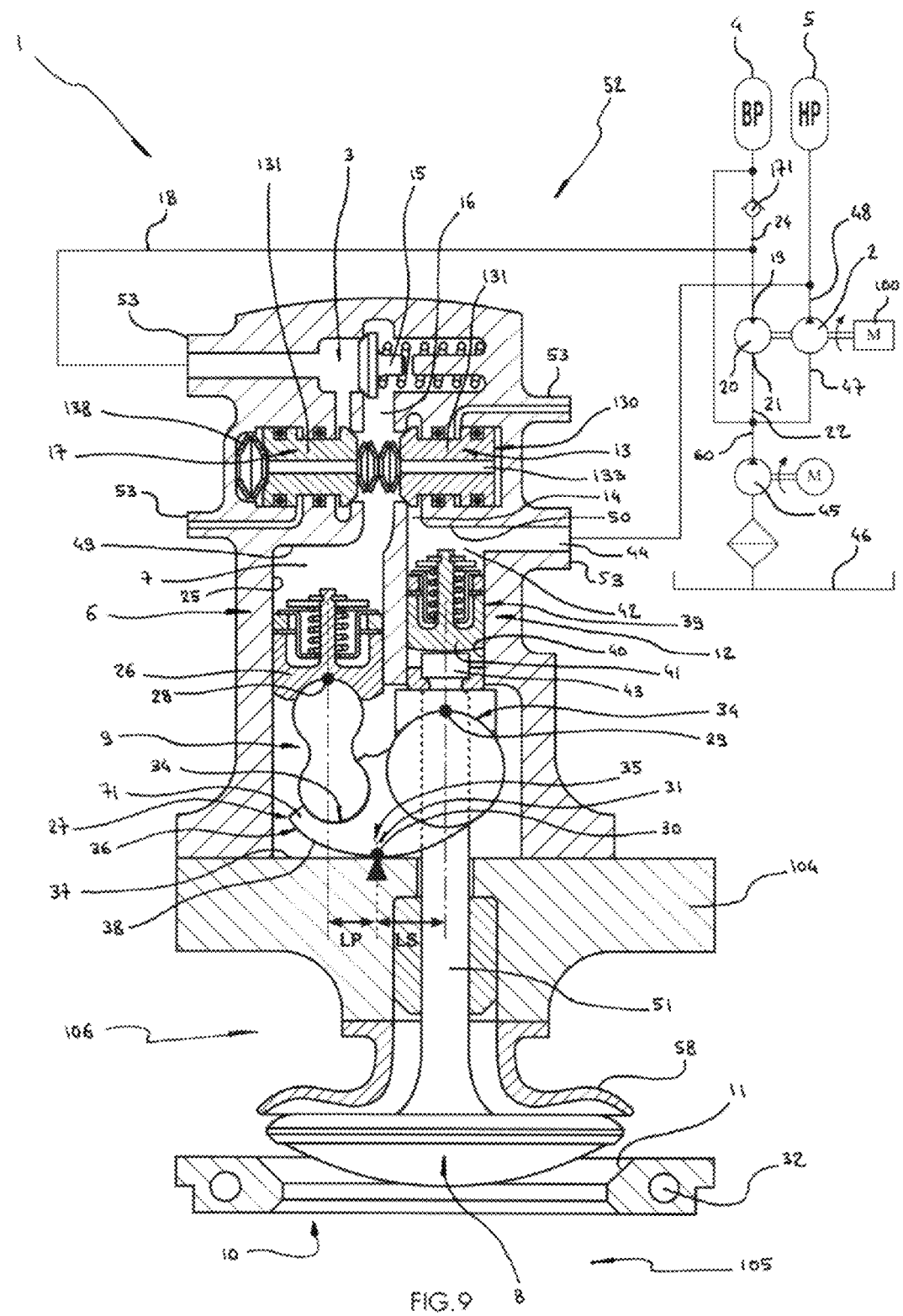

As FIG. 9 clearly shows, this configuration makes it possible to define firstly an actuator piston lever arm LP either between the point 28 of application of the actuator force and the point 29 of application of the valve force or between said point 28 of application of the actuator force and the point 30 of application of the reaction force on the cylinder head, and secondly a valve action lever arm LS between the point 29 of application of the valve force and the point 30 of application of the reaction force on the cylinder head.

It is seen in FIG. 20 in particular that the progressive lever arm ratio lever 27 may consist of a plurality of parts. In this instance, said lever 27 comprises a valve actuator tongue 70 which is articulated in the compressor or engine cylinder head 104.

As is seen in FIGS. 5 to 13 and in FIGS. 16 to 20, the regenerative valve hydraulic actuator 1 according to the invention may include means for moving the point 31 of application which move the point 28 of application of the actuator force and/or the point 29 of application of the valve force and/or the point 30 of application of the reaction force on the cylinder head along the progressive lever arm ratio lever 27 during the opening travel of the valve 8.

According to this particular configuration, the ratio between the length of the actuator piston lever arm LP and the length of the valve action lever arm LS varies as a function of the lift of the valve 8.

For example, the actuator piston lever arm LP to which the actuator piston 26 applies a force can have its greatest length when the valve 8 is near the valve seat 11 and a shorter length when said valve 8 is further away from said seat 11, the situation being exactly the opposite in the case of the valve action lever arm LS.

In other words, the progressive lever arm ratio lever 27 may advantageously be such that for a given constant speed of the actuator piston 26, the speed of lifting or of replacing the valve 8 is lower when said valve 8 is positioned in the vicinity of its position in contact with its valve seat 11 than when said valve 8 is farther away from said seat 11.

Note that in the embodiment illustrated in FIGS. 2, 5 to 13, 16 to 19 and 24 to 27, the means for moving the application point 31 may take the form of a cam-lever 71.

Note that, according to variants of the regenerative valve hydraulic actuator 1 according to the invention, the point 28 of application of the force of the actuator and/or the point 29 of application of the force of the valve and/or the point 30 of application of the reaction force on the cylinder head respectively form directly or indirectly with the actuator piston 26, and/or with the valve 8 and/or with the compressor or engine cylinder head 104 with which it cooperates either at least one pivot connection 34, or at least one rolling-sliding connecting 35, the latter constituting the means for moving the application point 31.

As an alternative, said application points 29, 29, 30 can also form a rolling connection the kinematic of which can be imposed by any type of gear device.

As seen in FIGS. 5 to 13, in FIGS. 16 to 20, and in FIGS. 25 and 26, the rolling-sliding connecting 35 may consist of at least one lever contact track 36 formed on the progressive lever arm ratio lever 27 at the level of the point 28 of application of the force of the actuator and/or the point 29 of application of the force of the valve and/or the point 30 of application of the reaction force on the cylinder head, said track 36 cooperating with a lever reaction surface 37 respectively formed directly or indirectly on the actuator piston 26 and/or on the valve 8 and/or on the compressor or engine cylinder head 104, said track 36 and/or said surface 37 having a curved contact profile 38 on which is established the contact between said track 36 and said surface 37.

A result of the curved contact profile 38 is that when the valve 8 moves toward or away from the valve seat 11 with which it cooperates, the rolling-sliding connection is moved along the progressive lever arm ratio lever 27 which for example and as illustrated in FIG. 9 increases the actuator piston lever arm LP and/or reduces the valve action lever arm LS, or vice versa.

Note that—as shown more particularly in FIGS. 5 to 12, 17 to 20 and 25 and 26—the valve return device 12 of the regenerative valve hydraulic actuator 1 according to the invention may consist of a valve return actuator 39 which comprises a return actuator cylinder 40 capped by a return actuator cylinder head 50, said cylinder 40 being fixed directly or indirectly to the compressor or engine cylinder head 104 whilst said cylinder 40 and the return actuator cylinder head 50 form with a return actuator piston 41 a return actuator hydraulic chamber 42, said piston 41 being mechanically connected to the valve 8 by return transmission means 43.

According to this variant, the return actuator hydraulic chamber 42 can be connected to the high-pressure accumulator 5 by a return pressure line 44. Alternatively, the valve return device 12 may consist of a valve return spring known in itself.

Note in FIG. 1, in FIGS. 5 to 12 and in FIG. 20 that the level and the pressure of the hydraulic fluid 3 that the low-pressure accumulator 4 contains can be maintained within a certain range of values by a force-feed low-pressure hydraulic pump 45 which is able to transfer said fluid 3 from the fluid tank 46 to said accumulator 4 via a low-pressure force-feed line 60.

Note that the fluid tank 46 can be a non-pressurized tank known in itself into which flow in particular leaks of hydraulic fluid 3 from any part of the regenerative valve hydraulic actuator 1 according to the invention.

FIGS. 2 to 12 and FIGS. 24 to 27 show that at least the valve 8 with or without the valve seat 11 with which it cooperates, the actuator 6, the transmission means 9, the valve return device 12, the lifter check valve 15, the valve lifter hydraulic valve 13, and the valve closure hydraulic valve 17 may be accommodated together in an actuator cartridge 52 which exposes at least one hydraulic connector 53.

Note that if—as shown in FIGS. 3 and 4—the actuator cartridge 52 is mounted on the expansion cylinder assembly 54 of the transfer-expansion and regeneration engine the French patent on which belonging to the applicant has been published under the number FR 3 032 236, the actuator cartridge 52 may notably include a valve cage 56 accommodated in the expansion cylinder lower cylinder head 33 and the expansion cylinder upper cylinder head 61 which said assembly 54 comprises.

In this case, the valve 8 may be guided directly or indirectly in said cage 56 which moreover accommodates the valve seat 11, the latter and/or the part of the valve cage 56 which guides the valve 8 being able to be cooled by a valve cooling circuit 32 in which a heat transfer fluid circulates as shown in FIGS. 5 to 12.

Note that in this context, and as also represented in FIGS. 5 to 12, a valve stem 51 which the valve 8 includes may advantageously be protected by a valve thermal screen 58 which limits the quantity of heat received by the valve 8, said heat having to be evacuated by the heat transfer fluid.

As FIGS. 5 to 12 and 21 to 24 show, the valve lifter hydraulic valve 13 and/or the valve closure hydraulic valve 17 may consist of a tubular valve 130 which comprises a blocking tube 131 which can be moved in longitudinal translation by a tube actuator 137, said tube 131 being accommodated in fluid-tight manner in a blocking tube bore 181 and ending at a tube sealing bearing surface 135 which can either rest on a tube seat 136 to form with the latter a continuous line of fluid-tight contact or be maintained at a certain distance from said seat 136 to allow hydraulic fluid 3 to flow from a tube internal volume 133 to a tube external collector-distributor 134 or vice versa.

Note that the tube sealing bearing surface 135 can be maintained either in contact with the tube seat 136 or at a distance from said seat 136 by a tube return spring 138 depending on whether the tubular valve 130 is respectively of "normally closed" or "normally open" type. Note also that the tube actuator 137 can be interchangeably electrical, electromagnetic, piezoelectric, pneumatic, hydraulic, or of any type known to the person skilled in the art.

As has been shown in FIGS. 21 to 27, the tube actuator 137 can be a hydraulic amplification piezoelectric actuator 139 which comprises a stack of ceramic elements 140 that are deformed mechanically when they are subjected to an electric field, the end of said stack 140 being connected to an actuator sensor piston 141 of large diameter which forms—with an actuator sender cylinder 142—an actuator sender chamber 143 which communicates with at least one actuator receiver chamber 144, the latter being formed on the one hand by an actuator receiver piston 145 of small diameter which is connected directly or indirectly to the blocking tube 131 with which it cooperates so as to be able to move the latter in longitudinal translation and on the other hand by an actuator receiver cylinder 142.

Note that the ratio between the section of the actuator sender piston 141 and the section of the actuator receiver piston 145 determines the ratio of amplification of the movement of the hydraulic amplification piezoelectric actuator 139.

According to this variant of the regenerative valve hydraulic actuator 1 according to the invention, the actuator sender chamber 143 and the actuator receiver chamber 144 may be together connected with a pressurized hydraulic fluid source 147 by an actuator force-feed check valve 148 which allows hydraulic fluid 3 to flow from said source 147 to said chambers 143, 144 and not vice versa. The pressurized hydraulic fluid source 147 can advantageously be the low-pressure accumulator 4.

Figure 21:
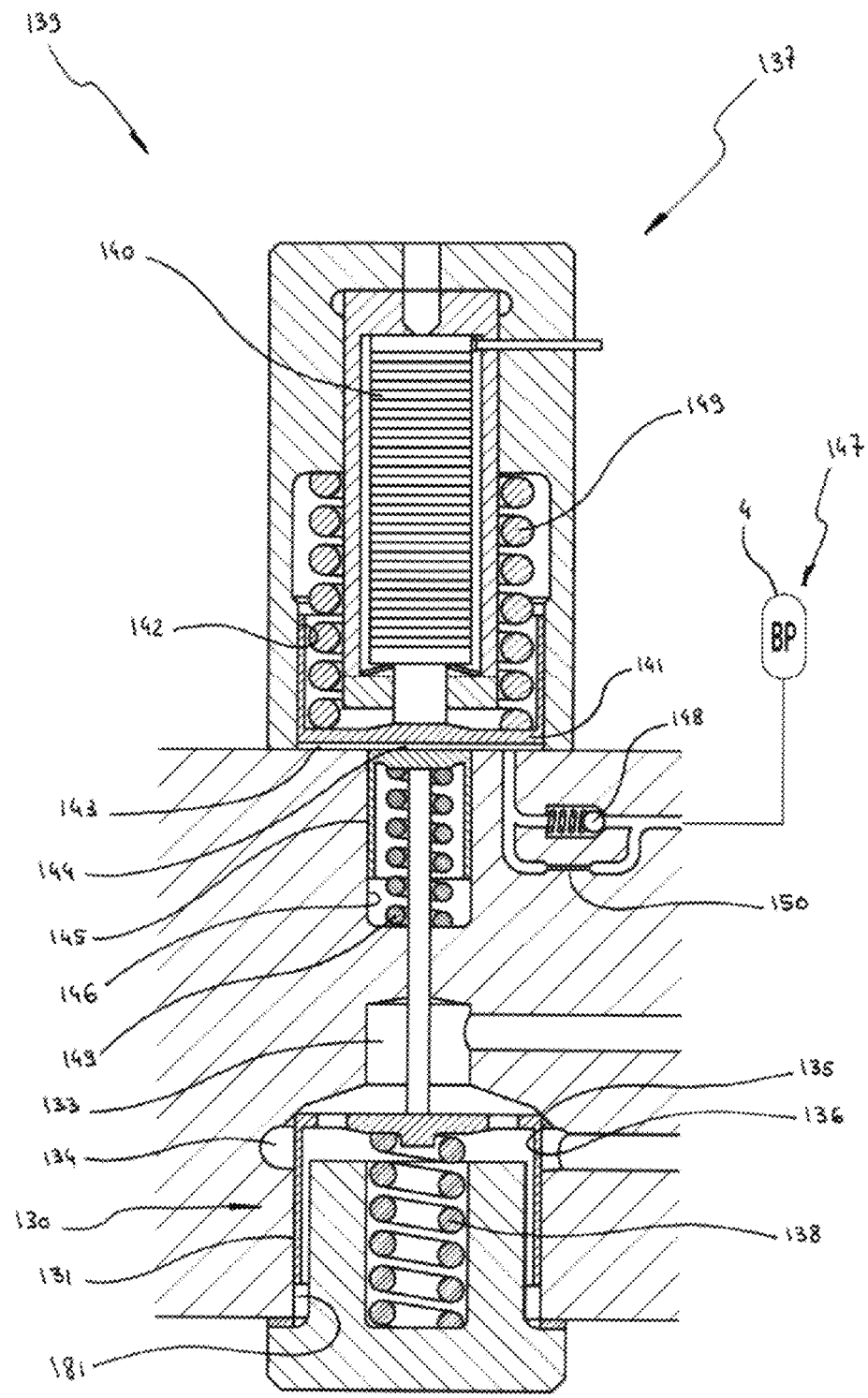
FIGS. 21 and 22 are diagrammatic sectional views of the hydraulic amplification piezoelectric actuator provided as a variant of the tube actuator by the regenerative valve hydraulic actuator according to the invention, said FIGS. 21 and 22 representing the blocking tube respectively resting on the tube seat with which it cooperates, then held at a certain distance from said seat to allow the hydraulic fluid to pass from the internal volume of the tube to the tube external collector-distributor.
Figure 22:
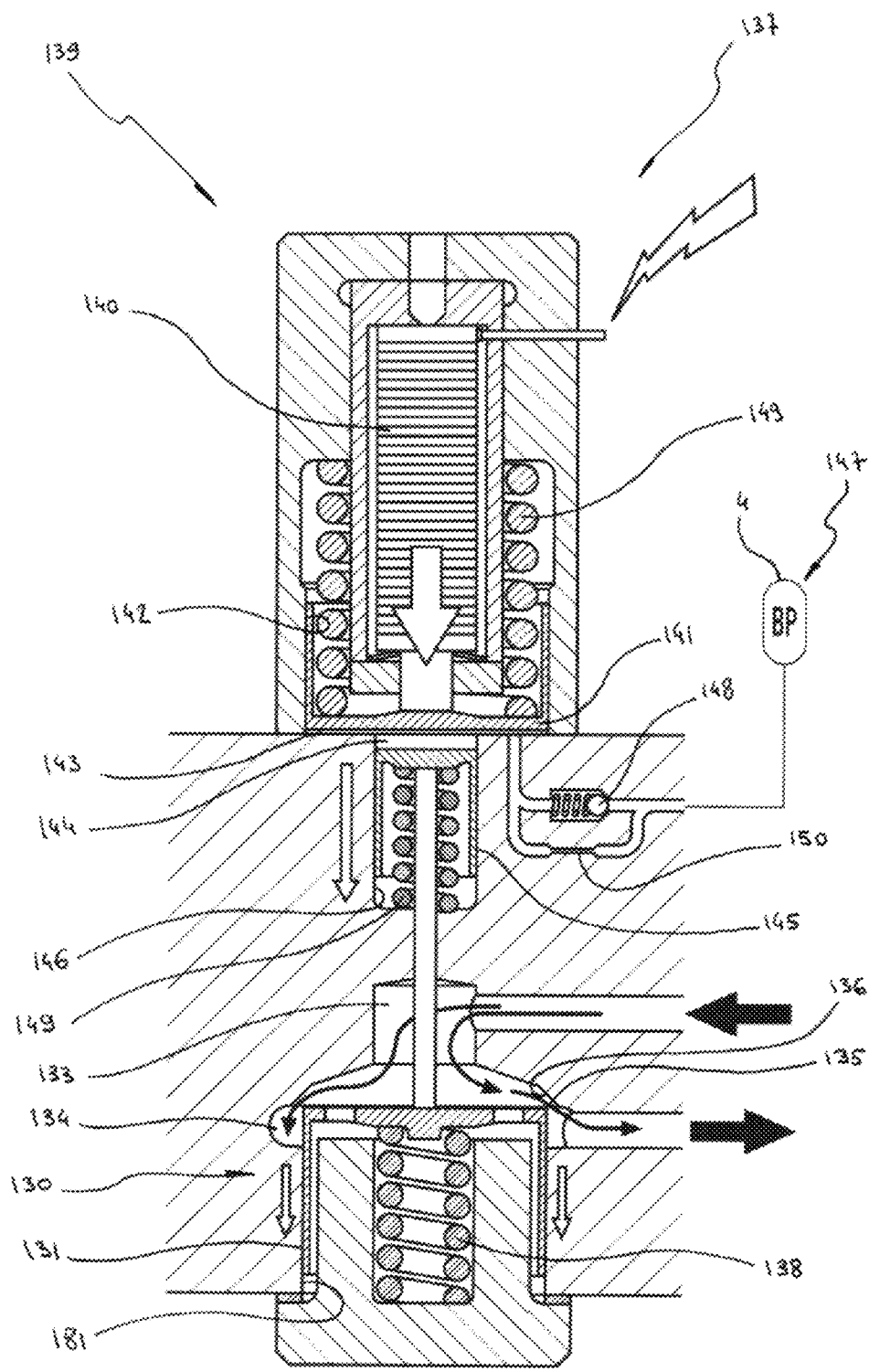
Figure 23:
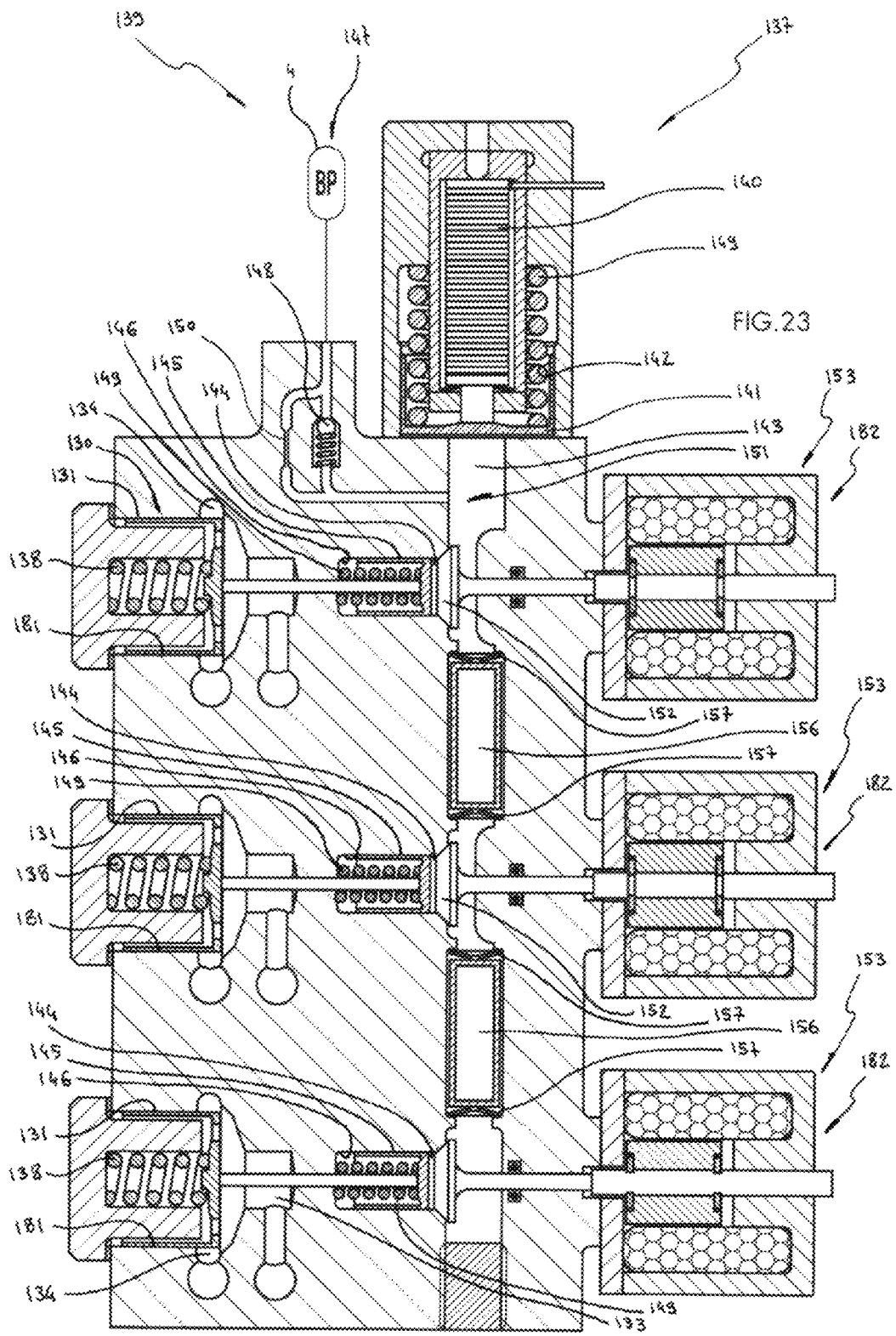
FIG. 23 is a diagrammatic sectional view of the hydraulic amplification piezoelectric actuator that the regenerative valve hydraulic actuator according to the invention can comprise, the actuator sender chamber of said piezoelectric actuator being able to communicate via a lever chamber common manifold with a plurality of actuator receiver chambers which can each be put into communication or not with said manifold by a selection valve.

As FIGS. 21 to 23 show, an anti-drift nozzle 150 can be placed in parallel with the actuator force-feed check valve 148, said nozzle 150 allowing the hydraulic fluid 3 to flow from the pressurized hydraulic fluid source 147 to said chambers 143, 144 or vice versa, whilst said nozzle 150 forms a constriction through which only a low flow rate of hydraulic fluid 3 can pass.

It is seen in FIGS. 21 to 24 that the actuator sender piston 141 can receive a pressure compensation spring 149 which tends to move it toward the actuator sender chamber 143, the force that said spring 149 exerts on said piston 141 being less than or equal to the force that the hydraulic fluid 3 exerts on said piston 141 when the pressure in the actuator sender chamber 143 is equal to that in the pressurized hydraulic fluid source 147.

In the same said FIGS. 21 to 24, it is seen that the actuator receive piston 145 is able to receive a pressure compensation spring 149 which tends to move it toward the actuator receiver chamber 144, the force that said spring 149 exerts on said piston 145 being less than or equal to the force which the hydraulic fluid 3 exerts on said piston 145 when the pressure in the actuator receiver chamber 144 is equal to that in the pressurized hydraulic fluid source 147.

FIG. 23 shows that according to one variant of the regenerative valve hydraulic actuator 1 according to the invention, the actuator sender chamber 143 is able to communicate via a common receiver chamber manifold 151 with a plurality of actuator receiver chambers 144, the actuator receiver piston 145 forming each of said receiver chambers 144 being able in this case to move a blocking tube 131 of its own in longitudinal translation.

Note that, according to the variant shown in FIG. 23, the actuator receiver chambers 144 can each be placed in communication or not with the receiver chamber common manifold 151 by a selection valve 152 the opening of which is controlled by a selection valve actuator 153.

Accordingly, for the stack of ceramic elements 140 to be able to move in longitudinal translation the blocking tube 131 corresponding to an actuator receiver chamber 144, it is necessary that beforehand the selection valve 152 that cooperates with said chamber 144 places the latter in communication with the receiver chamber common manifold 151.

This particular configuration of the regeneration valve hydraulic actuator 1 according to the invention enables for example the use of only one stack of ceramic elements 140, very fast but deemed costly and bulky to maneuver in succession a plurality of blocking tubes 131, said tubes 131 being selected by means of selection valve actuators 153 that are undoubtedly slower, but less costly and less bulky, such as solenoid actuators 182.

By way of nonlimiting example, this particular strategy is of full benefit in the context of a Diesel or Beau de Rochas cycle reciprocating internal combustion engine with multiple cylinders in which the intake and/or exhaust valves 8 are actuated in succession with a high angular offset. Said offset is for example of one hundred and eighty degrees of rotation of the crankshaft in the case of a four-cylinder engine.

Still in accordance with the variant shown in FIG. 23, note that the receiver chamber common manifold 151 is able to accommodate in non-fluid tight manner at least one solid or hollow non-compressible cylindrical element 156 which is maintained centered in the vicinity of a certain longitudinal position relative to the receiver chamber common manifold 151 by at least two oppositely acting centering springs 157.

Note that said element 156 preferably consists of a material that is both relatively non-compressible—that is to say the modulus of elasticity of which is high, and of low density. Said element 156 in particular enables the use of a receiver chamber common manifold 151 of large inside diameter which enables limitation of the head loss that said manifold 151 produces when the hydraulic fluid 3 flows, and this without having to suffer the high compressibility that would otherwise be induced by a large volume of hydraulic fluid 3 inside said manifold 151.

Accordingly, when the actuator sender piston 141 expels hydraulic fluid 3 from the actuator sender chamber 143, the non-compressible cylindrical element 156 accompanies the hydraulic fluid 3 in at least part of its movement by moving freely in the receiver chamber common manifold 151. Once the maneuver of opening and/or closing the corresponding blocking tube 131 has been completed, the non-compressible cylindrical element 156 is returned to the vicinity of its initial position by the conjugate action of the two oppositely acting centering springs 157 with which it cooperates.

In FIGS. 28 to 35, it has been shown that the closure and regeneration hydraulic motor 20 of the regenerative valve hydraulic actuator 1 according to the invention may comprise a closure and regeneration cam 158 mounted on a hydraulic motor shaft 163 which is driven—directly or indirectly—in rotation by the reciprocating piston compressor or engine 100 or by any means associated with said compressor or engine 100, a closure and regeneration piston 159 bearing directly or indirectly on said cam 158 and forming—with a closure and regeneration cylinder 160—a closure and regeneration chamber 161 which communicates with the fluid intake 19.

Figure 34:
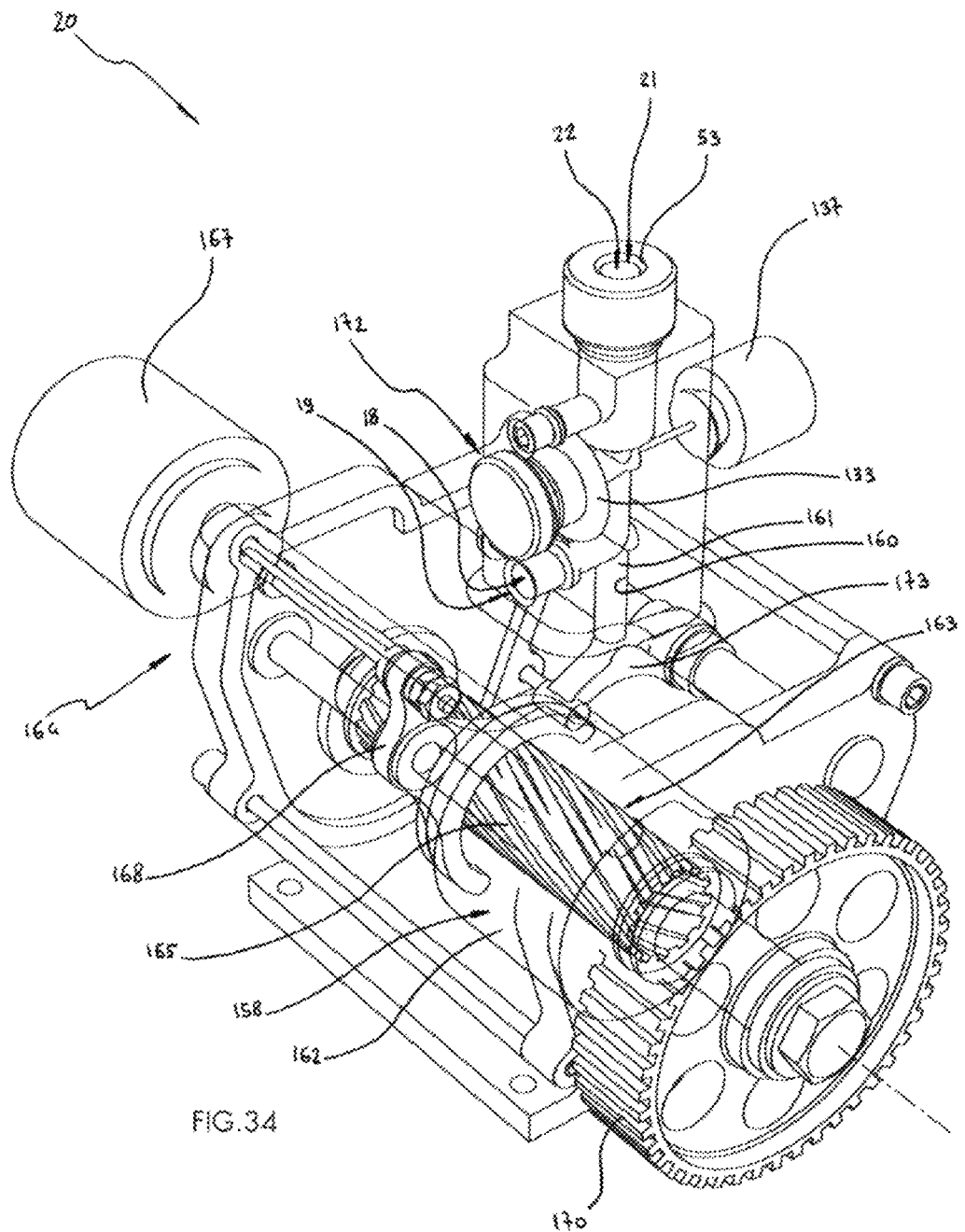
FIG. 34 is a three-dimensional phantom view of the closure and regeneration hydraulic motor of the regenerative valve hydraulic actuator according to the invention shown in FIGS. 29 to 33.
Figure 35:
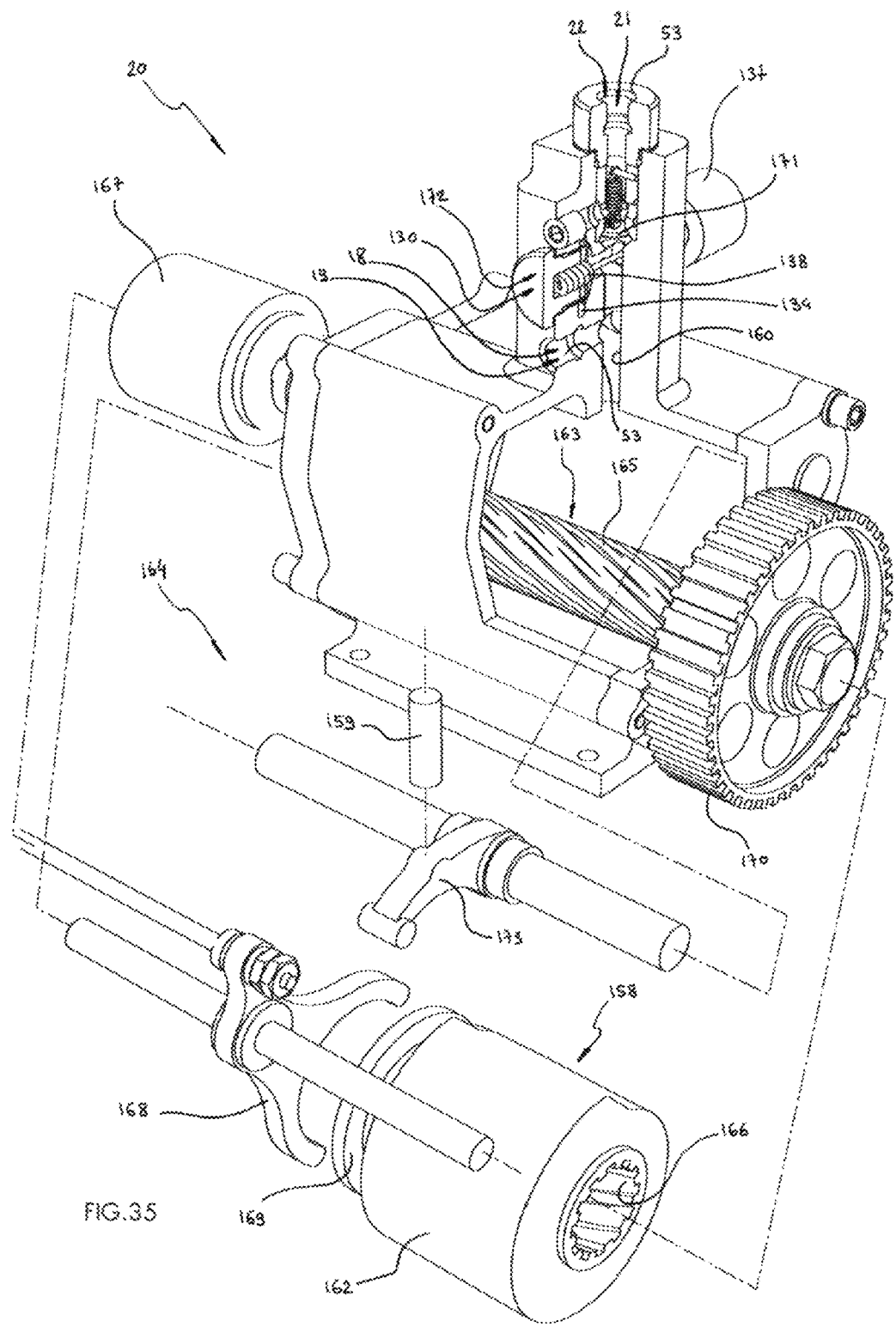
FIG. 35 is a three-dimensional and cut away exploded view of the closure and regeneration hydraulic motor of the regenerative valve hydraulic actuator according to the invention shown in FIGS. 29 to 33.

As shown in FIGS. 34 and 35, the hydraulic motor shaft 163 can be driven in rotation by the reciprocating piston compressor or engine 100 via a hydraulic motor pulley 170 driven by a belt or a chain, by gears or by any mechanical, electrical or hydraulic transmission whether of fixed or variable ratio.

Note also that—as shown in FIGS. 29 to 35—the closure and regeneration piston 159 can bear on the closure and regeneration cam 158 via a closure and regeneration tongue 173.

Figure 28:
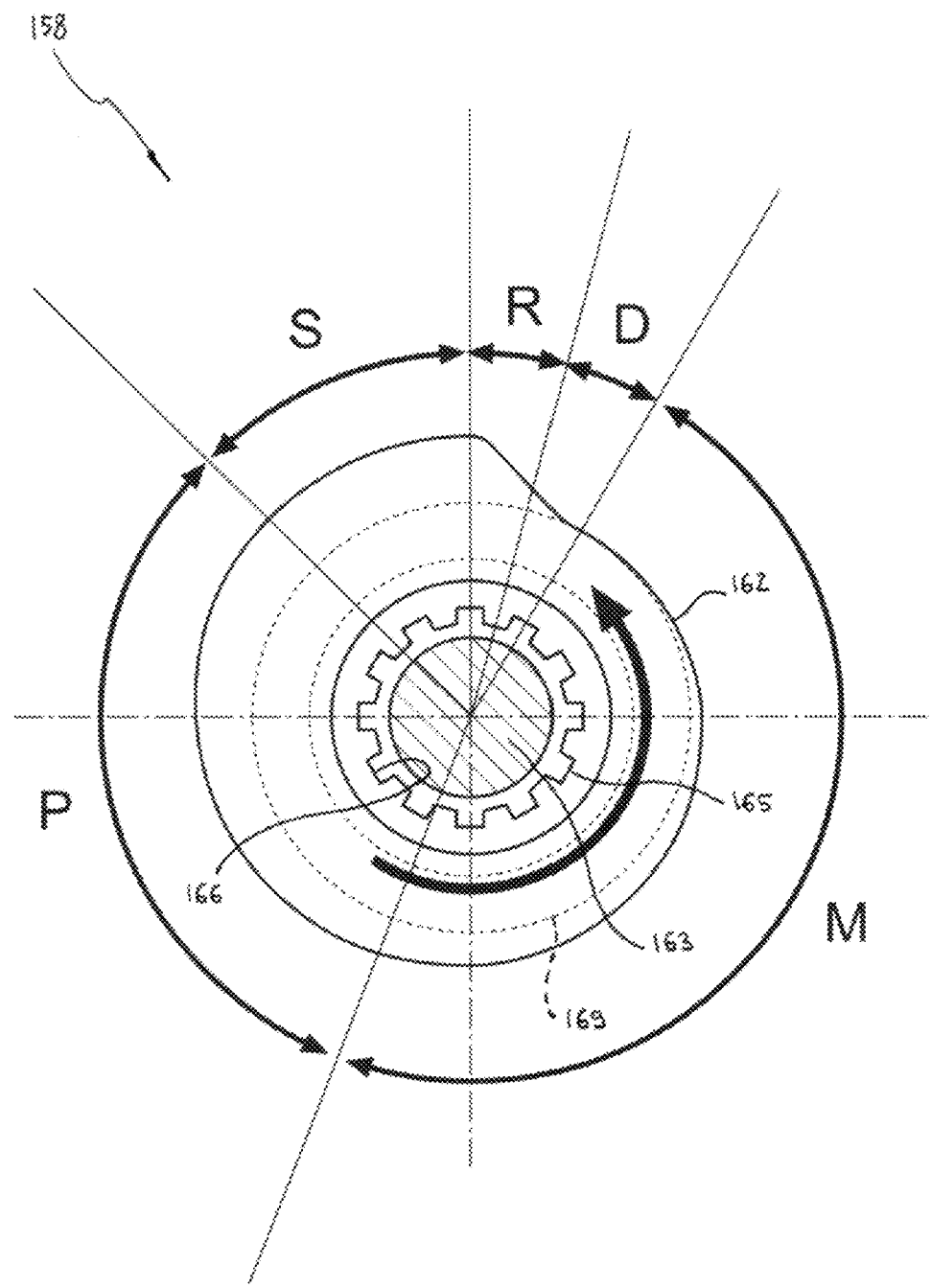
FIG. 28 is a diagrammatic sectional view of the closure and regeneration cam that the closure and regeneration hydraulic motor of the regenerative valve hydraulic actuator according to the invention can comprise, said figure showing the various angular sectors that the closure and regeneration cam profile can expose on which the closure and regeneration piston bears.

FIG. 28 shows that the closure and regeneration cam 158 can expose a closure and regeneration cam profile 162 which includes at least one regeneration angular sector R on which the closure and regeneration piston 159 bears to return the valve 8 onto the valve seat 11.

Moreover, the closure and regeneration cam 158 can expose a closure and regeneration cam profile 162 which includes at least one precompression angular sector P on which the closure and regeneration piston 159 bears to precompress the closure and regeneration line 18 between two returns of the valve 8 onto the valve seat 11.

In FIGS. 29 to 35, it has been shown that the closure and regeneration cam 158 can be offset angularly relative to the hydraulic motor shaft 163 by cam phase-shifting means 164.

In these same figures, note that the cam phase-shifting means 164 may consist of at least one male helical spline 165 formed on the cylindrical external face of the hydraulic motor shaft 163 which cooperates with at least one female helical spline 166 formed inside the closure and regeneration cam 158, the latter being movable and then retained in place axially relative to the hydraulic motor shaft 163 by a cam phase-shifting actuator 167 which may be a linear or rotary electric stepper motor, a hydraulic actuator, or any actuator known or not to the person skilled in the art.

It is seen in FIGS. 29 to 35 that the cam phase-shifting actuator 167 can be connected to the closure and regeneration cam 158 via a phase-shifting fork 168 which cooperates with a phase-shifting groove 169 which the closure and regeneration cam 158 includes.

In FIGS. 29 to 33 and in FIG. 35, it is seen that the closure and regeneration line 18 can include an end of expansion check valve 171 which allows hydraulic fluid 3 coming from the low-pressure accumulator 4, from the fluid tank 46, or from a pressurized hydraulic fluid source 147 to enter said line 18 via a freewheel channel 24, but not to leave it.

Note that the end of expansion check valve 171 can consist of a ball held pressed onto its seat by a spring. It will also be noted that according to a particular configuration shown in FIGS. 5 to 12 of the regenerative valve actuator 1 according to the invention, the flow of hydraulic fluid 3 that the lifter check valve 15 can allow to flow from the low-pressure accumulator 4 to the actuator hydraulic chamber 7 can pass entirely through the end of expansion check valve 171, the two check valves 15, 171 then being placed in series.

This particular arrangement has no significant consequence for the operation of the regenerative valve hydraulic actuator 1 and in particular enables a saving by eliminating the need for a hydraulic connector 53 to connect the actuator hydraulic chamber 7 with the low-pressure accumulator 4.

In FIGS. 29 to 35, it is seen that the closure and regeneration line 18 can include a precompression valve 172 which allows hydraulic fluid 3 coming from the low-pressure accumulator 4, from the fluid tank 46, or from a pressurized hydraulic fluid source 147 to enter said line 18 and/or to leave it.

According to one particular embodiment of the regenerative valve hydraulic actuator 1 according to the invention, the precompression valve 172 may consist of a tubular valve 130.

In FIGS. 13, 14, 20, 25 et 26, it is seen that the point 28 of application of the force of the actuator and/or the point 29 of application of the force of the valve and/or the point 30 of application of the reaction force on the cylinder head may include play compensation means 174.

It is also seen that the play compensation means 174 can advantageously consist of a play compensation actuator 175 inside which a play compensation chamber 176 includes a play compensation check valve 177 which allows hydraulic fluid 3 coming from the low-pressure accumulator 4, from the high-pressure accumulator 5, from the fluid tank 46, or from a pressurized hydraulic fluid source 147 to enter said chamber 176, but not to leave it.

Figure 13:
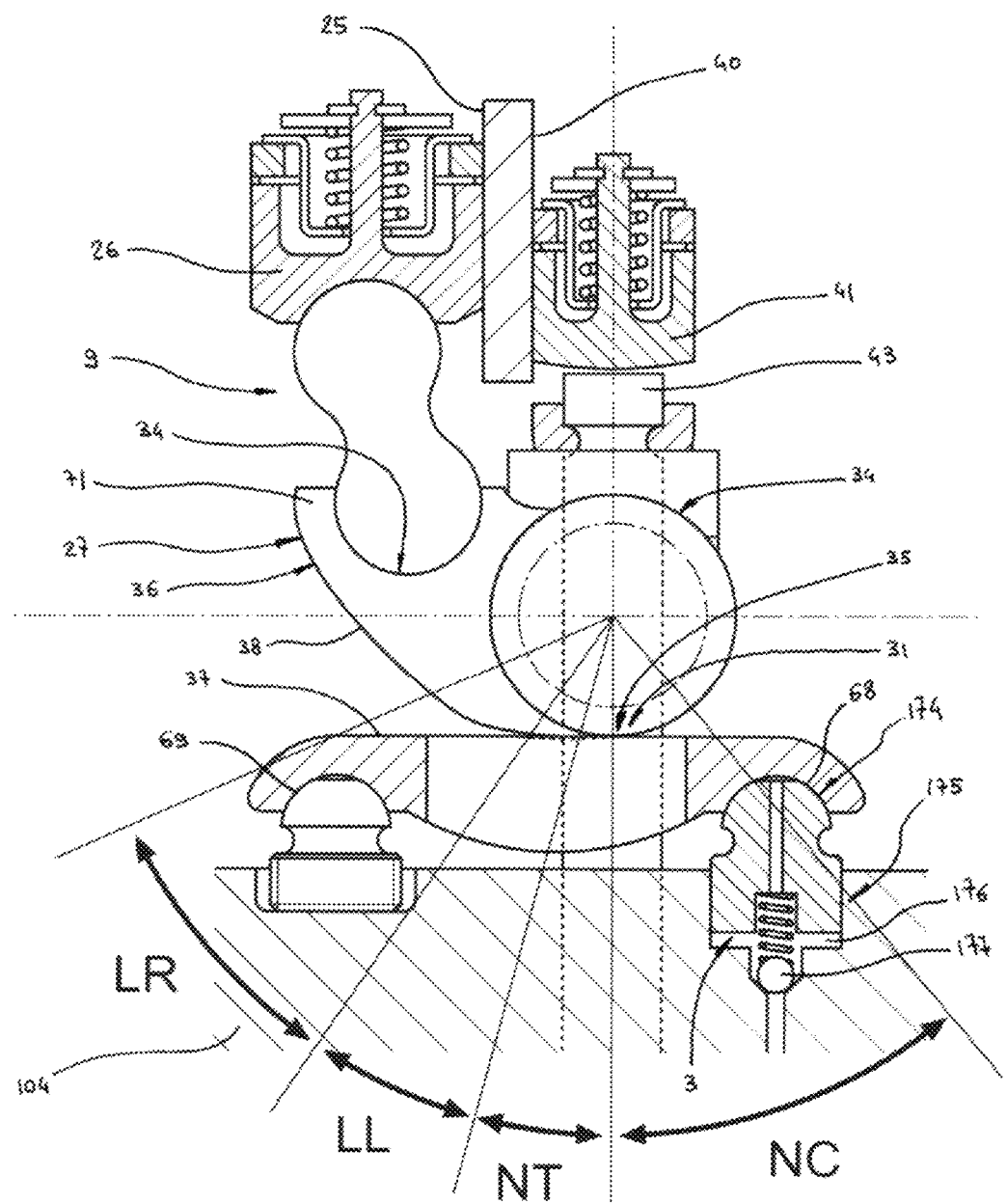
FIG. 13 is a simplified diagrammatic sectional view of the progressive lever arm ratio lever and of the pistons with which it cooperates according to one particular embodiment of the regenerative valve hydraulic actuator according to the invention which provides a play compensation actuator which supports the lever reaction surface, and which is inserted between said surface and the cylinder head.

As FIG. 13 clearly shows, the play compensation actuator 175 can be inserted between the lever reaction surface 37 which its supports at one of its ends and via a fixed ball-joint connection 68, and the compressor or engine cylinder head 104.

Note also in FIG. 13 that at its other end, the lever reaction surface 37 is preferably supported by a sliding ball-joint connection 69 which is substantially able to move on the compressor or engine cylinder head 104 parallel to the lever reaction surface 37.

Figure 14:
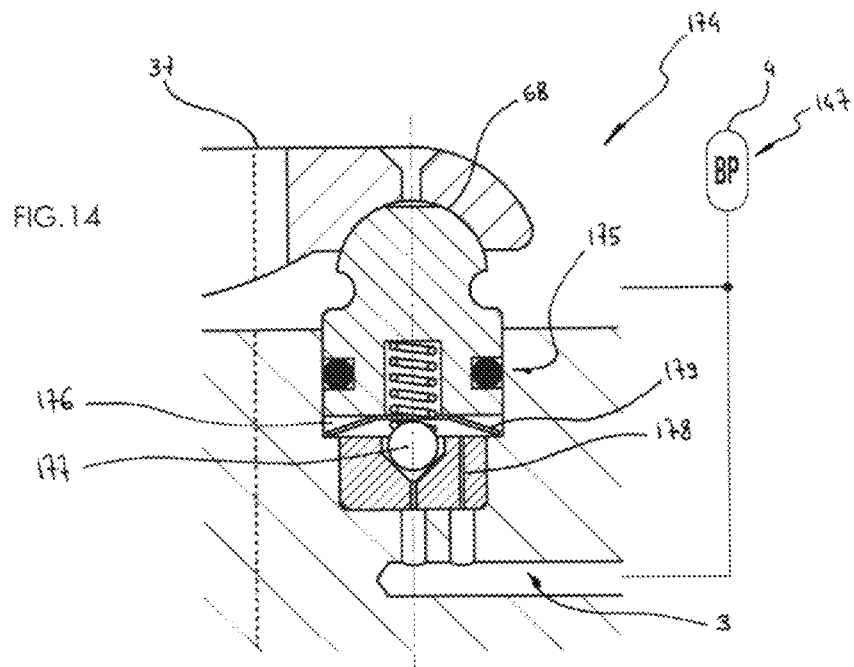
FIG. 14 is a simplified sectional view of a variant of the play compensation actuator which, in accordance with the regenerative valve hydraulic actuator of the invention, provides a play compensation actuator which includes a play compensation check valve and a play compensation nozzle in parallel, said actuator further including a play compensation spring that tends to cause it to advance.

In FIG. 14, it has been shown that the play compensation means 174 can consist of a play compensation actuator 175 inside which a play compensation chamber 176 includes a play compensation nozzle 178 which allows hydraulic fluid 3 coming from the low-pressure accumulator 4, from the high-pressure accumulator 5, from the fluid tank 46, or from a pressurized hydraulic fluid source 147 to enter said chamber 176, and to leave it.

Figure 15:
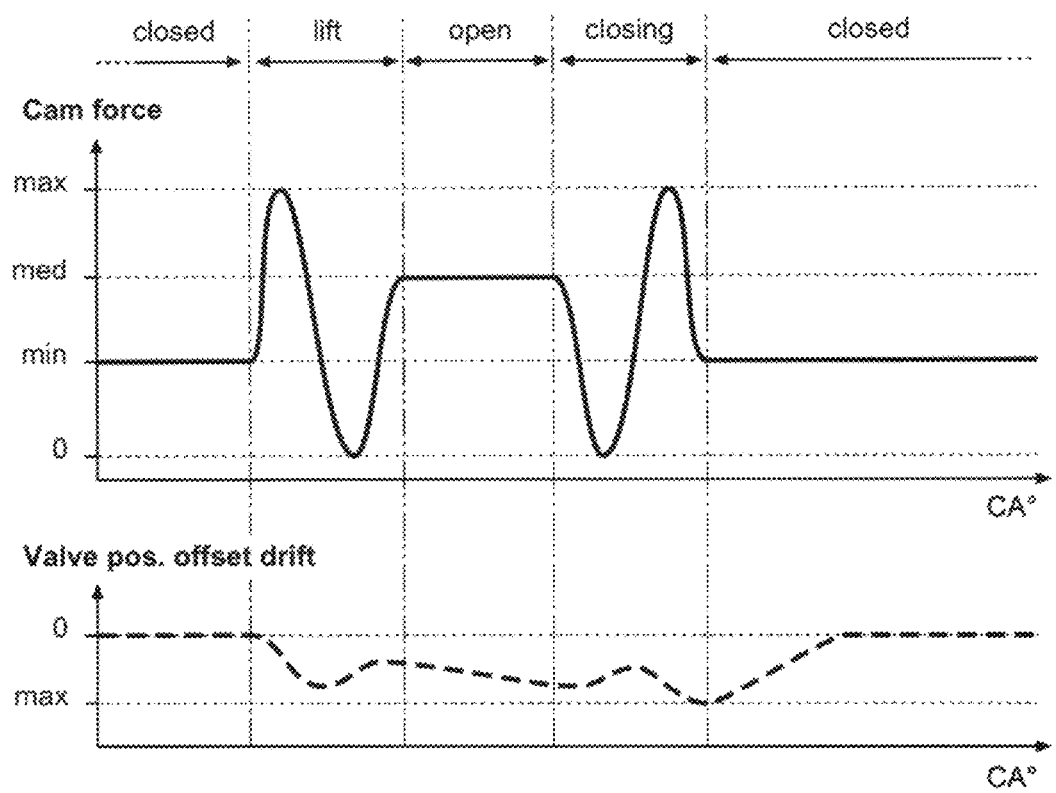
FIG. 15 is a graph which shows the drift in compression or in extension of the play compensation actuator as shown in FIG. 14, as a function of the evolution of the force exerted at the point of application of the force of the actuator in accordance with the regenerative valve hydraulic actuator according to the invention.
Figure 16:
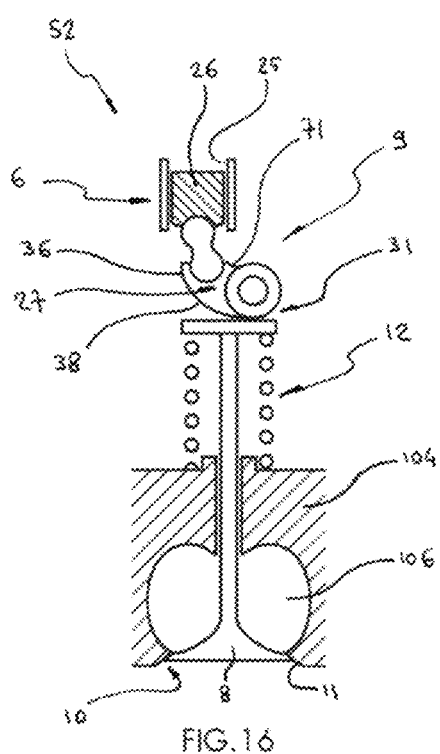
FIG. 16 is a simplified sectional diagram of one particular embodiment of the regenerative valve hydraulic actuator according to the invention in which the valve opens toward the interior of the compression or combustion chamber, the valve return device consisting of a coil spring known in itself.
Figure 17:
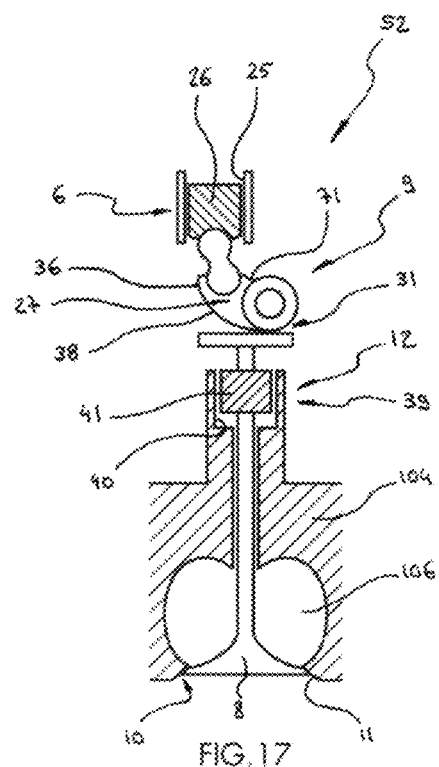
FIG. 17 is a simplified sectional diagram of one particular embodiment of the regenerative valve hydraulic actuator according to the invention in which the valve opens toward the interior of the compression or combustion chamber, the valve return device consisting of a valve return actuator which is coaxial with said valve and the return actuator piston of which is fastened to the valve stem.
Figure 18:
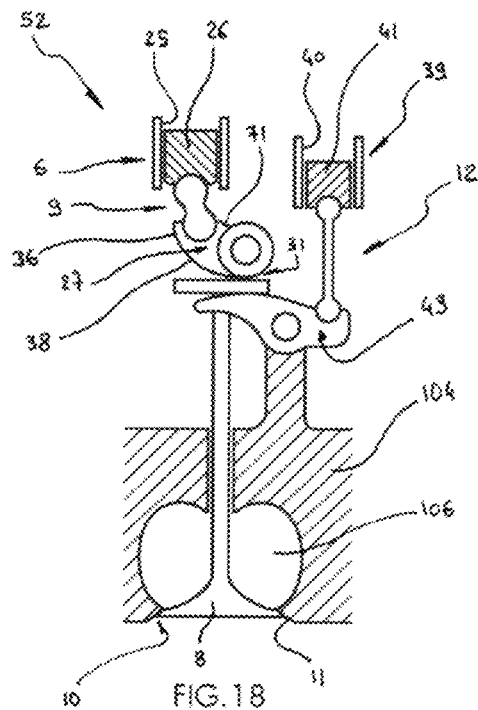
FIG. 18 is a simplified diagrammatic view of one particular embodiment of the regenerative valve hydraulic actuator according to the invention in which the valve opens toward the interior of the compression or combustion chamber, the valve return device consisting of a valve return actuator which returns the valve to the closing position by means of a return lever.
Figure 19:
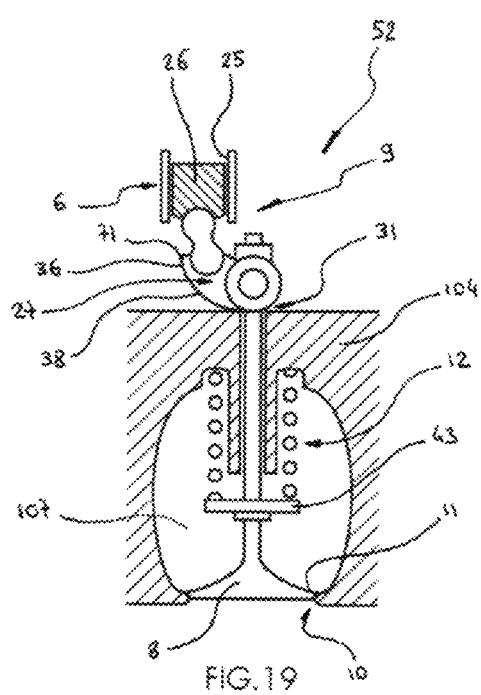
FIG. 19 is a simplified diagrammatic view of one particular embodiment of the regenerative valve hydraulic actuator according to the invention particularly suited to reciprocating piston compressors in which the valve opens toward the exterior of the compression or combustion chamber, the valve return device consisting of a coil spring accommodated as appropriate in the intake line or in the exhaust line or discharge line.

As FIG. 15 particularly illustrates, this particular configuration of the regenerative valve hydraulic actuator 1 according to the invention allows the play compensation actuator 175 to retract when the actuator 6 exerts a high force on the progressive lever arm ratio lever 27.

This enables counterbalancing of the drift in the opposite direction—that is to say in extension—of the play compensation actuator 175 which then occurs on lifting the valve 8, at the moment when—when said valve 8 decelerates at the end of its lifting travel—the force to which said actuator 175 is objected is low or even zero.

In particular, said configuration prevents it from being impossible—the play compensation actuator 175 having drifted excessively in extension—to return said valve 8 onto the valve seat 11 with which it cooperates.

It will be noted that the play compensation nozzle 178 can advantageously be incorporated into the play compensation check valve 177, which can for example—as FIG. 14 shows—consist of a ball pressed onto its seat by a spring, the seal between said ball and said seat being intentionally imperfect. FIG. 14 also shows that a play compensation spring 179 can be provided that tends to move forward the play compensation actuator 175.

In FIGS. 25 and 26, it is seen that according to one variant of the regenerative valve hydraulic actuator 1 according to the invention, the progressive lever arm ratio lever 27 can be accommodated in a lever chamber 23 to which the actuator piston 26 also leads, said chamber 23 being connected with the low-pressure accumulator 4, with the fluid tank 46, or with a pressurized hydraulic fluid source 147, by a lever chamber check valve 59 which allows hydraulic fluid 3 to leave said lever chamber 23 but not to enter it, or by a calibrated lever chamber nozzle 67 which allows hydraulic fluid 3 to leave and to enter said lever chamber 23, or again both by said valve 59 and said nozzle 67, the latter then being placed in parallel with the lever chamber check valve 59.

Note moreover that the lever chamber check valve 59 and the lever chamber calibrated check nozzle 67 may be one and the same, in particular by using as said valve 59 a ball pressed by a spring onto a seat, said ball with said seat allowing passage of a leak of hydraulic fluid 3 that serves as the lever chamber calibrated nozzle 67.

As FIGS. 25 and 26 particularly illustrate, this particular configuration of the regenerative valve hydraulic actuator 1 according to the invention enables exploitation of the variation of the volume of the hydraulic fluid 3 contained in the lever chamber 23 to hold the actuator piston 26 pressed onto the transmission means 9 with which it cooperates, at the moment when the valve 8 is replaced on its valve seat 11, or when said valve 8 returns to the vicinity of said seat 11.

Alternatively, the actuator piston 26 can cooperate with braking means provided for example in or on the actuator cylinder 25 with which it cooperates, said means being able to consist of a shape generating a castor effect, said shape being fastened to said cylinder 25 or free relative to the latter and spring-loaded or not.

OPERATION OF THE INVENTION

The operation of the regenerative valve hydraulic actuator 1 according to the invention is easily understood from FIGS. 1 to 35.

It will be noted beforehand that the diagrammatic sections shown in the figures are merely explanatory and do not reflect the construction details to be given to the person skilled in the art that will in particular enable the various parts to be assembled.

The basic principle of said actuator 1 is shown in FIG. 1. During the following explanation, it is possible to refer to said figure to situate the understanding of said actuator 1 and the various components that it combines into one and the same system.

As FIG. 2 illustrates, said actuator 1 is addressed in particular to reciprocating piston compressors or engines 100 of a type known in itself, without this application being limiting on the invention, however, said actuator 1 advantageously being able to find other fields of application.

FIGS. 3 and 4 detail the fitting of the regenerative valve hydraulic actuator 1 according to the invention to the expansion cylinder assembly 54 of the transfer-expansion and regeneration engine the French patent on which belonging to the applicant has been published under the number FR 3 032 236, and particularly to the improved version of said engine as presented in the French patent application number 1558585 of 14 Sep. 2015 also belonging to the applicant.

It is deduced from said FIGS. 3 and 4 that an actuator cartridge 52 has advantageously been provided in which are together accommodated the main members of the regenerative valve hydraulic actuator 1 according to the invention and in particular those represented in the diagrammatic section shown in FIGS. 5 to 12, that is to say the valve 8 and the valve seat 11 with which it cooperates, the actuator 6, the transmission means 9, the valve return device 12, the lifter check valve 15, the valve lifter hydraulic valve 13, and the valve closure hydraulic valve 17.

It is seen that in this nonlimiting embodiment the expansion cylinder assembly 54 includes eight actuator cartridges 52 each having a valve cage 56 cooled by a valve cooling circuit 32 in which a heat transfer fluid circulates. Note that in this context, as represented in FIGS. 5 to 12, the valve stem 51 can advantageously be protected by a valve heat shield 58 which limits the quantity of heat received by the valve 8, said heat having to be evacuated by the heat transfer fluid.

It is also seen in FIG. 3 that the expansion cylinder assembly 54 includes a cylinder barrel 55, an expansion cylinder lower cylinder head 33 and an expansion cylinder upper cylinder head 61 which can for example be made of ceramic and suspended on hollow pillars 62 as described by the French patent application number 1558585 of 14 Sep. 2015 which belongs to the applicant.

Given that the hollow pillars 62 rest on ball-joint connections, on the one hand, and that the expansion cylinder assembly 54 is heated to a high temperature, on the other hand, it would be impossible to fix to the expansion cylinder lower cylinder head 33 and/or the expansion cylinder upper cylinder head 61 a transmission by belt, by gears or by chains of any camshaft whatsoever.

It is therefore pertinent to provide—as the patent number FR 3 032 236 and the present invention propose—actuator cartridges 52 ready to be mounted in said cylinder head 33, 61, said cartridges 52 being connected to one another and/or to the energy source that powers them only by flexible lines and/or cables.

In FIGS. 3 and 4, it is also seen that the actuator cartridges 52 of the expansion cylinder lower cylinder head 33 are advantageously pressed onto the latter by a lower cartridge retention plate 57 whilst the actuator cartridges 52 of the expansion cylinder upper cylinder head 61 are pressed onto the latter by an upper cartridge retention plate 63.

As seen in said FIGS. 3 and 4, said two plates 57, 63 are held in contact with the actuator cartridges 52 with which they cooperate by means of plate abutments 64 that said plates 57, 63 include facing each of said cartridges 52.

Moreover, said two plates 57, 63 tend to be moved toward one another by plate tie rods 65 of which there are four in this example and which consist of long screws that cooperate with a spring 66 for moving the plates toward one another placed under the head of said screws. It is seen in FIGS. 3 and 4 that—according to this nonlimiting embodiment, said spring 66 consists of a stack of three "Belleville" type washers known in themselves.

Clearly, in accordance with this particular configuration, the lower cartridge retention plate 57, the upper cartridge retention plate 63 and the plate tie rods 65 with which they cooperate remain at relatively low temperatures compared to the expansion cylinder assembly 54.

In fact, said plates 57, 63 do not touch said assembly 54 directly whilst the actuator cartridges 52 are maintained at low temperatures—for example of the order of one hundred degrees Celsius—by the valve cooling circuit 32 which their valve cage 56 includes, on the one hand, and by the circulation of the hydraulic fluid 3 in the regenerative valve hydraulic actuators 1 according to the invention, on the other hand.

There can be seen in FIG. 3 a centering gantry 72 which cooperates in orienting the expansion cylinder assembly 54 relative to a transmission casing 73 that the transfer-expansion and regeneration engine that is the subject matter of the French patent published under the number FR 3 032 236 includes. It will be noted that a link that is not shown can advantageously be provided to connect said gantry 72 directly or indirectly with the lower cartridge retention plate 57, with the upper cartridge retention plate 63, or both of them, in order to maintain the expansion cylinder assembly 54 correctly oriented about its vertical axis relative to the transmission casing 73.

To describe in detail the operation of the regenerative valve hydraulic actuator 1 according to the invention, there will be employed here the nonlimiting embodiment illustrated in FIGS. 5 to 12 in which said actuator 1 is able to pull on a valve stem 51 that the valve 8 includes, the latter—when it is opened by being lifted off its valve seat 11—moving toward the interior of the intake line 106 with which it cooperates, the bearing surface of said seat 11 being oriented toward the interior of said line 106.

This configuration is particularly well suited to the intake metering valve of the expansion cylinder assembly 54 shown in FIGS. 3 and 4 of the transfer-expansion and regeneration engine that is the subject matter of the French patent published under the number FR 3 032 236. Assume therefore that it is on the same said motor and to be more precise on its expansion cylinder assembly 54 that the regenerative valve hydraulic actuator 1 according to the invention is installed, as shown in FIGS. 5 to 12.

Note that in FIGS. 5 to 12 the compressor or engine cylinder head 104 is referenced. This is purely terminological with the sole objective of facilitating the understanding of the operation of the regenerative valve hydraulic actuator 1 according to the invention. In fact, the part of said cylinder head 104 that is represented in said figures is here an integral part of the actuator cartridge 52, in particular with the valve seat 11. The resulting assembly can be designed to be introduced into the rest of the cylinder head 104 in which the compression or combustion chamber 105, the intake line 106, and the exhaust or discharge line 107 of any reciprocating piston compressor or engine 100 which receives said cartridge 52 are formed.

It will be noted in FIGS. 5 to 12 that the valve lifter hydraulic valve 13 and the valve closure hydraulic valve 17 each consist of a tubular valve 130 identical to that which is the subject matter of the French patent application number FR 1659096 of 27 Sep. 2016 relating to a hydraulically controlled tubular valve, said application belonging to the applicant.

FIGS. 5 to 12 also illustrate that the progressive lever arm ratio lever 27 takes the form of a cam-lever 71 which forms one of the components of the transmission means 9. Said cam-lever 71 exposes a point 28 of application of the actuator force at which the actuator piston 26 can apply a driving or resisting force, a point 29 of application of the valve force to which the valve 8 can apply a driving or resisting force, and a point of application of the reaction force on the cylinder head 30 at which a force is applied to the cylinder head 104. These various said application points 28, 29, 30 are specifically referenced in FIG. 9.

Note that according to this particular embodiment of the regenerative valve hydraulic actuator 1 according to the invention as illustrated in FIGS. 5 to 12, the point 28 of application of the actuator force and the point 29 of application of the valve force form a pivot connection 34 whilst the point of application of the reaction force on the cylinder head 30 forms a rolling-sliding connection 35 which in itself constitutes means for moving the application point 31.

FIGS. 5 to 12 further show that the rolling-sliding connection 35 is in particular formed by a lever contact track 36 which has a curved contact profile 38 along which is moved the point 30 of application of the reaction force on the cylinder head during maneuvers of opening and closing the valve 8, said profile 38 cooperating with a lever reaction surface 37 formed on the cylinder head 104.

In FIG. 9, there has been represented the actuator piston lever arm LP and the valve action lever arm LS. This representation facilitates understanding that when the valve 8 is close to the valve seat 11 with which it cooperates, the actuator piston lever arm LP has its greatest length. Also, said arm LP has its shortest length when the valve 8 is opened to the maximum. The situation is exactly the opposite in the case of the valve action lever LS.

FIG. 13 is used to describe in detail one particular and nonlimiting strategy for operation of the cam-lever 71 and in particular to describe in detail the consequences of moving the point 30 of application of the reaction force on the cylinder head.

In particular, it is seen in FIG. 13 that the cam-lever 71 can advantageously have a concentric neutral angular sector NC that holds the valve 8 immobile when said cam-lever 71 turns. This sector makes it possible to accompany the deceleration in rotation of the cam-lever 71 after the valve 8 has been replaced on its valve seat 11.

According to this nonlimiting example illustrated in FIG. 13, the cam-lever 71 also has a tangential neutral angular sector NT which does not lift the valve 8, but which enables propositioning of the point 30 of application of the reaction force on the cylinder head in the vicinity of the commencement of the lifting of the valve 8 when between two openings of the valve 8 the cam-lever 71 is no longer driven with any rotation whatsoever.

The slow lift angular sector LL for its part approximately reproduces what the person skilled in the art terms the "ramp of silence" provided on the cams usually employed in reciprocating internal combustion engines. Said sector LL on the one hand enables high acceleration of the valve 8 at the start of lifting it, for example over the first tenths of a millimeter and, on the other hand, to replace said valve 8 on its valve seat 11 slowly, for example at a speed less than one meter per second—at the end of the closing travel of said valve 8.

The cam-lever 71 also includes a fast lift angular sector LR which ends the acceleration of the valve 8 when it is lifted, after which it accompanies it over its second lift half-travel whereas the valve lift hydraulic valve 13 is closed and whereas the lift check valve 15 introduces hydraulic fluid 3 coming from the low-pressure accumulator 4 into the actuator hydraulic chamber 7.

It will be seen that during the return of the valve 8, the rapid lift angular sector LR precedes the slow lift angular sector LL, the actuator piston 26 then expelling hydraulic fluid 3 toward the closure and regeneration hydraulic motor 20 via the valve closure hydraulic valve 17.

In FIGS. 5 to 12, it is seen that the valve return device 12 consists of a valve return actuator 39 which comprises a return actuator cylinder 40 capped by a return actuator cylinder head 50, said cylinder 40 and said cylinder head 50 forming a return actuator hydraulic chamber 42 with a return actuator piston 41 connected to the valve 8 by return transmission means 43.

FIGS. 5 to 12 also show diagrammatically that the return actuator hydraulic chamber 42 is connected to the high-pressure accumulator 5 by a return pressure line 44.

It will be seen in FIGS. 5 to 12 that the actuator piston 26 and the return actuator piston 41 can be equipped with the piston sealing device the patent on which belonging to the applicant has been published under the number FR 3 009 037, said device guaranteeing a strong seal at high operating pressures, being compatible with high speeds, and enabling the production of short and light pistons 26, 41.

It will also be seen that according to this nonlimiting embodiment, the section of the actuator piston 26 is approximately twice that of the return actuator piston 41.

To describe in detail the operation of the regenerative valve hydraulic actuator 1 according to the invention, it will be assumed that the hydraulic fluid 3 is maintained at a pressure of twenty bar in the low-pressure accumulator 4 and at a pressure of five hundred bar in the high-pressure accumulator 5.

Figure 5:
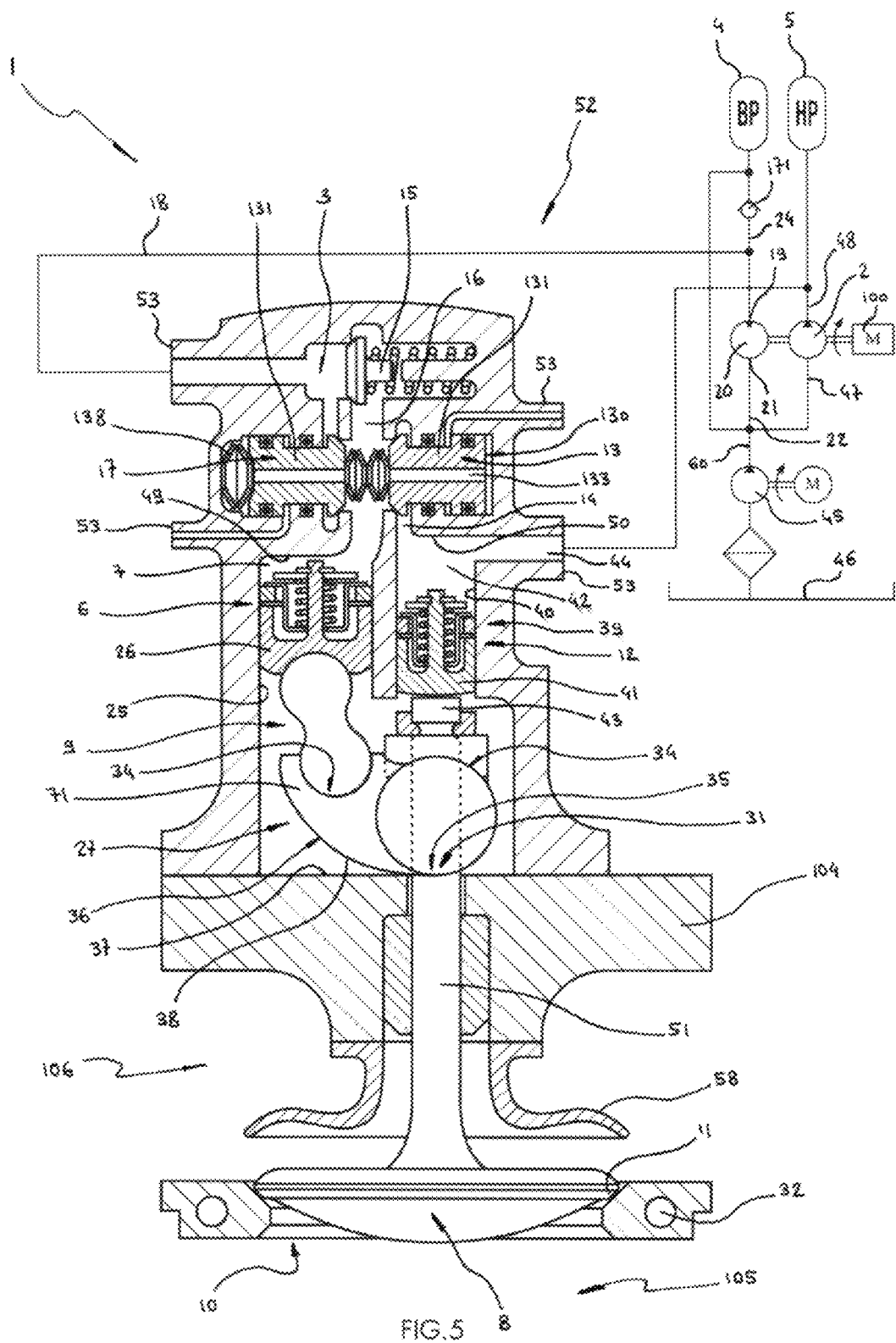
FIGS. 5 to 12 are diagrammatic sectional views of the regenerative valve hydraulic actuator according to the invention and according to one particular embodiment in which the flow of hydraulic fluid that the lifter check valve can allow to flow from the low-pressure accumulator to the actuator hydraulic chamber passes entirely through the end of expansion check valve, said two check valves being placed in series, each of said views being linked to a hydraulic diagram utilizing the symbols usually employed to describe hydraulic circuits and units, said figures enabling explanation—figure by figure—of the sequencing of the operation of said hydraulic actuator according to the invention.

FIG. 5 shows the regenerative valve hydraulic actuator 1 according to the invention at rest, the valve 8 resting on its valve seat 11 and closing the line orifice so that the intake line 106 does not communicate with the compression or combustion chamber 105 into which it opens.

At this stage, the valve lifter hydraulic valve 13 and the valve closure hydraulic valve 17 are closed. The pressure in the actuator hydraulic chamber 7 is twenty bar whilst that in the return actuator hydraulic chamber 42 is five hundred bar, said chamber being connected directly to the high-pressure accumulator 5.

In the closed position represented in FIG. 5, the force that holds the valve 8 in contact with the valve seat 11 is the equivalent of the product of the section of the return actuator piston 41 by the pressure of five hundred bar, less the product of the section of the actuator piston 26 by the pressure of twenty bar by the quotient of the length of the actuator piston lever arm LP by the length of the valve action lever arm LS as denoted in FIG. 9.

Figure 6:
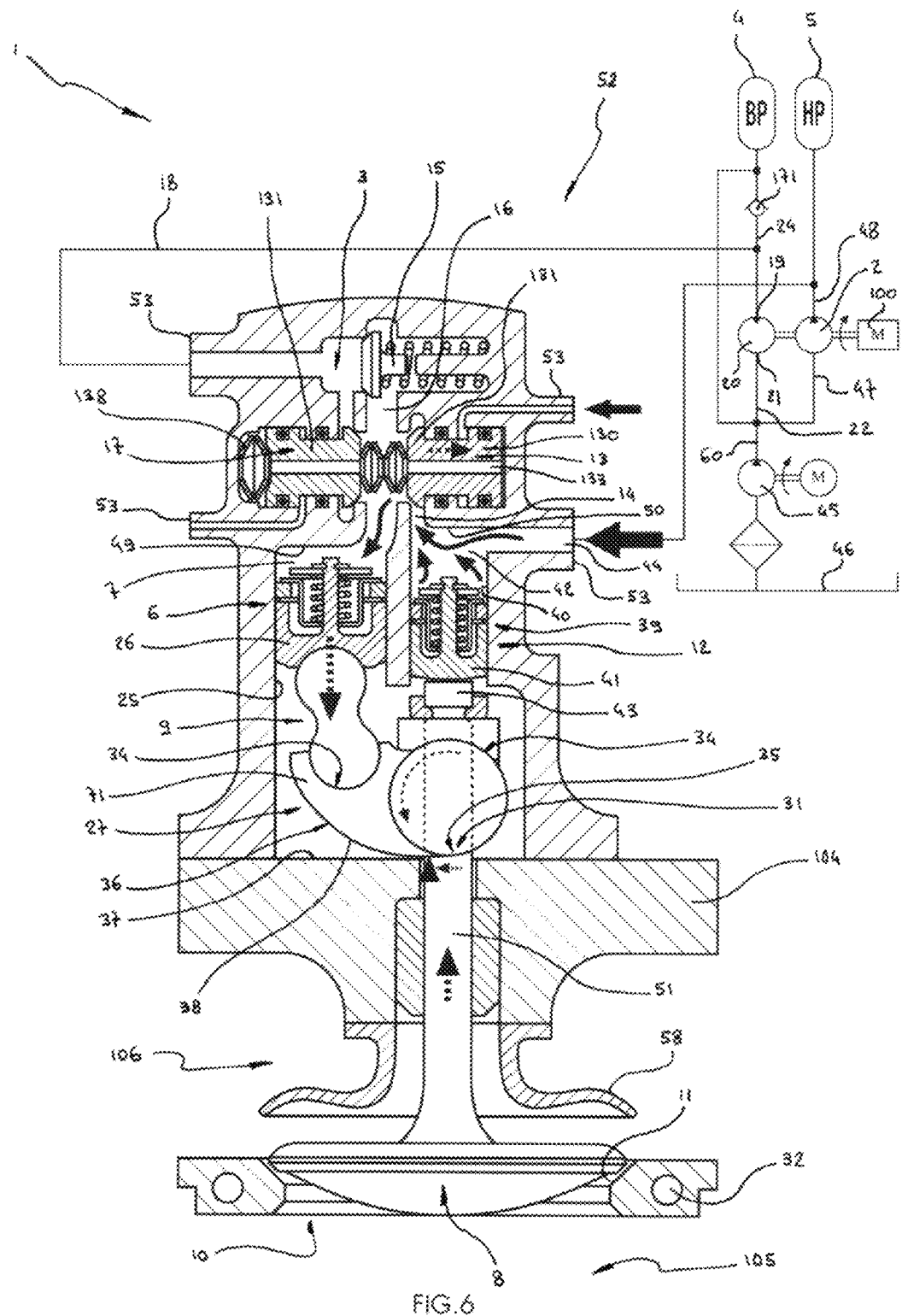

To open the valve 8, a computer that is not shown commands opening of the valve lifter hydraulic valve 13. This situation is represented in FIG. 6. Said valve 13 being open, a pressure of five hundred bar continues to be exerted on the return actuator piston 41 whilst the same pressure of five hundred bar is also exerted on the actuator piston 26.

The section of the actuator piston 26 being twice that of the return actuator piston 41 and said actuator piston 26 having a long lever arm, said piston 26 accelerates up to speed. In doing this, said piston 26 exerts a high force on the valve 8 which accelerates and starts to be lifted off the valve seat 11 with which it cooperates.

Figure 7:
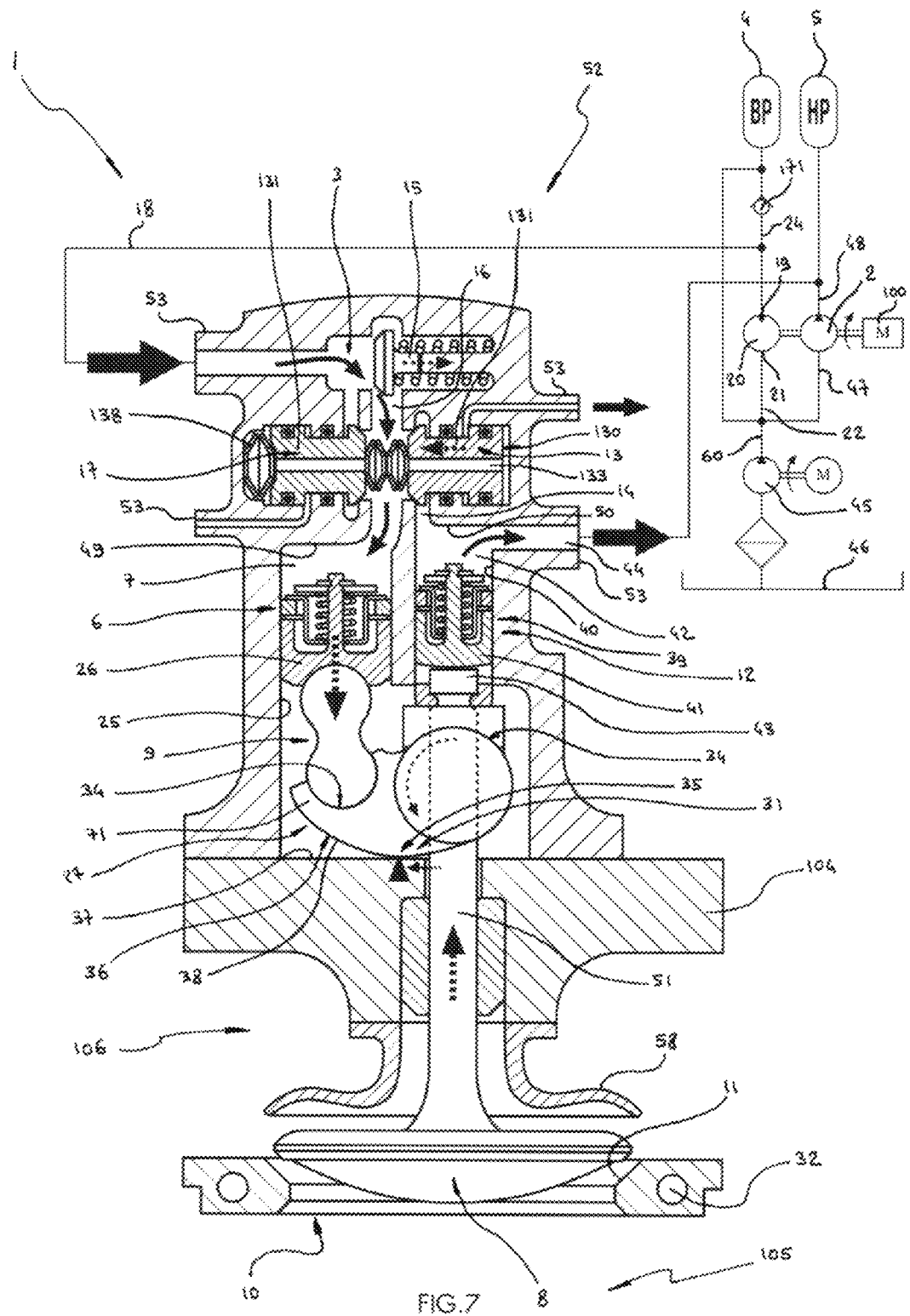

FIG. 7 shows how the regenerative valve hydraulic actuator 1 according to the invention advantageously enables exploitation of the kinetic energy stored by the actuator piston 26, the transmission means 9, the return actuator piston 41 and the valve 8 to perfect the lifting of said valve 8.

At the stage shown in FIG. 7, the valve 8 has already covered approximately half its opening travel. The computer that is not shown has commanded closing of the valve lifter hydraulic valve 13. Driven by its inertia, the assembly consisting of the actuator piston 26, the transmission means 9, the cam-lever 71, the return actuator piston 41, and the valve 8 has continued to move, which has led to a drop in pressure in the actuator hydraulic chamber 7 to the point that the pressure in said chamber 7 has fallen below twenty bar.

A result of this situation is that the lifter check valve 15 has been lifted off its seat whilst hydraulic fluid 3 coming from the low-pressure accumulator 4 has begun to be introduced into the actuator hydraulic chamber 7 via said valve 15.

In parallel with this, the return actuator piston 41 has expelled hydraulic fluid 3 at approximately five hundred bar to the high-pressure accumulator 5 whilst braking the valve 8.

Figure 8:
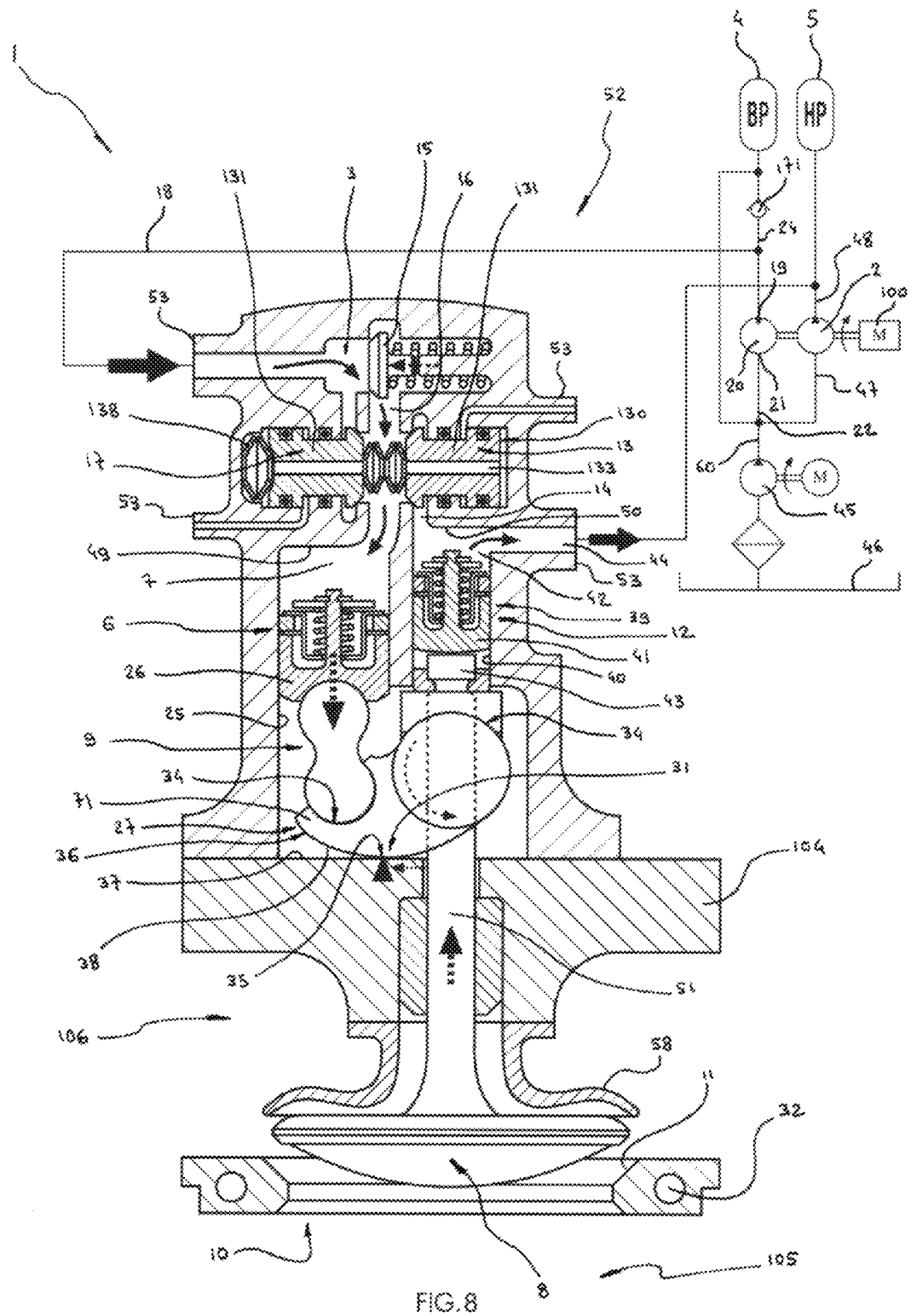

As FIG. 8 illustrates, this situation continues until all the kinetic energy of the assembly consisting of the actuator piston 26, the transmission means 9, the cam-lever 71, the return actuator piston 41, and the valve 8 has been converted into a flow of hydraulic fluid 3 at five hundred bar produced by the return actuator piston 41, said energy being stored in the high-pressure accumulator 5.

During this movement and whilst the valve 8 is beginning to reach the end of its opening movement, the actuator piston lever arm LP has been considerably shortened whilst in parallel the valve action lever arm LS has been lengthened.

FIG. 9 illustrates the equilibrium situation encountered at the end of the opening travel of the valve 8. The mobile members having ceded all their kinetic energy to the high-pressure accumulator 5, the return actuator piston 41 has tended to push the valve 8 toward the valve seat 11. The lifter check valve 15 has then been closed immediately, trapping hydraulic fluid 3 in the actuator hydraulic chamber 7, in which the pressure has risen until the force produced by the return actuator piston 41 on the valve 8 via the return transmission means 43 is exactly countered by a force of the same intensity produced by the actuator piston 26 on said valve 8 in particular via the point 29 of application of the valve force, this allowing for the section ratios of said pistons 41, 26 and of the ratio between the actuator piston lever arm LP and that of the valve action lever arm LS.

The equilibrium pressure in the actuator hydraulic chamber 7 is therefore the result of these various section ratios and lever ratios. According to the example taken here, let us consider that said equilibrium pressure in FIG. 9 is then approximately three hundred bar.

It can moreover be specified here that at the moment the pressure of twenty bar is reached in the actuator hydraulic chamber 7 and just after the lifter check valve 15 has been closed, the computer that is not represented can open the valve lifter hydraulic valve 13 briefly to increase intentionally the pressure in the actuator hydraulic chamber 7 to three hundred bar, to maintain the actuator piston 26 immobile when the valve 8 has reached its maximum opening.

This strategy enables cancellation of the effects of the compressibility of the hydraulic fluid 3 and prevents the actuator piston 26 from advancing again in its actuator cylinder 25 and partially closing the valve 8.

Figure 10:
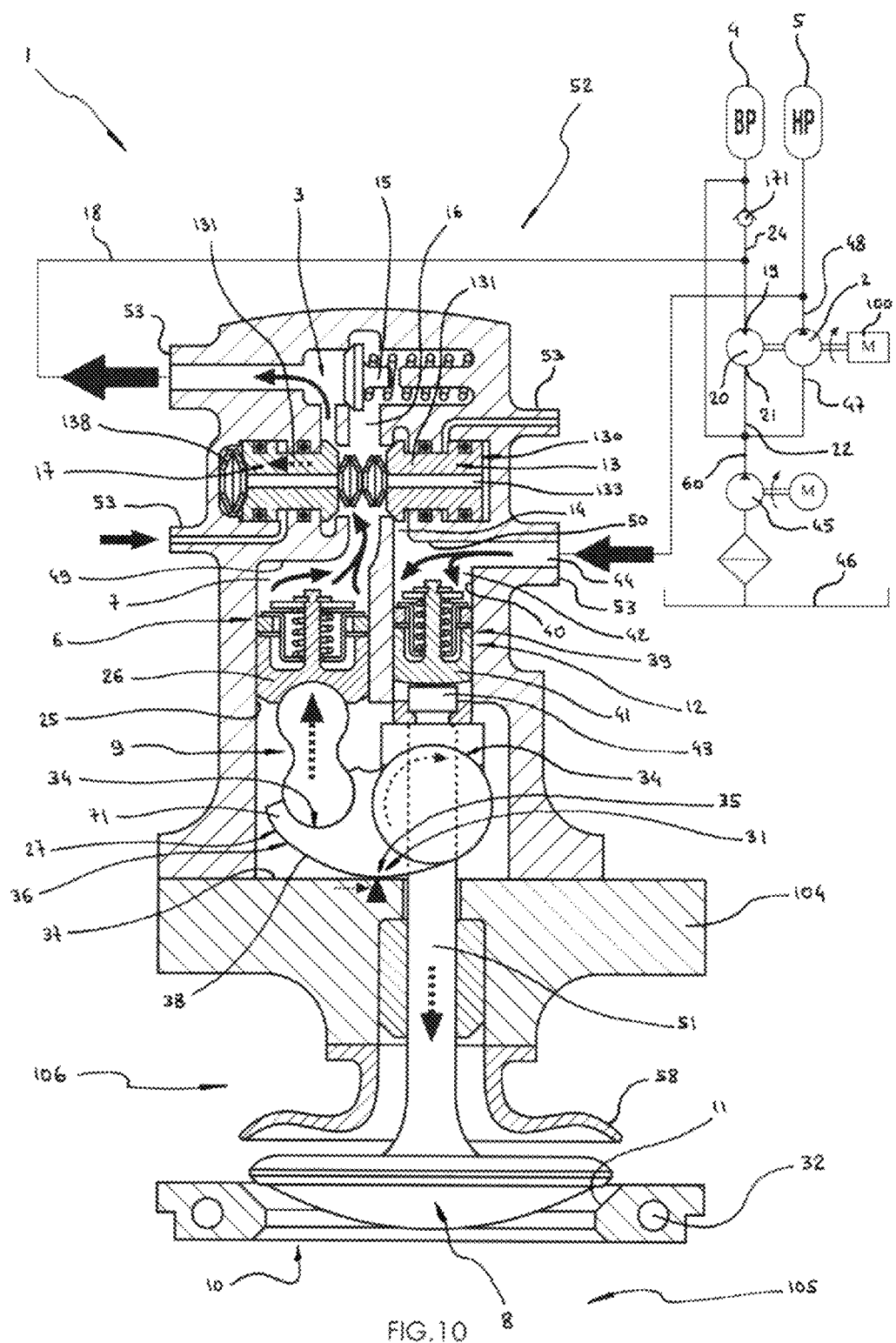

FIG. 10 shows what happens when the decision is taken to close the valve 8 starting from the equilibrium situation as illustrated in FIG. 9.

However, before describing in more detail the sequence of closing said valve 8, it is useful to consider in more detail the operation of the high-pressure hydraulic feed pump 2, on the one hand, and the closure and regeneration hydraulic motor 20, on the other hand, starting from the diagram in the top right part of FIGS. 5 to 12.

According to the example taken here to illustrate the operation of the regenerative valve hydraulic actuator 1 according to the invention, it will be considered that the high-pressure hydraulic feed pump 2 is designed to maintain a pressure set point in the high-pressure accumulator 5 of five hundred bar with a latitude of plus or minus three bar. Said pump 2 is for example of variable cubic capacity so that its cubic capacity is automatically adapted so that said set point is complied with. Here, and by way of example, said pump 2 is driven directly by the crankshaft 102 of the reciprocating piston compressor or engine 100 which in this instance consists of a transfer-expansion and regeneration engine that is the subject matter of the French patent published under the number FR 3 032 236.

The closure and regeneration hydraulic motor 20 is also mechanically connected to said crankshaft 102 so that its rotation speed is proportional to that of said crankshaft 102.

In FIGS. 5 to 12, it is clear that when the valve lifter hydraulic valve 13 and the valve closure hydraulic valve 17 are closed, the pressure of twenty bar in the low-pressure accumulator 4 is applied both to the fluid intake 19 and to the fluid outlet 21 of the closure and regeneration hydraulic motor 20.

This results in circulation of hydraulic fluid 3 through said motor 20, the latter on the one hand admitting said fluid 3 via its fluid intake 19 via the freewheel channel 24 which includes an end of expansion check valve 171 and, on the other hand, discharging said fluid 3 via its fluid outlet 21 via the hydraulic motor low-pressure return line 22. To summarize, said closure and regeneration hydraulic motor 20 is looped on itself, being driven for this by the crankshaft 102.

When—as FIG. 10 illustrates—the computer that is not shown opens the valve closure hydraulic valve 17, said computer connects the actuator hydraulic chamber 7 with the closure and regeneration line 18. The hydraulic fluid 3 contained in said chamber is expanded suddenly in said line 18 the pressure in which rises virtually instantaneously to—for example—two hundred and eighty bar.

A few microseconds later, the actuator piston 26 has moved rapidly when pushed by the return actuator piston 41, said push being exerted in particular via the transmission means 9. In doing this, the actuator piston 26 has restored a pressure of approximately three hundred bar both in the actuator hydraulic chamber 7 and in the closure and regeneration line 18.

Almost instantaneously after the valve closure hydraulic valve 17 has been opened, the pressure on the downstream side of the end of expansion check valve 171 has become very much higher than that of twenty bar on the upstream side of said valve 171. Said valve 171 is therefore closed so that the pressure firstly of two hundred and eighty bar and then a few seconds later of three hundred bar is applied to the fluid intake 19 of the closure and regeneration hydraulic motor 20.

A result of this has been that the closure and regeneration hydraulic motor 20 has immediately applied a driving torque to the crankshaft 102 of the reciprocating piston compressor or engine 100.

The closure and regeneration hydraulic motor 20 being in this example of the positive displacement type known in itself, it has imposed a certain flow rate on the hydraulic fluid 3 flowing from now on in the closure and regeneration line 18, said flow rate being determined by the rotation speed of said motor 20 itself fixed by the rotation speed of the crankshaft 102.

Accordingly, the speed at which the actuator piston 26 advances in the actuator cylinder 25 with which it is cooperating is at this stage determined directly by the rotation speed of the crankshaft 102.

Figure 11:
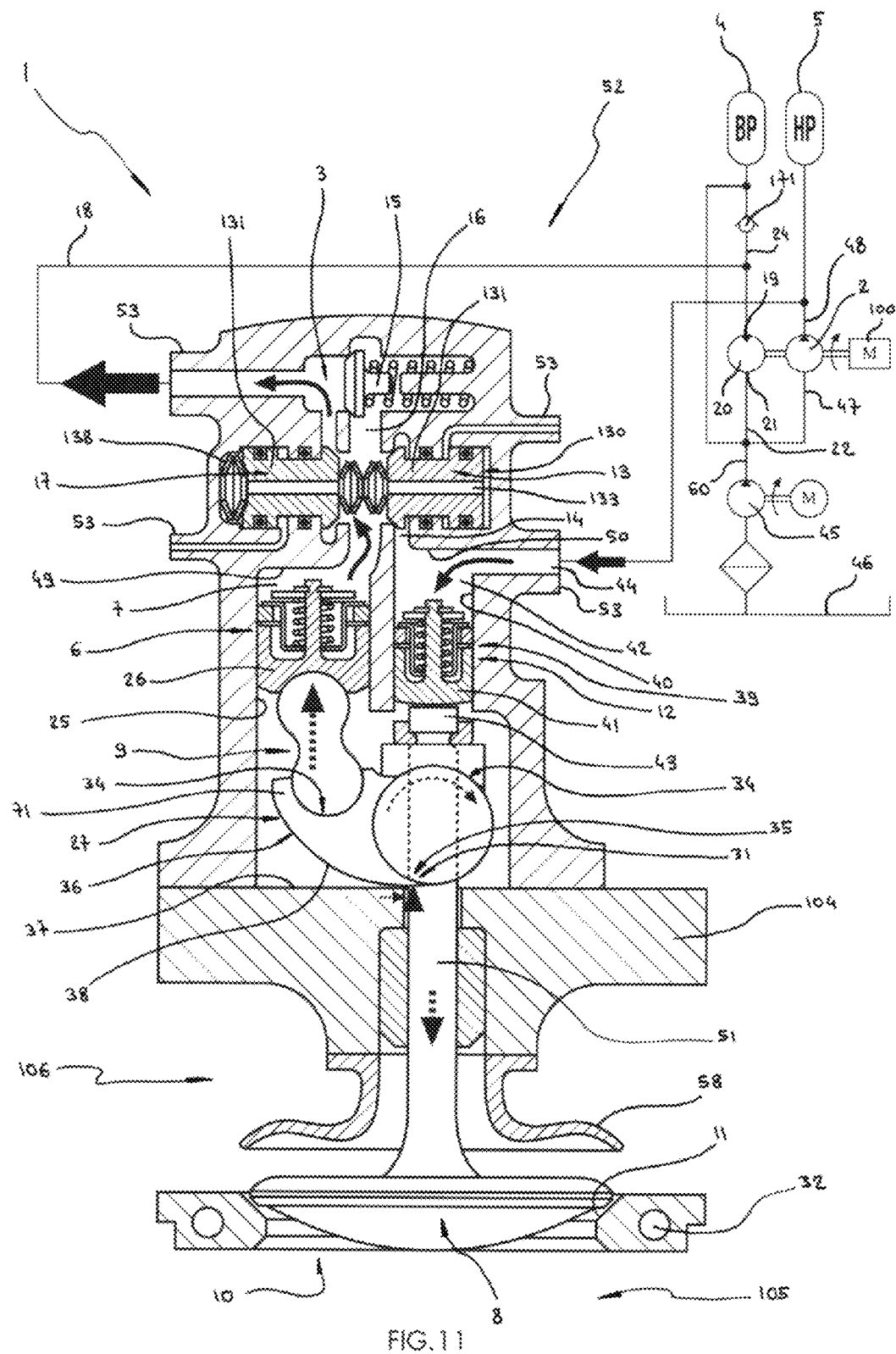

As is seen in FIG. 11, oppositely relative to what occurred on lifting the valve 8, the actuator piston lever arm LP length increases again as and when the valve 8 is moved toward the valve seat 11 whereas, in a correlative manner, the valve action lever arm length LS decreases. This is because the point of application of the reaction force on the cylinder head 30 at which a force is applied to the compressor or engine cylinder head 104 is moved along the curved contact profile 38 which the lever contact track 36 formed on the cam-lever 71 includes.

The force that the return actuator piston 41 exerts on the valve 8 being approximately constant, the increase in the ratio of the actuator piston lever arm LP to the length of the valve action lever arm LS leads to a gradual reduction of the force applied by the progressive lever arm ratio lever 27 which constitutes the cam-lever 71 on the actuator piston 26 and therefore of the pressure of the hydraulic fluid 3 at the fluid intake 19 of the closure and regeneration hydraulic motor 20. This remains true despite the deceleration of the valve 8 which generates an additional force on the actuator piston 26 via the cam-lever 71.

When the valve 8 is a few tenths of a millimeter from the valve seat 11, the cam-lever 71 travels its slow lift angular sector LL as represented in FIG. 13 and the quotient of the actuator piston lever arm LP divided by the length of the valve action lever arm LS becomes high. The ratio between the speed at which the actuator piston 26 advances and that of the valve 8 is proportional to said quotient. The pressure in the closure and regeneration line 18 is from now on relatively low.

It follows that the speed of replacing said valve 8 is very low—for example a few tens of centimeters per second—which guarantees a soft landing of said valve 8 on the valve seat 11 with which it cooperates. Said landing guarantees silence and long-term operation of the valve 8 and of the valve seat 11, and guarantees that the valve 8 cedes virtually all of its kinetic energy to the hydraulic fluid 3 admitted to the fluid intake 19 of the closure and regeneration hydraulic motor 20.

Figure 12:
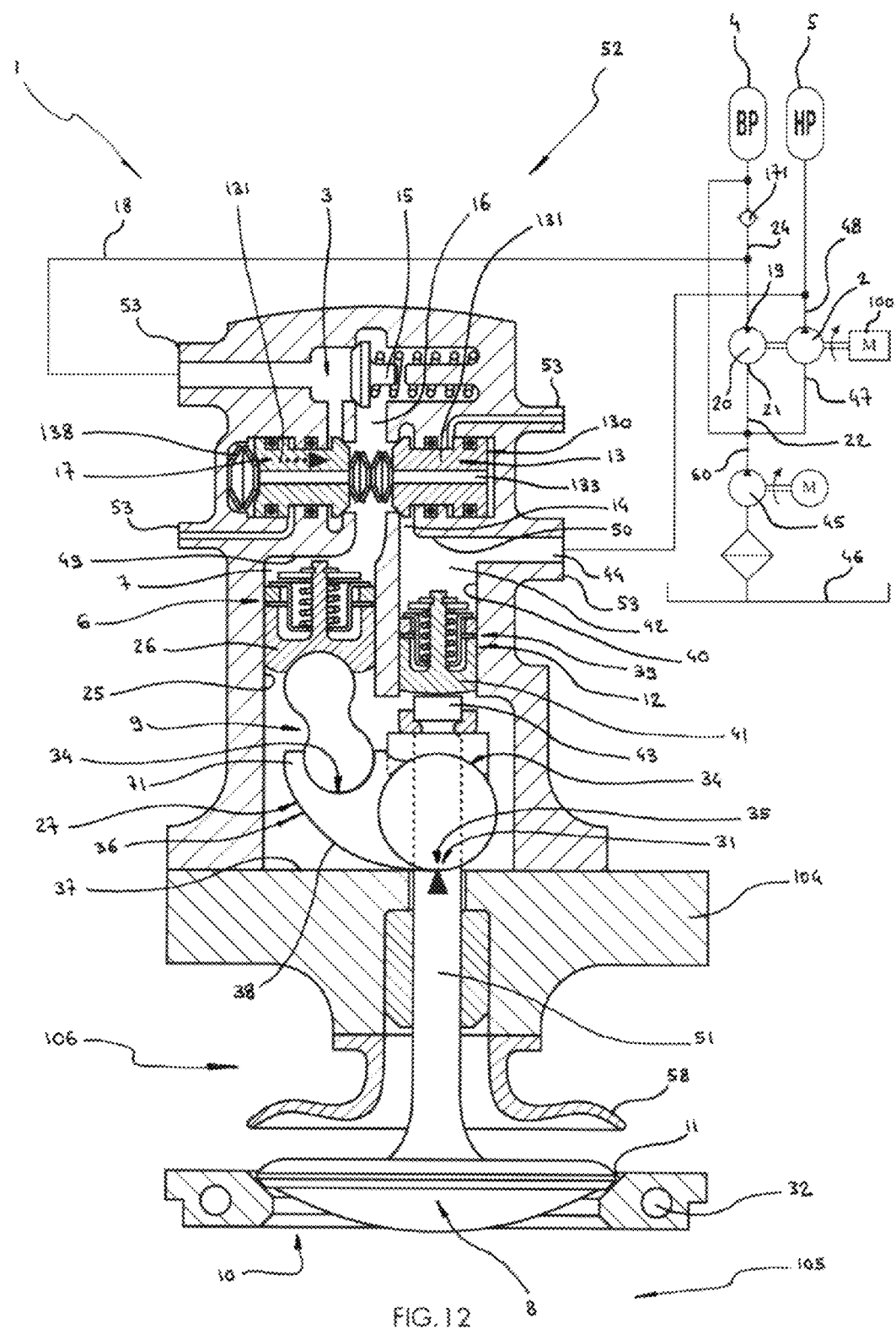

Once the valve is totally closed and replaced perfectly on its valve seat 11, as FIG. 12 shows, the actuator piston 26 has when launched been able to continue its travel of a few tenths of a millimeter without consequence for the position of the valve 8, accompanied in its movement by the transmission means 9, thanks in particular to the concentric neutral angular sector NC of the cam-lever 71. Said piston 26 has then been returned to the rest position by the pressure with which it is faced. This additional micro-travel has enabled the actuator piston 26 and the transmission means 9 with which it cooperates also to cede their kinetic energy to the hydraulic fluid 3 introduced into the fluid intake 19 of the closure and regeneration hydraulic motor 20.

Then, as the closure and regeneration hydraulic motor 20 continues to be turned by the crankshaft 102 to which it is mechanically connected, the pressure in the closure and regeneration line 18 progressively returns to the pressure of twenty bar in the low-pressure accumulator 4 as and when the hydraulic fluid 3 compressed remaining in the closure and regeneration line 18 is expanded.

Once a pressure very substantially less than twenty bar is reached in the closure and regeneration line 18, the closure and regeneration motor 20 again loops on itself as explained above, to this end admitting hydraulic fluid 3 at the level of its fluid intake 19 via the end of expansion check valve 171 and the free wheel channel 24.

The description that has just been given of the operation of the closure and regeneration hydraulic motor 20 is theoretical, however. In practice, it is necessary to manage the compressibility of the hydraulic fluid 3 contained in the closure and regeneration line 18 as otherwise the valve 8 will be closed too violently. In fact, the violent expansion of the hydraulic fluid 3 contained in the actuator hydraulic chamber 7 in the closure and regeneration line 18 when the valve closure hydraulic valve 17 is closed can only produce rapid depressurization of said chamber 7 with—apart from excitation and instability of the valve 8—serious energy loss by turbulence in the hydraulic fluid 3 as it passes through said valve 17.

Note moreover that the larger the internal volume of the closure and regeneration line 18 relative to that of the actuator hydraulic chamber 7, the greater the instability of the valve 8 and the associated energy loss.

It is to prevent these two undesirable effects that according to one particular embodiment of the regenerative valve hydraulic actuator 1 according to the invention, the closure and regeneration hydraulic motor 20 can consist of a closure and regeneration cam 158 as shown in FIG. 28. According to this nonlimiting example, said cam includes a closure and regeneration cam profile 162 divided into a plurality of angular sectors each having a particular role.

There are clearly seen in FIG. 28 the regeneration angular sector R, the expansion angular sector D, the maneuvering angular sector M, the precompression angular sector P, and the stabilization angular sector S.

The role of each angular sector R, D, M, P and S is shown in detail in FIGS. 29 to 33, which are diagrammatic sectional views illustrating by successive steps the operation of the closure and regeneration hydraulic motor 20 of the regenerative valve hydraulic actuator 1 according to the invention.

It is seen that the closure and regeneration cam 158 is mounted on a hydraulic motor shaft 163 that is assumed here to be driven in rotation by the crankshaft 102 of the transfer-expansion and regeneration engine the French patent on which belongs to the applicant has been published under the number FR 3 032 236 by means of a hydraulic motor pulley 170 such as can be seen in FIGS. 34 and 35.

It is also seen that said cam 158 can be offset angularly relative to the hydraulic motor shaft 163 by cam phase-shifting means 164 consisting of male helical splines 165 formed on the cylindrical external face of said shaft 163 which cooperate with female helical splines 166 formed inside said cam 158, the latter being movable axially relative to the hydraulic motor shaft 163 by a cam phase-shifting actuator 167 which acts via a phase-shifting fork 168.

FIGS. 29 to 33 show clearly that on turning the closure and regeneration cam 158 causes a closure and regeneration piston 159 to move in its closure and regeneration cylinder 160, via a closure and regeneration tongue 173. As seen, said piston 159 and said cylinder 160 together form a closure and regeneration chamber 161.

It is moreover clear that the closure and regeneration cam 158 is made sufficiently long so that, whatever its axial position relative to the hydraulic motor shaft 163, it always exposes its closure and regeneration cam profile 162 to the closure and regeneration tongue 173.

FIGS. 29 to 33 show the hydraulic connector 53 that is connected to the closure and regeneration line 18, said connector 53 forming the fluid intake 19 of the closure and regeneration hydraulic motor 20. Note also in said FIGS. 29 to 33 the hydraulic connector 53 that is connected to the hydraulic motor low-pressure return line 22 which is in direct communication with the low-pressure accumulator 4. The latter said connector 53 forms the fluid outlet 21 of the closure and regeneration hydraulic motor 20.

In the light of FIGS. 29 to 33, it is clear that providing communication of the hydraulic motor low-pressure return line 22 with the closure and regeneration chamber 161 may be effected via the end of expansion check valve 171 and in this case hydraulic fluid 3 can go only from said line 22 to said chamber 161 and not vice versa, that is via the precompression valve 172 when the latter is held open by its tube actuator 137, said precompression valve 172 being mounted in parallel with said valve 171 and allowing the hydraulic fluid 3 to go from said line 22 to said chamber 161 and vice versa.

Figure 29:
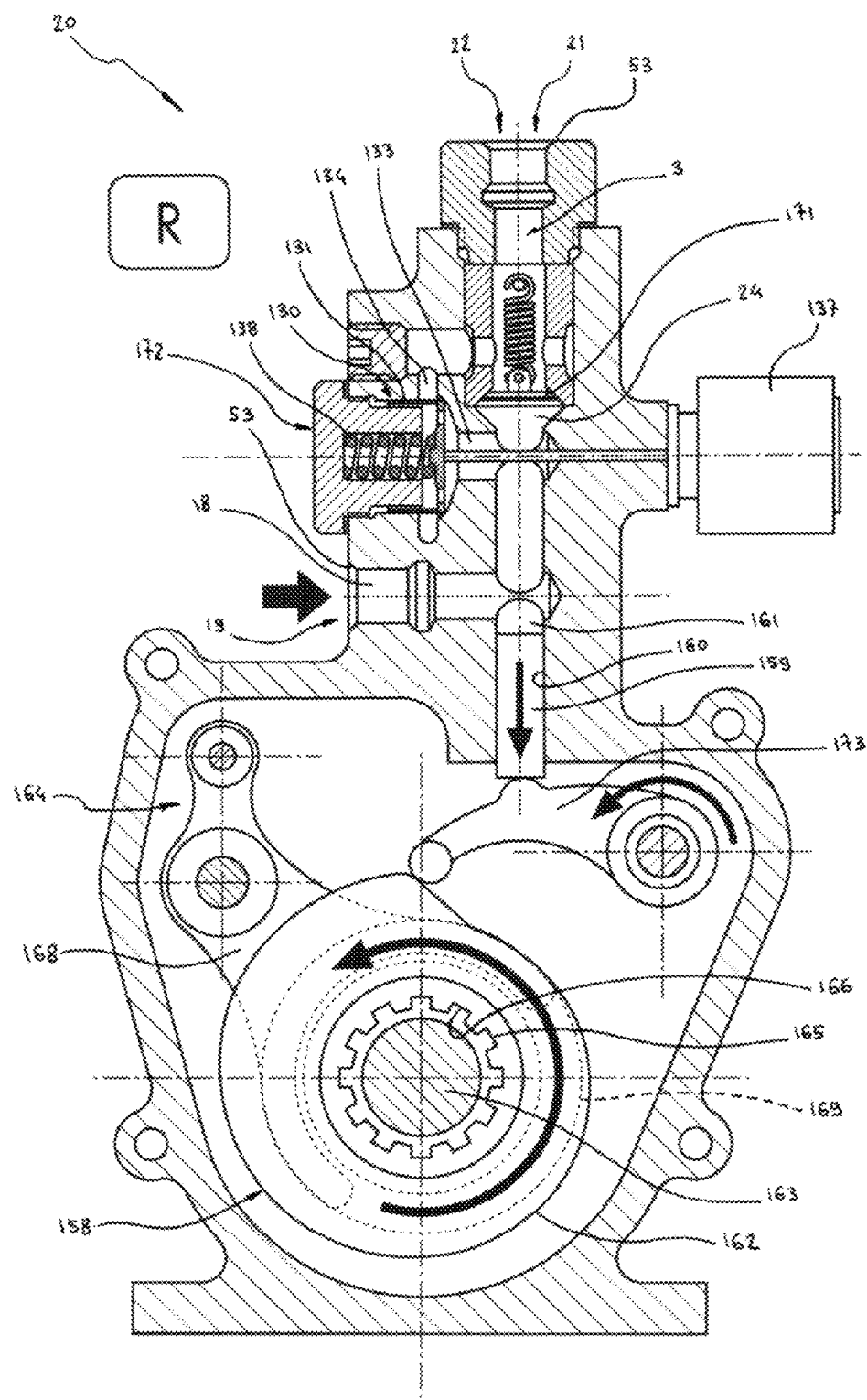
FIGS. 29 to 33 are diagrammatic sectional views illustrating by successive steps the operation of one particular configuration of the closure and regeneration hydraulic motor of the regenerative valve hydraulic actuator according to the invention in which a closure and regeneration cam is mounted on a hydraulic motor shaft driven in rotation by the reciprocating piston compressor or engine by means of a hydraulic motor pulley, said cam being able to be offset angularly relative to said shaft by cam phase-shifting means consisting of male helical splines formed on the cylindrical external face of said shaft which cooperate with female helical splines formed on the inside of said cam, the latter being movable or retainable axially relative to the hydraulic motor shaft by a cam phase-shifter actuator via a phase-shifter form.

FIG. 29 shows the role of the regeneration angular sector R. The valve 8 is in the process of being replaced and the valve closure hydraulic valve 17 is open. The closure and regeneration piston 159 pushes on the closure and regeneration tongue 159, which drives the hydraulic motor shaft 163 in rotation via the closure and regeneration cam 158. Said sector R therefore enables a large proportion of the kinetic energy of the valve 8 and of the mobile components that accompany it in its movement to be recovered.

Figure 30:
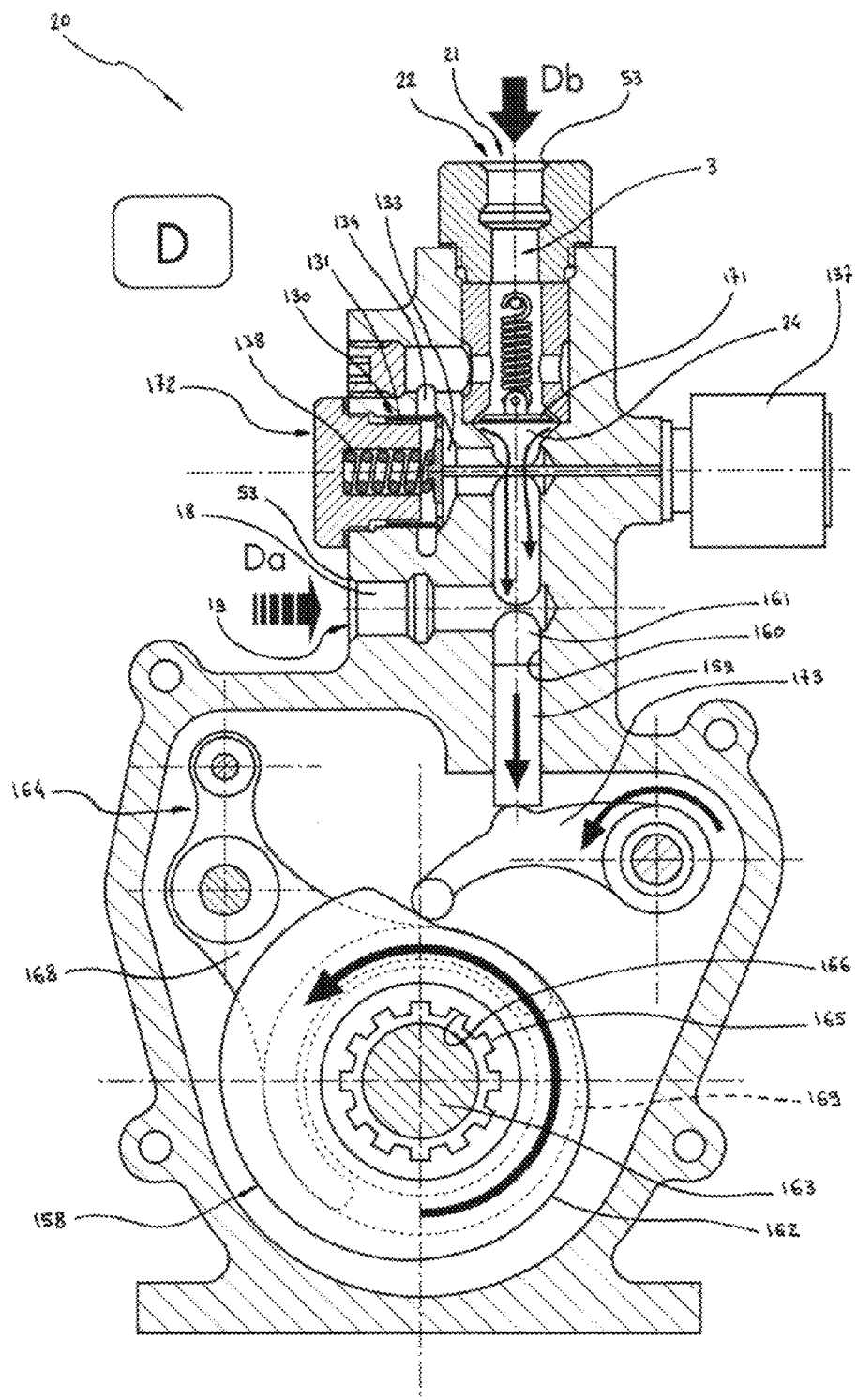

FIG. 30 shows what happens immediately after the valve 8 has laded on its valve seat 11. In a first time denoted Da in FIG. 30, the internal volume filled with hydraulic fluid 3 of the closure and regeneration line 18 is expanded until its pressure becomes less than twenty bar, that is to say less than that in the low-pressure accumulator 4. From this moment and therefore in a second time denoted Db in FIG. 30, the end of expansion check valve 171 has been opened and has allowed hydraulic fluid 3 contained in the low-pressure accumulator 4 to return to the closure and regeneration chamber 161.

Figure 31:
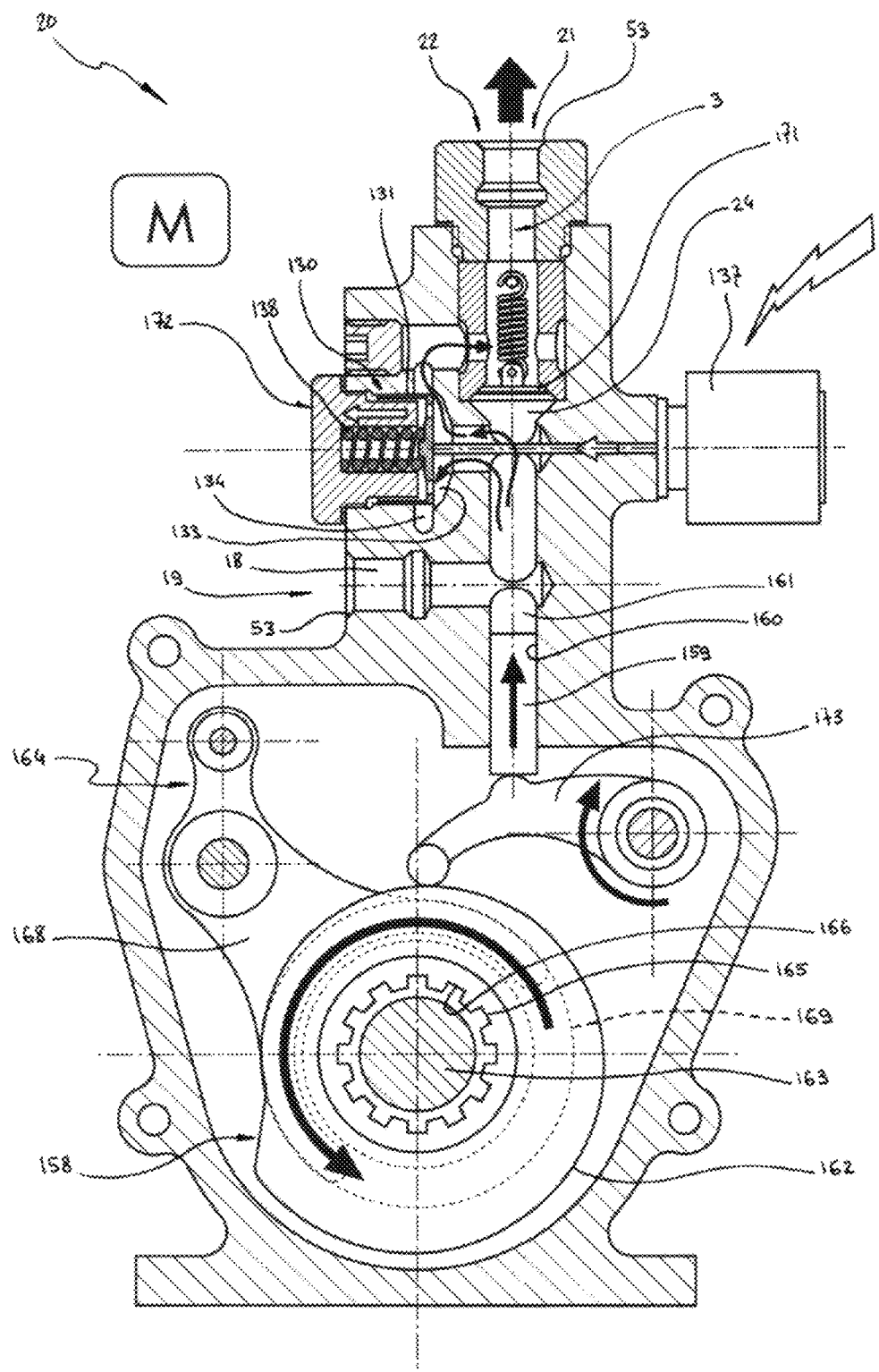

There follows what is illustrated in FIG. 31, the closure and regeneration tongue 173 being in contact with the maneuvering angular sector M. In this figure, it is seen that the precompression valve 172 has been opened by its tube actuator 137 and that the closure and regeneration cam profile 162 causes the closure and regeneration piston 159 to rise in its closure and regeneration cylinder 160 for as long as necessary to position the beginning of the precompression angular sector P at the required angular position.

Figure 32:
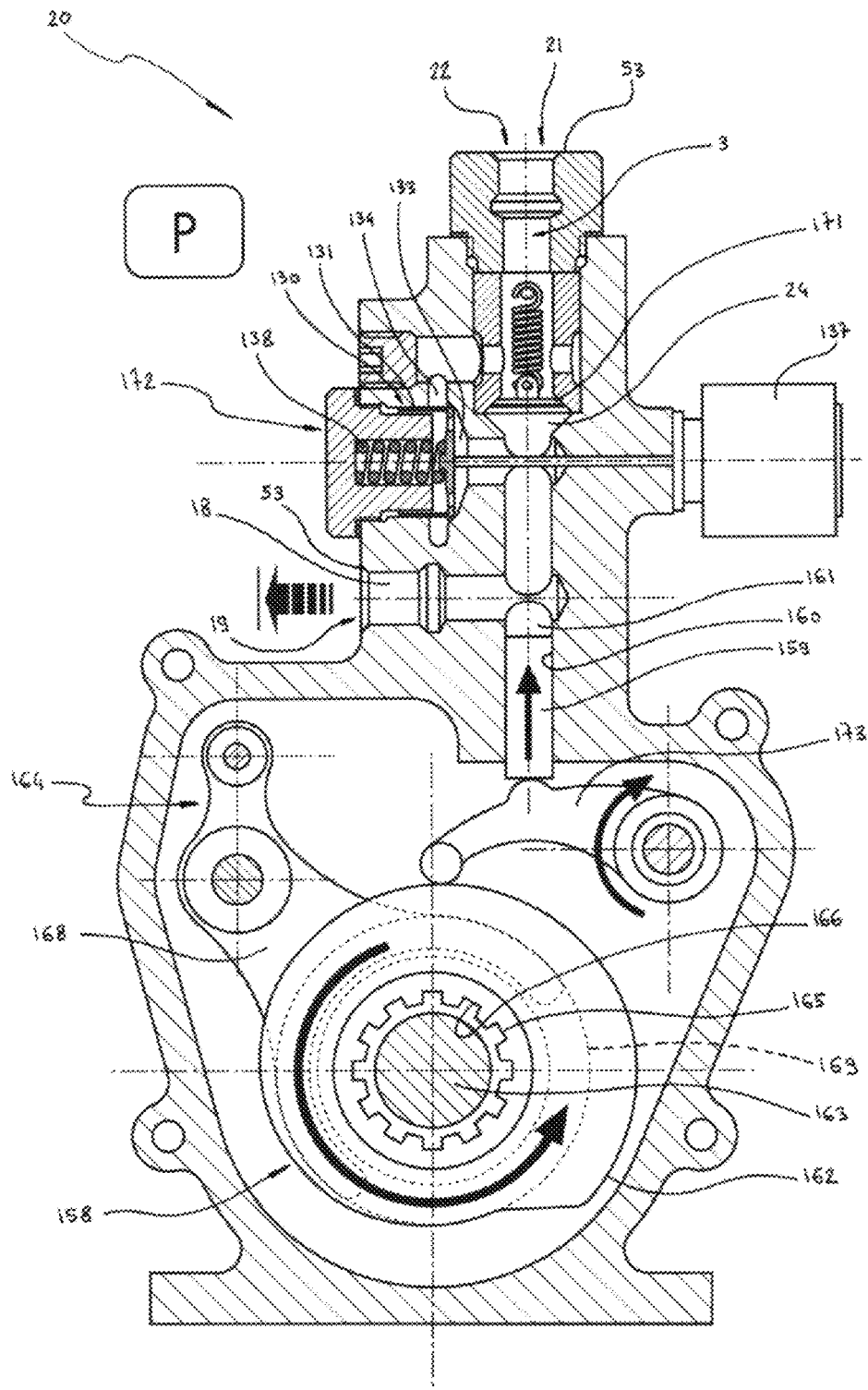
Figure 33:
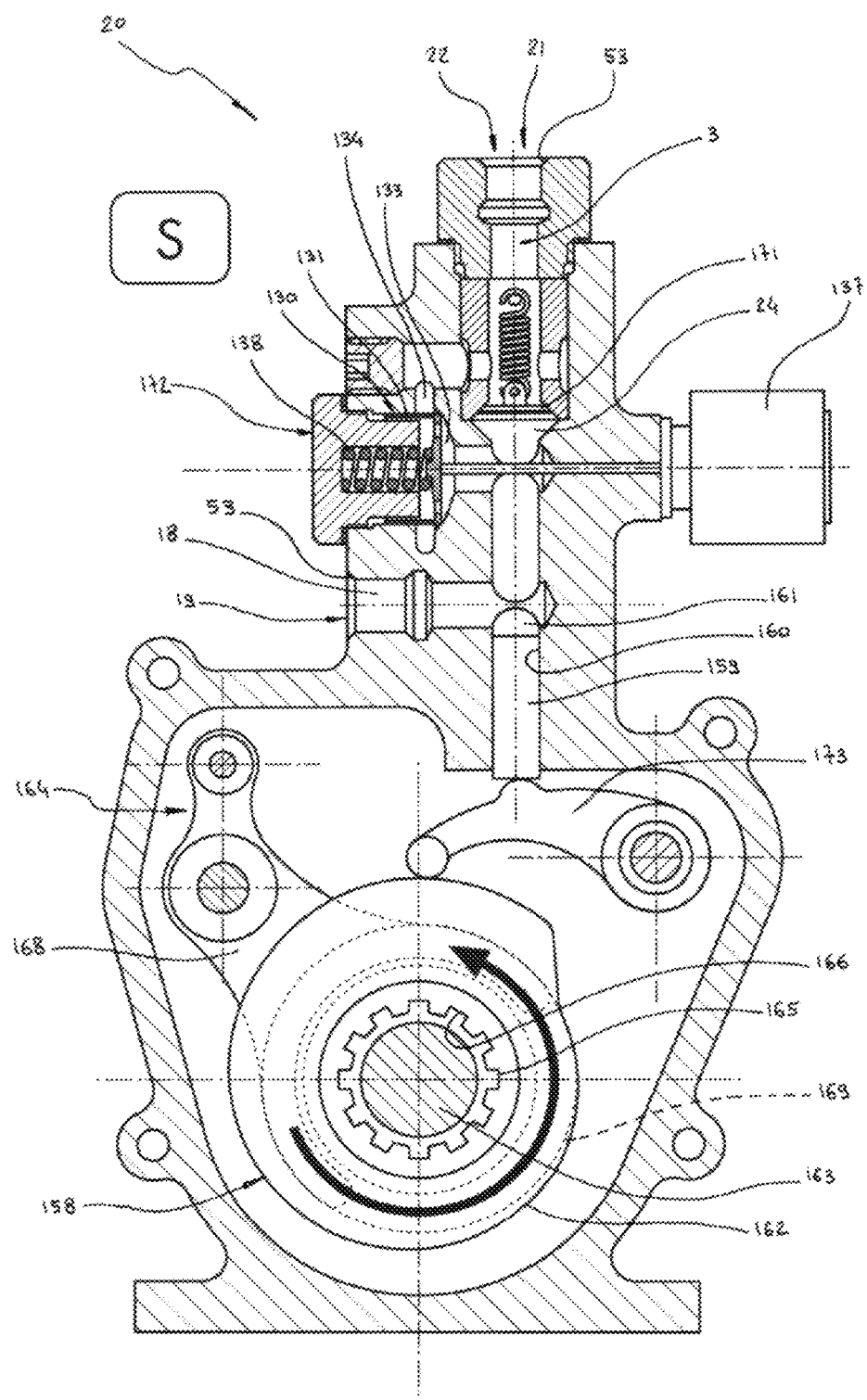

It is seen in FIG. 32 that the precompression valve 172 has been closed again. The point of closure of said valve 172 has marked the beginning of the precompression angular sector P which has no physical reality on the closure and regeneration cam profile 162. The moment when said valve 172 has actually been closed again has been determined by a computer that is not represented taking into account firstly the pressure there will be in the actuator hydraulic chamber 7 when the valve 8 is held open as shown in FIG. 9, secondly the compressibility of the hydraulic fluid 3, and thirdly the internal volume and the stiffness of the closure and regeneration line 18.

The sooner the precompression valve 172 is closed when the closure and regeneration tongue 173 travels over the precompression angular sector P, the higher the pressure there will be in the closure and regeneration line 18 at the moment when the valve closure hydraulic valve 17 opens.

The aim is that when said valve 17 is opened, the pressure in the closure and regeneration line 18 will be as close as possible to that in the actuator hydraulic chamber 7.

Once the target pressure is reached in the closure and regeneration line 18, the closure and regeneration tongue 173 will travel over the stabilization angular sector S which is nothing other than a part of the closure and regeneration cam profile 162 that is concentric with the hydraulic motor shaft 163 and which therefore generates no movement of the closure and regeneration piston 159 in the closure and regeneration cylinder 160.

From this moment, the closure and regeneration hydraulic motor 20 is ready to execute a new valve 8 closing cycle, the closure and regeneration cam 158 again reaching the regeneration angular sector R as shown in FIG. 29.

It is seen that, the regenerative valve hydraulic actuator 1 according to the invention being totally flexible, it is necessary to be able to realign angularly the closure and regeneration cam 158 relative to the crankshaft 102 when the angular moment relative to said crankshaft 102 at which the valve 8 must be closed again changes.

To this end, said cam 158 includes female helical splines 166 that cooperate with male helical splines 165 formed on the hydraulic motor shaft 163.

Said splines 165, 166 offset said cam 158 angularly relative to the hydraulic motor shaft 163 when said cam 158 is moved axially along said shaft 163 by the cam phase-shifting actuator 167 that has been shown in FIGS. 34 and 35, by means of the phase-shifting fork 168 which cooperates with a phase-shifting groove 169 formed in the closure and regeneration cam 158.

Note that by way of a variant that is not represented, the same closure and regeneration cam 158 is able to actuate a plurality of closure and regeneration tongues 173 each dedicated to closing a valve 8. By way of another variant, the hydraulic motor shaft 163 can turn at twice the speed of the crankshaft 102 whilst a single closure and regeneration tongue 173 can be made responsible for returning two valves 8 which share the same closure and regeneration line 18, the closing of the first valve 8 being offset approximately one hundred and eighty crankshaft 102 degrees relative to the closing of the second valve 8.

It is clear from the description of the operation of the regenerative valve hydraulic actuator 1 according to the invention that has just been given that said actuator 1 constitutes a favorable response to virtually all of the objectives of hydraulic actuation of the valves 8 of any reciprocating piston compressor or engine 100.

These objectives include the recovery—by means of the closure and regeneration hydraulic motor 20—of the kinetic energy of the mobile mechanical components and of the hydraulic fluid 3 in motion. In fact, if it is not recovered, said energy is not only dissipated as a pure loss to the detriment of the final energy balance of the reciprocating piston compressor or engine 100, but is able to excite the mass-spring system constituted by the mobile but rigid mechanical components considered separately, on the one hand, and the compressible hydraulic fluid 3, on the other hand. This excitation produces functional instability and noise. Said excitation could be attenuated by damping, but this would be to the detriment of the final efficiency as damping is notorious for dissipating excitation energy in the form of heat.

Now, the regenerative valve hydraulic actuator 1 according to the invention does not induce dissipative damping, but instead regenerative damping through using the kinetic energy stored by its main mobile components during the first half-travel of the valve 8 to move said valve 8 during its second half-travel.

Moreover, thanks to the advanced functions of its closure and regeneration hydraulic motor 20, said actuator 1 according to the invention controls the precompression of the hydraulic fluid 3 in the closure and regeneration line 18 to provide in the regenerative part of the closing cycle of the valve 8 the best stability and the best energy efficiency possible.

Moreover, and as is readily understood, the regenerative valve hydraulic actuator 1 according to the invention enables extremely fast lifting of the valve 8 that it would be difficult to produce using a conventional cam given the cam profile to which such lifts would lead. This said, said actuator 1 guarantees slow replacement of the valve 8 on the valve seat 11 with which it cooperates, this being necessary to guarantee silent operation and the required service life of said valve 8 and said seat 11.

Note also that the computer that is not represented can instruct the opening and the closing either of the valve lifter hydraulic valve 13 or of the valve closure hydraulic valve 17 at any time so as to trigger the opening or the closing of the valve 8 at any angular position during the rotation of said crankshaft 102. This possibility leaves complete freedom to adjust precisely the quantity of gas admitted into the compression or combustion chamber 105 via the intake line 106, and the moment at which said gases are admitted into said chamber 105.

Note also that the regenerative valve hydraulic actuator 1 according to the invention offers the possibility of adjusting the lift height of the valve 8 by acting on the open time of the valve lifter hydraulic valve 13. For a given pressure in the high-pressure accumulator 5, the longer said time, the higher the lift of said valve 8.

Moreover, said actuator 1 also offers the possibility of locking the valve 8 open and of maintaining it for as long as necessary in the position shown in FIG. 9. This enables a valve lift 8 plateau to be produced, which can prove useful in various applications.

It will be noted that the particular configuration of the regenerative valve hydraulic actuator 1 according to the invention as shown in FIGS. 5 to 12 advantageously makes it possible to adjust the pressure in the high-pressure accumulator 5. Said adjustment enables a choice of the speed of lifting and replacing the valve 8. In fact, the return actuator piston 41 being subjected to the pressure in the high-pressure accumulator 5, if the pressure in the latter is increased to open the valve 8 more quickly by means of the actuator piston 26, the return force exerted on said valve 8 by the return actuator piston 41 will be increased in the same proportions. Consequently, the lifting speed and the replacement speed of the valve 8 always remain approximately proportional.

It will moreover be noted that various means enable variation of the pressure in the high-pressure accumulator 5. Said means include the possibility of temporarily increasing or decreasing the cubic capacity of the high-pressure hydraulic feed pump 2, or again of providing a non-compressible volume which may be larger or smaller introduced into the high-pressure accumulator 5 or into the circuit to which said accumulator 5 is connected.

The other advantages of the regenerative valve hydraulic actuator 1 according to the invention include the possibility—as illustrated in FIGS. 5 to 12—of replacing the springs normally used to return the valves 8 of the reciprocating piston compressor or engine 100 onto their valve seat 11 with a valve return actuator 39.

This particular configuration made possible by the invention notably enables a very high return force to be exerted on the valve 8 without the penalty of the large dimensions and the high reciprocating mass of a steel spring as normally used by the person skilled in the art. In this sense, the regenerative valve hydraulic actuator 1 according to the invention is able to offer return powers of the valve 8 that are normally accessible only via desmodromic control known in itself.

This particular feature in particular enables rapid and short lifts of the valve 8 to be obtained as is for example necessary to produce the intake and exhaust metering valves of the transfer-expansion and regeneration engine the French patent on which published under the number FR 3 032 236 belongs to the applicant.

In fact, said transfer-expansion and regeneration engine can preferably be controlled not by gas pressure variation but rather by truncation of the expansion to generate more torque, or by extension of the expansion followed by quasi-adiabatic recompression at the exhaust to produce less torque. Said motor then operating at constant pressure no longer has virtually any delay responding to load transients.

Note that the regenerative valve hydraulic actuator 1 according to the invention can advantageously be applied to the compressors of said motor the load of which can also be controlled by means of their intake valves 8 thanks to said actuator 1.

The responsiveness and the speed of the regenerative valve hydraulic actuator 1 according to the invention also enables high-speed internal combustion engines to be equipped with valves 8 offering numerous control variants to optimize the efficiency, torque, power and pollutant emissions of said engines.

The flexibility of control of the valve 8 offered by the regenerative valve hydraulic actuator 1 according to the invention further enablers multiple lifts to be provided during the same thermodynamic cycle, for example for fine adjustment of the quantity of exhaust gas recirculated into the compression or combustion chamber 105, and production of compression ignition internal combustion engines.

Note also the great flexibility of integration on the cylinder head of the compressor or engine 104 of any reciprocating piston compressor or engine 100 whatsoever of the regenerative valve hydraulic actuator 1 according to the invention. In particular, the absence of any mechanical connection between the energy source of the regenerative valve hydraulic actuator 1 and the actuator cartridge 52 which accommodates the valve 8 allows the latter to be oriented freely relative to the compression or combustion chamber 105. This in particular enables improvement of the geometric qualities of said chamber 105, for example according to permeability and/or combustion quality criteria.

By way of another advantage of the regenerative valve hydraulic actuator 1 according to the invention, note that the particular configuration of said actuator 1 as shown in FIGS. 5 to 12 prevents as much as possible any cul-de-sac in which hydraulic fluid 3 could be trapped. In fact, said configuration ensures a constant circulation of hydraulic fluid 3 between the high-pressure accumulator 5 and the low-pressure accumulator 4 via the various circuits and volumes constituted inside the actuator cartridge 52. A cooler can moreover be provided on the path of said fluid 3. Accordingly, said cartridge 52 will be cooled by said hydraulic fluid 3, and its temperature is stabilized. This arrangement finds its full benefit for example in the context of the transfer-expansion and regeneration engine the French patent on which published under the number FR 3 032 236 belongs to the applicant, the expansion cylinder assembly 54 of said engine not including any external cooling circuit.

The other advantages of the regenerative valve hydraulic actuator 1 according to the invention include the tubular valve 130, especially when the latter cooperates with the hydraulic amplification piezoelectric actuator 139 the operation of which is readily understood from FIGS. 21 and 22.

The possibilities of the regenerative valve hydraulic actuator 1 according to the invention are not limited to the applications that have just been described and moreover it will therefore be understood that the foregoing description has been given by way of example only and that it in no way limits the scope of said invention, which would not be departed from by replacing the execution details described by any other equivalent detail.

The invention claimed is:

1. A regenerative valve hydraulic actuator for a reciprocating piston compressor or engine which comprises at least one piston connected to transmission means to reciprocate in a cylinder closed by a compressor or engine cylinder head, said piston, said cylinder and said engine cylinder head forming a compression or combustion chamber into which opens at least one intake line and at least one exhaust or discharge line, one or both of said two lines being connected to said compression or combustion chamber by a line orifice that a valve can block when it rests on a valve seat the regenerative valve hydraulic actuator comprising:

at least one high-pressure hydraulic feed pump that can admit a hydraulic fluid from a low-pressure accumulator or a fluid tank via a low-pressure feed line to discharge said hydraulic fluid to a high-pressure accumulator via a high-pressure feed line;

at least one actuator which comprises an actuator cylinder capped by an actuator cylinder head, said actuator cylinder being attached directly or indirectly to the compressor or engine cylinder head whereas said actuator cylinder and the actuator cylinder head form with an actuator piston an actuator hydraulic chamber, said actuator piston being mechanically connected by transmission means to the valve, said transmission means being such that if the actuator hydraulic chamber is subjected to a pressure exerted by the hydraulic fluid, the actuator piston tends to move said valve away from the valve seat with which it cooperates;

at least one valve return device which exerts on the valve a force opposite that which the actuator is able to produce, said valve return device therefore tending to return the valve into contact with the valve seat with which it cooperates;

at least one valve lifter hydraulic valve that can open or close a high-pressure lifter line which connects the high-pressure accumulator to the actuator hydraulic chamber;

at least one lifter check valve placed in an inertial lifter line that connects the low-pressure accumulator or the fluid tank to the actuator hydraulic chamber, said lifter check valve allowing the hydraulic fluid via said inertial lifter line to flow from the low-pressure accumulator or the fluid tank to the actuator hydraulic chamber, but not in a direction from the actuator hydraulic chamber to the low-pressure accumulator or the fluid tank;

at least one valve closure hydraulic valve that can open or close a closure and regeneration line which connects the actuator hydraulic chamber with a fluid intake which a closure and regeneration hydraulic motor includes, a fluid outlet which said regeneration hydraulic motor also includes being connected with the low-pressure accumulator or with the fluid tank by a hydraulic motor low-pressure return line;

at least one progressive lever arm ratio lever constituting all or part of the transmission means, said progressive lever arm ratio lever exposing at least one point of application of the force of the actuator to which the actuator piston can apply directly or indirectly a driving or resisting force, at least one point of application of the force of the valve to which the valve can apply directly or indirectly a driving or resisting force, and at least one point of application of a reaction force on the engine cylinder head at which a force is applied directly or indirectly to the compressor or engine cylinder head.

2. The regenerative valve hydraulic actuator according to claim 1, wherein means for moving the point of application of the force of the actuator move the point of application of the force of the actuator and/or the point of application of the force of the valve and/or the point of application of the reaction force on the engine cylinder head along the progressive lever arm ratio lever during an opening travel of the valve.

3. The regenerative valve hydraulic actuator according to claim 2, wherein the point of application of the force of the actuator and/or the point of application of the force of the valve and/or the point of application of the reaction force on the engine cylinder head respectively form directly or indirectly with the actuator piston and/or with the valve and/or with the compressor or engine cylinder head with which it cooperates either at least one pivot connection or at least one rolling-sliding connection, the latter constituting the means for moving the point of application of the force of the actuator.

4. The regenerative valve hydraulic actuator according to claim 3, wherein the rolling-sliding connection consists of at least one lever contact track provided on the progressive lever arm ratio lever at the level of the point of application of the force of the actuator and/or the point of application of the force of the valve and/or the point of application of the reaction force on the engine cylinder head, said lever contact track cooperating with a lever reaction surface respectively formed directly or indirectly on the actuator piston and/or on the valve and/or on the compressor or engine cylinder head, said actuator piston and/or said lever reaction surface having a curved contact profile on which is established the contact between said lever contact track and said lever reaction surface.

5. The regenerative valve hydraulic actuator according to claim 1, wherein the valve return device consists of a valve return actuator which comprises a return actuator cylinder capped by a return actuator cylinder head, said return actuator cylinder being attached directly or indirectly to the engine cylinder head of the compressor or engine whereas said return actuator cylinder and the return actuator cylinder head form with a return actuator piston a return actuator hydraulic chamber, said return actuator piston being mechanically connected to the valve by return transmission means.

6. The regenerative valve hydraulic actuator according to claim 5, wherein the return actuator hydraulic chamber is connected to the high-pressure accumulator by a return pressure line.

7. The regenerative valve hydraulic actuator according to claim 1, wherein a level and a pressure of the hydraulic fluid that the low-pressure accumulator contains are maintained within a certain range of values by a force-feed low-pressure hydraulic pump which can transfer said hydraulic fluid from the fluid tank to said low-pressure accumulator via a low-pressure force-feed line.

8. The regenerative valve hydraulic actuator according to claim 1, wherein at least the valve with or without the valve seat with which it cooperates, the actuator, the transmission means, the at least one valve return device, the at least one lifter check valve, the at least one valve lifter hydraulic valve and the valve closure hydraulic valve are together accommodated in an actuator cartridge which exposes at least one hydraulic connector.

9. The regenerative valve hydraulic actuator according to claim 1, wherein the valve lifter hydraulic valve and/or the valve closure hydraulic valve consists of a tubular valve which comprises a blocking tube which can be moved in longitudinal translation by a tube actuator, said blocking tube being accommodated in fluid-tight manner in a blocking tube bore and ending at a tube sealing bearing surface that can either rest on a tube seat to form with the latter a continuous line of fluid-tight contact or be maintained at a certain distance from said tube seat to allow the hydraulic fluid to pass from a tube internal volume to a tube external collector distributor or vice versa.

10. The regenerative valve hydraulic actuator according to claim 9, wherein the tube actuator is a hydraulic amplification piezoelectric actuator which comprises a stack of ceramic elements that are deformed mechanically when they are subjected to an electric field, the end of said stack being connected to an actuator sender piston of large diameter which forms —with an actuator sender cylinder —an actuator sender chamber which communicates with at least one actuator receiver chamber, the latter being formed on the one hand by an actuator receiver piston of small diameter which is directly or indirectly connected to the blocking tube with which it cooperates so as to be able to move the latter in longitudinal translation and on the other hand by an actuator receiver cylinder.

11. The regenerative valve hydraulic actuator according to claim 10, wherein the actuator sender chamber and the at least one actuator receiver chamber are together connected with a pressurized hydraulic fluid source by an actuator force-feed check valve which allows hydraulic fluid to go from said hydraulic fluid source to said actuator sender chamber and said actuator receiver chamber and not vice versa.

12. The regenerative valve hydraulic actuator according to claim 11, wherein the actuator sender piston receives a pressure compensation spring which tends to move it toward the actuator sender chamber, a force which said spring exerts on said actuator sender piston being less than or equal to a force which the hydraulic fluid exerts on said actuator sender piston when the piston in the actuator sender chamber is equal to that in the pressurized hydraulic fluid source.

13. The regenerative valve hydraulic actuator according to claim 11, wherein the actuator receiver piston receives a pressure compensation spring which tends to move it toward the actuator receiver chamber, a force which said spring exerts on said actuator receiver piston being less than or equal to a force which the hydraulic fluid exerts on said actuator receiver piston when a pressure in the actuator receiver chamber is equal to that in the pressurized hydraulic fluid source.

14. The regenerative valve hydraulic actuator according to claim 10, wherein the actuator sender chamber communicates via a receiver chamber common manifold with a plurality of actuator receiver chambers, the actuator receiver piston forming each of said actuator receiver chambers being able to move in longitudinal translation a blocking tube that is its own.

15. The regenerative valve hydraulic actuator according to claim 14, wherein the actuator receiver chambers are each put into communication or not with the receiver chamber common manifold by a selection valve the opening of which is commanded by a selection valve actuator.

16. The regenerative valve hydraulic actuator according to claim 10, wherein the receiver chamber common manifold accommodates in non-fluid-tight manner at least one solid or hollow incompressible cylindrical element which is maintained centered in the vicinity of a certain longitudinal position relative to the receiver chamber common manifold by at least two oppositely acting centering springs.

17. The regenerative valve hydraulic actuator according to claim 1, wherein the closure and regeneration hydraulic motor comprises a closure and regeneration cam mounted on a hydraulic motor shaft which is driven —directly or indirectly —in rotation by the reciprocating piston compressor or engine, a closure and regeneration piston bearing directly or indirectly on said closure and regeneration cam and forming —with a closure and regeneration cylinder —a closure and regeneration chamber which communicates with the fluid intake.

18. The regenerative valve hydraulic actuator according to claim 17, wherein the closure and regeneration cam exposes a closure and regeneration cam profile which includes at least one regeneration angular sector R on which the closure and regeneration piston bears to return the valve to the valve seat.

19. The regenerative valve hydraulic actuator according to claim 17, wherein the closure and regeneration cam exposes a closure and regeneration cam profile which includes at least one pre-compression angular sector P on which the closure and regeneration piston bears to pre-compress the closure and regeneration line between two returns of the valve to the valve seat.

20. The regenerative valve hydraulic actuator according to claim 17, wherein the closure and regeneration cam can be offset angularly relative to the hydraulic motor shaft by cam phase-shifting means.

21. The regenerative valve hydraulic actuator according to claim 20, wherein the cam phase-shifting means consist of at least one male helical spline formed on a cylindrical external face of the hydraulic motor shaft which cooperates with at least one female helical spline formed inside the closure and regeneration cam, the latter being able to be moved or retained in place axially relative to the hydraulic motor shaft by a cam phase-shifting actuator.

22. The regenerative valve hydraulic actuator according to claim 21, wherein the cam phase-shifting actuator is connected to the closure and regeneration cam by a phase shifting fork which cooperates with a phase-shifting groove of the closure and regeneration cam.

23. The regenerative valve hydraulic actuator according to claim 1, wherein the closure and regeneration line includes an end of expansion check valve which allows hydraulic fluid coming from the low-pressure accumulator, the fluid tank, or a pressurized hydraulic fluid source to enter said closure and regeneration line via a freewheel channel, but not to leave it.

24. The regenerative valve hydraulic actuator according to claim 1, wherein the closure and regeneration line includes a precompression valve that allows hydraulic fluid coming from the low-pressure accumulator, the fluid tank, or a pressurized hydraulic fluid source to enter said line and/or to leave it.

25. The regenerative valve hydraulic actuator according to claim 1, wherein the point of application of the force of the actuator and/or the point of application of the force of the valve and/or the point of application of the reaction force on the engine cylinder head includes play compensation means.

26. The regenerative valve hydraulic actuator according to claim 25, wherein the play compensation means consist of a play compensation actuator inside which a play compensation chamber includes a play compensation check valve which allows hydraulic fluid coming from the low-pressure accumulator, the high-pressure accumulator, the fluid tank or a pressurized hydraulic fluid source to enter said play compensation chamber, but not to leave it.

27. The regenerative valve hydraulic actuator according to claim 25, wherein the play compensation means consist of a play compensation actuator inside which a play compensation chamber includes a play compensation nozzle which allows hydraulic fluid coming from the low-pressure accumulator, the high-pressure accumulator, the fluid tank or a pressurized hydraulic fluid source to enter said play compensation chamber and to leave it.

28. The regenerative valve hydraulic actuator according to claim 1, wherein the progressive lever arm ratio lever is accommodated in a lever chamber into which also opens the actuator piston, said lever chamber being connected with the low-pressure accumulator, the fluid tank or a pressurized hydraulic fluid source by a lever chamber check valve which allows hydraulic fluid to leave said lever chamber but not to enter it, or by a lever chamber calibrated nozzle which allows hydraulic fluid to leave and to enter said lever chamber, or again by both said lever chamber check valve and said lever chamber calibrated nozzle, the latter then being placed in parallel with the lever chamber check valve.

* * * * *